United States Patent [19]
Allen et al.

[11] Patent Number: 5,634,072
[45] Date of Patent: May 27, 1997

[54] METHOD OF MANAGING RESOURCES IN ONE OR MORE COUPLING FACILITIES COUPLED TO ONE OR MORE OPERATING SYSTEMS IN ONE OR MORE CENTRAL PROGRAMMING COMPLEXES USING A POLICY

[75] Inventors: Ruth A. Allen, Poughkeepsie; Joseph S. Insalaco, Pleasant Valley; Kelly B. Pushong, Highland; Michael D. Swanson, Poughkeepsie, all of N.Y.

[73] Assignee: International Business Machines Corporation, Armonk, N.Y.

[21] Appl. No.: 607,053

[22] Filed: Feb. 26, 1996

Related U.S. Application Data

[63] Continuation of Ser. No. 148,075, Nov. 1, 1993, abandoned.

[51] Int. Cl.$^6$ .............................. G06F 12/12; G06F 13/38
[52] U.S. Cl. .................. 395/674; 395/500; 395/200.02; 395/800; 364/DIG. 1; 364/DIG. 2
[58] Field of Search ........................ 395/800, 500, 395/650, 866, 200.08, 200.02, 839; 364/DIG. 1, DIG. 2; 370/60, 85.9; 340/825.44

[56] References Cited

U.S. PATENT DOCUMENTS

| | | | |
|---|---|---|---|
| 4,697,232 | 9/1987 | Brunelle et al. | 395/866 |
| 4,899,333 | 2/1990 | Roediger | 370/60 |
| 4,932,024 | 6/1990 | Bonicioli et al. | 370/85.9 |
| 4,980,818 | 12/1990 | Shinmura | 395/425 |
| 5,006,978 | 4/1991 | Neches | 395/650 |
| 5,027,271 | 6/1991 | Curley et al. | 395/725 |
| 5,155,854 | 10/1992 | Flynn et al. | 395/725 |
| 5,170,472 | 12/1992 | Cwiakala et al. | 395/275 |
| 5,253,344 | 10/1993 | Bostick et al. | 395/275 |
| 5,257,379 | 10/1993 | Cwiakala et al. | 395/700 |
| 5,297,262 | 3/1994 | Cox et al. | 395/325 |
| 5,327,560 | 7/1994 | Hirata et al. | 395/700 |
| 5,345,590 | 9/1994 | Ault et al. | 395/650 |
| 5,355,126 | 10/1994 | Nelson et al. | 340/825.44 |
| 5,410,691 | 4/1995 | Taylor | 395/600 |

OTHER PUBLICATIONS

DFSMS/MVS 1.1 Storage Administration Reference For DFP, IBM Publication No. SC26–4920, Chapters 2, 11 and 15.

*Primary Examiner*—Daniel H. Pan
*Attorney, Agent, or Firm*—Bernard M. Goldman; JoAnn K. Crockatt

[57] ABSTRACT

A method and system for managing one or more coupling facilities in a data processing system. An active policy is used to control resources located in the coupling facilities. The active policy can be changed such that control of the resources can be altered. Compatible changes are made immediately and incompatible changes are made at a subsequent time. Recorded in the active policy and in the coupling facilities is information regarding the resources. When the information in the active policy is not in synchronization with the information in the coupling facilities, a reconciliation technique is performed. The resources in the coupling facilities can be modified but prior to the modification, the intended modifications are stored in the active policy.

27 Claims, 54 Drawing Sheets

LOCAL-CACHE CONTROL BLOCK (LCCB)

| | |
|---|---|
| LOCAL CACHE IDENTIFIER | (LCID) |
| ATTACHMENT STATUS | (AS) |
| LOCAL-CACHE TOKEN | (LCT) |
| LOCAL-CACHE AUTHORITY | (LCAU) |
| SYSTEM IDENTIFIER | (SYID) |
| ATTACHMENT INFORMATION | (AINF) |
| DETACHMENT RESTART TOKEN | (DURT) |

CACHE-STRUCTURE CONTROLS

| | |
|---|---|
| TOTAL-DIRECTORY-ENTRY COUNT | (TDEC) |
| TOTAL-DATA-AREA-ELEMENT COUNT | (TDAEC) |
| ADJUNCT-ASSIGNMENT INDICATOR | (AAI) |
| MAXIMUM STORAGE CLASS | (MSC) |
| MAXIMUM CAST-OUT CLASS | (MCC) |
| DATA-AREA-ELEMENT CHARACTERISTIC | (DAEX) |
| MAXIMUM DATA-AREA SIZE | (MDAS) |
| STRUCTURE SIZE | (SS) |
| MAXIMUM STRUCTURE SIZE | (MXSS) |
| MINIMUM STRUCTURE SIZE | (MNSS) |
| STRUCTURE AUTHORITY | (SAU) |
| USER STRUCTURE CONTROL | (USC) |
| LCID VECTOR | (LCIDV) |

*fig. 4*     69

DIRECTORY INFORMATION BLOCK

72

| | |
|---|---|
| NAME | (N) |

78

| | |
|---|---|
| USER-DATA FIELD | (UDF) |
| STORAGE CLASS | (SC) |
| CHANGE INDICATOR | (C) |
| DATA-CACHED INDICATOR | (D) |
| CAST-OUT-PARITY-BITS INDICATOR | (CP) |
| CAST-OUT CLASS | (CC) |
| CAST-OUT-LOCK VALUE | (CLV) |
| DATA-AREA SIZE | (DAS) |

80

| | |
|---|---|
| LOCAL-CACHE IDENTIFIER | (LCID) |
| LCEN-VALIDITY INDICATOR | (LVI) |
| LOCAL-CACHE ENTRY NUMBER | (LCEN) |

LIST-STRUCTURE CONTROLS

| | | |
|---|---|---|
| MAXIMUM DATA-LIST-ENTRY SIZE | (MDLES) | |
| LIST-STRUCTURE TYPE | (LST) | |
| LOCK-TABLE-ENTRY CHARACTERISTIC | (LTEX) | |
| LIST-ELEMENT CHARACTERISTIC | (LELX) | |
| MINIMUM STRUCTURE SIZE | (MNSS) | |
| LOCK-TABLE-ENTRY COUNT | (LTEC) | 92 |
| LIST COUNT | (LC) | |
| STRUCTURE SIZE | (SS) | |
| MAXIMUM STRUCTURE SIZE | (MXSS) | |
| MAXIMUM LIST-SET-ELEMENT COUNT | (MLSELC) | |
| LIST-SET-ELEMENT COUNT | (LSELC) | |
| NON-ZERO-LOCK-TABLE-ENTRY COUNT | (NLTEC) | |
| MAXIMUM LIST-SET-ENTRY COUNT | (MLSELC) | |
| LIST-SET-ENTRY COUNT | (LSEC) | |
| STRUCTURE AUTHORITY | (SAU) | |
| USER STRUCTURE CONTROL | (USC) | |
| USER-IDENTIFIER VECTOR | (UIDV) | |

*fig. 8*

LIST–USER CONTROL BLOCK (LUCB)

| | |
|---|---|
| USER IDENTIFIER | (UID) |
| USER STATE | (US) |
| LIST–NOTIFICATION TOKEN | (LNT) |
| USER AUTHORITY | (UAU) |
| SYSTEM IDENTIFIER | (SYID) |
| USER–ATTACHMENT CONTROL | (UAC) |
| DETACHMENT RESTART TOKEN | (DURT) |

LIST ENTRY CONTROL BLOCK (LECB)

| | |
|---|---|
| DATA–LIST–ENTRY SIZE | (DLES) |
| LIST NUMBER | (LN) |
| LIST–ENTRY IDENTIFIER | (LEID) |
| VERSION NUMBER | (VN) |
| LIST–ENTRY KEY | (LEK) |
| LIST–ENTRY NAME | (LEN) |

LIST CONTROLS

| | |
|---|---|
| LIST-ENTRY-COUNT LIMIT | (LECL) |
| LIST-ENTRY-COUNT | (LEC) |
| LIST-STATE-TRANSITION COUNT | (LSTC) |
| LIST AUTHORITY | (LAU) |
| USER LIST CONTROLS | (ULC) |

LIST-MONITOR-TABLE ENTRY 0

LIST-MONITORING-ACTIVE BIT    (LMAB)

LIST-NOTIFICATION-REQUEST TYPE  (LNRT)

LIST-NOTIFICATION-ENTRY NUMBER  (LNEN)

LIST-MONITOR-TABLE ENTRY 1

LIST-MONITORING-ACTIVE

LIST-NOTIFICATION-REQUEST TYPE

LIST-NOTIFICATION-ENTRY NUMBER

• • •

LIST-MONITOR-TABLE ENTRY n

LIST-MONITORING-ACTIVE

LIST-NOTIFICATION-REQUEST TYPE

LIST-NOTIFICATION-ENTRY NUMBER

REQUEST/RESPONSE OPERANDS

| | |
|---|---|
| ATTACHMENT INFORMATION | (AINF) |
| COMPARATIVE LOCAL-CACHE AUTHORITY | (CLCAU) |
| COMPARATIVE STRUCTURE AUTHORITY | (CSAU) |
| COMPARATIVE USER AUTHORITY | (CUAU) |
| DETACHMENT-REQUEST TYPE | (DRT) |
| LIST-MONITORING-ACTIVE BIT | (LMAB) |
| LIST-NOTIFICATION-ENTRY NUMBER | (LNEN) |
| LIST-NOTIFICATION-TOKEN | (LNT) |
| LCID-UNASSIGNMENT CONTROL | (LUC) |
| LOCAL-CACHE AUTHORITY | (LCAU) |
| LOCAL-CACHE-ENTRY NUMBER | (LCEN) |
| LOCAL-CACHE IDENTIFIER | (LCID) |
| LOCAL-CACHE TOKEN | (LCT) |
| STRUCTURE AUTHORITY | (SAU) |
| USER-ATTACHMENT CONTROL | (UAC) |
| USER AUTHORITY | (UAU) |
| USER IDENTIFIER | (UID) |
| USER STATE | (US) |
| USER STRUCTURE CONTROL | (USC) |
| ALLOCATON TYPE | (AT) |

*fig. 13*

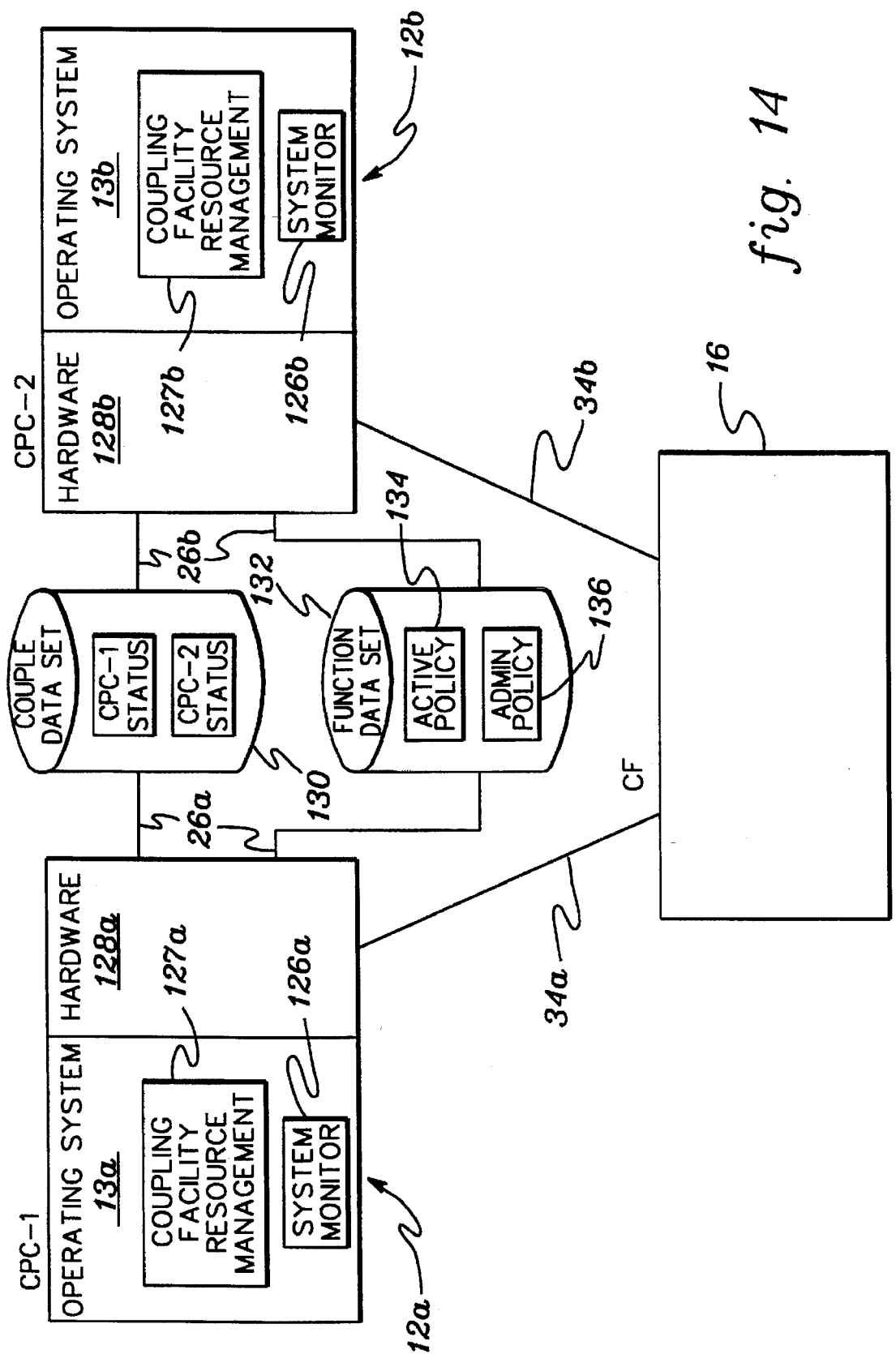

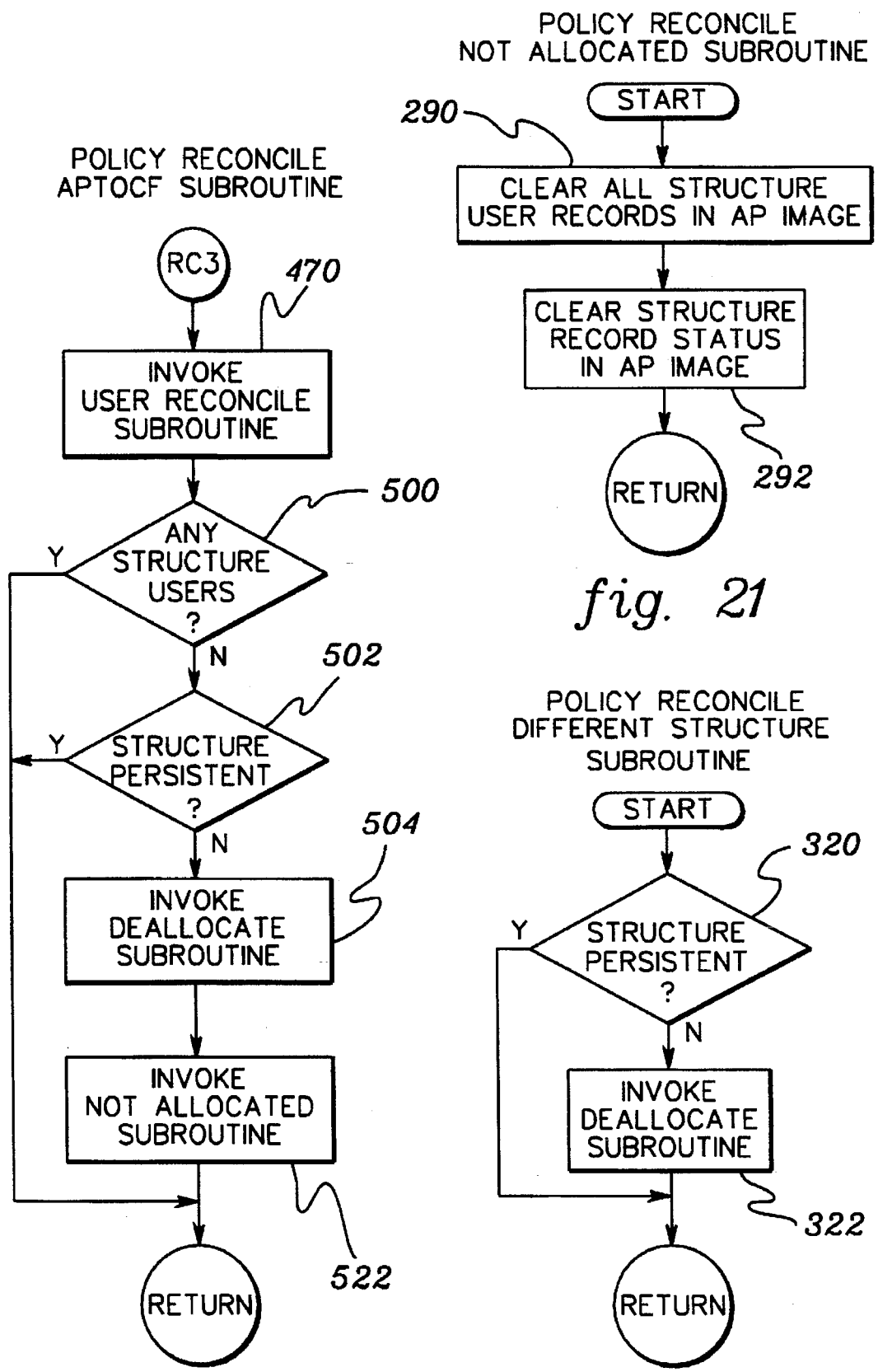

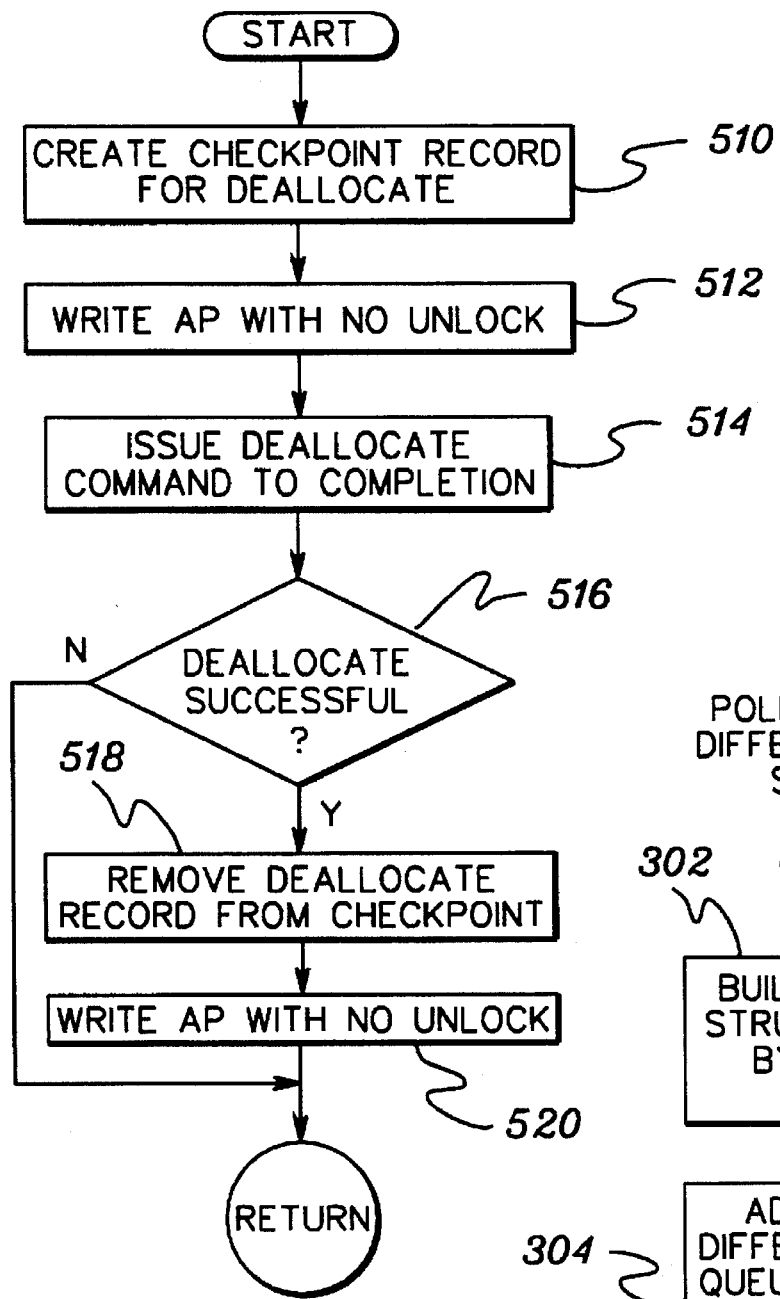
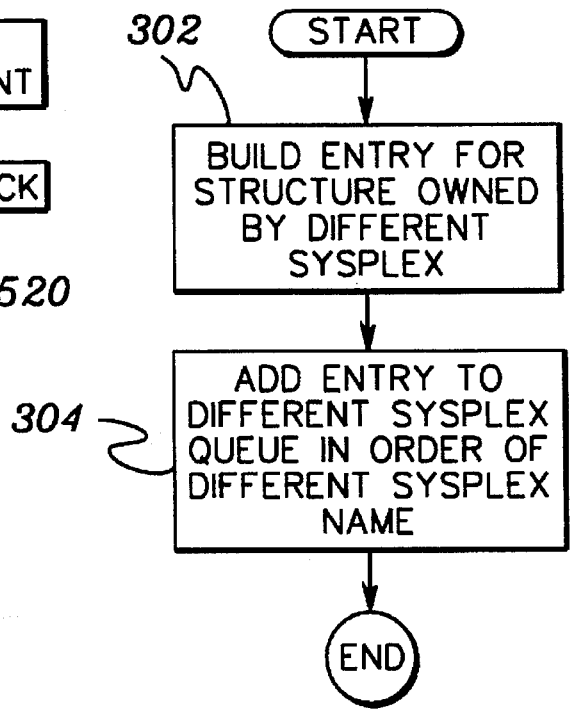
fig. 27
fig. 22

POLICY RECONCILE CFTOAP SUBROUTINE

POLICY RECONCILE
CFTOAP SUBROUTINE

ALLOCATE STRUCTURE (CONTINUED)

METHOD OF MANAGING RESOURCES IN ONE OR MORE COUPLING FACILITIES COUPLED TO ONE OR MORE OPERATING SYSTEMS IN ONE OR MORE CENTRAL PROGRAMMING COMPLEXES USING A POLICY

This application is a continuation of application Ser. No. 08/148,075, filed Nov. 1, 1993, now abandoned.

TECHNICAL FIELD

This invention relates in general to the field of data processing and, in particular, to providing a mechanism which enables customers to manage one or more coupling facilities located in a data processing system.

CROSS REFERENCE TO RELATED APPLICATIONS

This application contains subject matter which is related to the subject matter of the following applications which are assigned to the same assignee as this application. Each of the below listed applications is hereby incorporated by reference in its entirety:

"Configurable, Recoverable Parallel Bus," by N. G. Bartow et al., Ser. No. 07/839,657, (Docket No. PO9-91-066), Filed: Feb. 20, 1992 now U.S. Pat. No. 5,357,608;

"High Performance Intersystem Communications For Data Processing Systems," by N. G. Bartow et al., Ser. No. 07/839,652, (Docket No. PO9-91-067), Filed: Feb. 20, 1992 now U.S. Pat. No. 5,412,803;

"Frame-Group Transmission And Reception For Parallel/Serial Buses," by N. G. Bartow et al., Ser. No. 07/839,986, (Docket No. PO9-92-001), Filed: Feb. 20, 1992 now U.S. Pat. No. 5,267,240;

"Communicating Messages Between Processors And A Coupling Facility," by D. A. Elko et al., Ser. No. 07/860,380, (Docket No. PO9-91-006), Filed: Mar. 30, 1992 now abandoned;

"Sysplex Shared Data Coherency Method And Means," by D. A. Elko et al., Ser. No. 07/860,805, (Docket No. PO9-91-052), Filed: Mar. 30, 1992 now U.S. Pat. No. 5,537,574;

"Method And Apparatus For Distributed Locking Of Shared Data, Employing A Central Coupling Facility," by D. A. Elko et al., Ser. No. 07/860,808, (Docket No. PO9-91-059), Filed: Mar. 30, 1992 now U.S. Pat. No. 5,339,427;

"Command Quiesce Function," by D. A. Elko et al., Ser. No. 07/860,330, (Docket No. PO9-91-062), Filed: Mar. 30, 1992 now U.S. Pat. No. 5,539,405;

"Storage Element For A Shared Electronic Storage Cache," by D. A. Elko et al., Ser. No. 07/860,807, (Docket No. PO9-91-078), Filed: Mar. 30, 1992 now U.S. Pat. No. 5,457,793;

"Management Of Data Movement From A SES Cache To DASD," by D. A. Elko et al., Ser. No. 07/860,806, (Docket No. PO9-91-079), Filed: Mar. 30, 1992 now U.S. Pat. No. 5,493,668;

"Command Retry System," by D. A. Elko et al., Ser. No. 07/860,378, (Docket No. PO9-92-002), Filed: Mar. 30, 1992 now U.S. Pat. No. 5,392,397;

"Integrity Of Data Objects Used To Maintain State Information For Shared Data At A Local Complex," by D. A. Elko et al., Ser. No. 07/860,800, (Docket No. PO9-92-003), Filed: Mar. 30, 1992 now U.S. Pat. No. 5,331,673;

"Management Of Data Objects Used To Maintain State Information For Shared Data At A Local Complex," by J. A. Frey et al., Ser. No. 07/860,797, (Docket No. PO9-92-004), Filed: Mar. 30, 1992 now U.S. Pat. No. 5,388,266;

"Recovery Of Data Objects Used To Maintain State Information For Shared Data At A Local Complex," by J. A. Frey et al., Ser. No. 07/860,647, (Docket No. PO9-92-005), Filed: Mar. 30, 1992 now U.S. Pat. No. 5,394,592;

"Message Path Mechanism For Managing Connections Between Processors And A Coupling Facility," by D. A. Elko et al., Ser. No. 07/860,646, (Docket No. PO9-92-006), Filed: Mar. 30, 1992 now abandoned;

"Method And Apparatus For Notification Of State Transitions For Shared Lists Of Data Entries," by J. A. Frey et al., Ser. No. 07/860,809, (Docket No. PO9-92-007), Filed: Mar. 30, 1992 now U.S. Pat. No. 5,390,328;

"Method And Apparatus For Performing Conditional Operations On Externally Shared Data," by J. A. Frey et al., Ser. No. 07/860,655, (Docket No. PO9-92-008), Filed: Mar. 30, 1992 now abandoned;

"Apparatus And Method For List Management In A Coupled DP System," by J. A. Frey et al., Ser. No. 07/860,633, (Docket No. PO9-92-009), Filed: Mar. 30, 1992 now U.S. Pat. No. 5,410,695;

"Interdicting I/O And Messaging Operations In A Multi-System Complex," by D. A. Elko et al., Ser. No. 07/860,489, (Docket No. PO9-92-010), Filed: Mar. 30, 1992 now U.S. Pat. No. 5,394,554;

"Method And Apparatus For Coupling Data Processing Systems," by Elko et al., Ser. No. 07/860,803, (Docket No. PO9-92-012), Filed: Mar. 30, 1992 now U.S. Pat. No. 5,317,739;

"Authorization Method For Conditional Command Execution," by Elko et al., Ser. No. 08/021,285, (Docket No. PO9-92-018), Filed: Feb. 22, 1993 now abandoned.

"A Dumping Service Facility For Multisystem Environment," by Elko et al., Ser. No. 08/073,909 (Docket No. PO9-92-068), Filed: Jun. 08, 1993;

"A Method And System For Capturing and Controlling Access To Information In A Coupling Facility," by Neuhard et al., Ser. No. 08/146,647 (Docket No. KI9-93-004), Filed Nov. 1, 1995; and "A Method And System For Managing Data and Users Of Data In A Data Processing System," by Allen et al., Ser. No. 08/146,727 (Docket No. KI9-93-009), Filed Nov. 1, 1993, now U.S. Pat. No. 5,465,359.

BACKGROUND ART

Use of policy information provided by customers to control utilization of data processing resources is well known within the industry. For example, the Data Facilities Product (DFP) Systems Managed Storage (SMS) product from International Business Machines Corporation provides for the definition of policy information to control the placement and management of data sets on DASD. SMS policy support is described in DFSMS/MVS 1.1 Storage Administration Reference for DFP (SC26-4920), Chapters 2, 11 and 15, which is incorporated herein by reference in its entirety.

The SMS documentation describes the manner in which customers control a DASD configuration. In particular, there is a control data set called COMMDS (communication data set) that is shared and accessed by all systems in a SMS configuration. Each of the participating systems access COMMDS on a default of 15 secs (which can be changed from 1 to 999 secs). Inactive policies are kept in a data set called SCDS (Source Control Data Set). This is validated and activated through interactive programming services or operator command on any one of the systems in the configuration.

The process of activation puts the active policy in another data set called ACDS (Active Control Data Set) and records the change of the configuration in the COMMDS. All systems, when they access the COMMDS, recognize this and use the new ACDS and COMMDS. ACDS is also shared by all processors in a configuration. Therefore, there is a single policy that is active, is changeable through command from any system, is system wide and does not require system reinitialization. Some operator commands will result in updating ACDS and COMMDS. But, to add new processors, storage groups, volumes or libraries, the interactive programming services must be used to add, delete, or remove entries in an SCDS, validate and activate the new policy. If the validation step fails, the old configuration is retained. Because of the validation, there can be nothing incompatible between the old configuration and the new configuration defined by policy. The old set (SCDS, ACDS and COMMDS) is not checked with the new set.

There is no duplication of information in SMS between the ACDS and control information stored on DASD. Therefore, if the COMMDS or ACDS become unusable, the user can allocate a new one and copy the information from the SCDS, or activate the same or a different SCDS. SMS also keeps an in-storage copy of ACDS. Therefore, if an ACDS becomes unusable, all systems can continue to work.

Several disadvantages are associated with the current mechanisms for managing permanent storage facilities. Notably, the current techniques do not assist in reclaiming storage areas when those areas are no longer needed and processing associated with policies which are used to direct allocation of storage areas assume that no errors have been made by the system's administrator.

Reclaim of storage areas occurs outside the current mechanisms for storage allocation policy management. There are no current facilities for tracking the set of users associated with an allocated storage area, no processing for maintaining the status of users of an allocated storage area at the storage facility, and no capabilities for insuring reclaim of storage areas no longer needed occurs in a timely way and transparently to users of the storage area should changes in the configuration make it not possible to access the storage facility at the time a storage area is to be released. As there currently does not exist any mechanism for tracking users of a storage area, nor management of resource re-use, there are no facilities for managing delays in reclaiming storage areas nor any possible inconsistencies between policy information regarding storage areas in use and their users, and the status recorded at the storage facility.

As it is always assumed that any and all changes made by the systems administrator are to take immediate effect, there is no management of incompatible changes nor pending policy changes.

SUMMARY OF THE INVENTION

The shortcomings of the prior art are overcome and additional advantages are provided through the provision of a method for managing one or more coupling facilities located in a data processing system. An active policy for controlling resources in at least one of the coupling facilities is used. The active policy is changed in order to alter control of the resources. Compatible changes to the active policy are made immediately and incompatible changes are stored for subsequent implementation.

In a further embodiment, the incompatible changes are implemented. In one example, they are implemented by removing use of the coupling facilities associated with the incompatible changes when the resources located within the coupling facilities are no longer actively being used.

In another embodiment of the invention, a method for managing one or more coupling facilities is provided. In at least one of the coupling facilities and an active policy, information regarding resources stored within the coupling facility is recorded. When the information in the coupling facility and the active policy is not in synchronization, it is reconciled.

In another embodiment of the invention, a method for managing resources of coupling facilities located in a data processing system is provided. One or more of the resources located within a coupling facility can be modified. However, prior to modifying the resources, the intended modifications are recorded.

In another aspect of the invention, a system for managing one or more coupling facilities located in a data processing system is provided. An active policy for controlling resources in at least one of the coupling facilities is used. Means for changing the active policy is provided such that control of the resources can be altered. Compatible changes to the active policy are made immediately and incompatible changes are stored for subsequent implementation.

In another embodiment of the invention, a system for managing one or more coupling facilities is provided. Means are provided for recording in at least one of the coupling facilities and an active policy information regarding resources stored within the coupling facility. When the information in the coupling facility and the active policy is not in synchronization, means are including for reconciling the information.

In another embodiment of the invention, a system for managing resources of coupling facilities located in a data processing system is provided. Means are included for modifying one or more of the resources located within a coupling facility. Means are also provided for recording the intended modifications prior to modifying the resources.

In accordance with the principles of the present invention, a mechanism is provided which advantageously allows automation of the operation of functions by providing administrative specification rather than requiring operator actions or program intervention. Further, the present invention enables the changing of an active policy wherein incompatible changes are stored and executed when possible. In addition, if the active policy becomes out of synchronization with the Coupling facilities, capabilities are provided for reconciling the active policy with the coupling facilities. Further, the present invention advantageously enables the recordation of intended modifications to resources within the coupling facilities prior to making the modifications. This aids in recovery processing of the coupling facilities if the operating systems should fail or lose connectivity with the coupling facility.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 4 depicts one example of the controls associated with a cache structure, in accordance with the principles of the present invention;

FIG. 6 depicts one embodiment of a directory information block in connection with the directory depicted in FIG. 3, in accordance with the principles of the present invention;

FIG. 8 depicts one example of the controls associated with the list structure of FIG. 7, in accordance with the principles of the present invention;

FIG. 9 depicts one embodiment of a list-user control block, in accordance with the principles of the present invention;

FIG. 10 depicts one example of the controls associated with a list within the list structure of FIG. 7, in accordance with the principles of the present invention;

FIG. 11 illustrates one example of a list entry control block, in accordance with the principles of the present invention;

FIG. 13 depicts one embodiment of request/response operands, in accordance with the principles of the present invention;

FIG. 14 illustrates one example of an overview diagram depicting an active policy coupled to central processing complexes, in accordance with the principles of the present invention;

FIGS. 20a–20c depict one embodiment of an active policy to coupling facility subroutine associated with the policy reconciliation routine of FIGS. 19a–19c, in accordance with the principles of the present invention;

FIG. 21 depicts one embodiment of a policy reconciliation not allocated subroutine, in accordance with the principles of the present invention;

FIG. 22 depicts one embodiment of a policy reconciliation different sysplex subroutine, in accordance with the principles of the present invention;

FIG. 23 depicts one embodiment of the logic associated with a policy reconciliation different structure subroutine, in accordance with the principles of the present invention;

FIG. 27 depicts one embodiment of a deallocate subroutine associated with the policy reconciliation subroutine of FIGS. 19a–19c, in accordance with the principles of the present invention;

BEST MODE FOR CARRYING OUT THE INVENTION

In accordance with the principles of the present invention, a mechanism is provided which enables customers to manage one or more coupling facilities located in a data processing system. In particular, an active policy is provided through which customers of the data processing system can control utilization of the coupling facilities. Customers are given the ability to initially define the active policy and make subsequent changes to the policy. As described below, the policy can be changed during ongoing operation of the system. Some changes may be made immediately, while others may have to wait, as described in detail below. In addition, a capability is provided for tracking the status of changes. Further, if information in a coupling facility is out of synchronization with information stored in the active policy, a reconciliation mechanism is provided.

Figure 1:
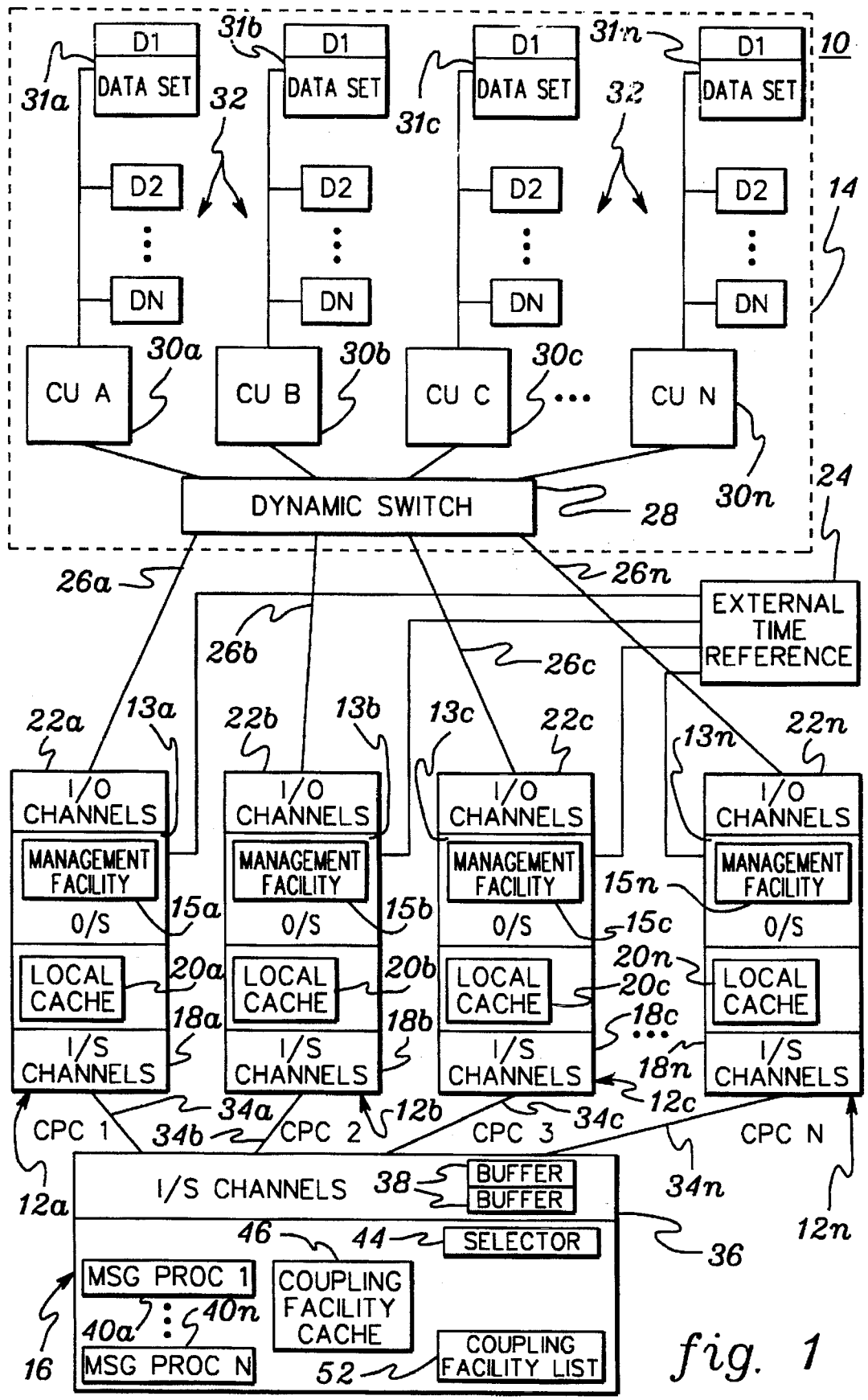
FIG. 1 depicts one example of a block diagram of a data processing system incorporating the management facility of the present invention.

FIG. 1 is a block diagram of a data processing system 10 incorporating the management facility of the present invention. Data processing system 10 includes multiple central processing complexes (CPCs) 12a through 12n which are coupled to an input/output (I/O) system 14 and a coupling facility 16. (As used herein, central processing complexes 12a–12n are collectively referred to as central processing complex (CPC) 12.) The main components associated with each central processing complex 12, input/output system 14 and coupling facility 16 are described in detail below. (In another embodiment, data processing system 10 (also referred to as a sysplex) may include a plurality of coupling facilities. Further, while the invention is described in relation to a multisystem environment, such as the one depicted in FIG. 1, it can also be used with a single system environment, which includes one central processing complex 12.)

Each of the CPCs 12a–12n may be an International Business Machines' (IBM) system following the Enterprise Systems Architecture/390 Principles of Operation as described in IBM publication SA22-7201-00, which is hereby incorporated by reference in its entirety. Each of CPCs 12a–12n includes one or more central processing units (CPUs) (not shown) which executes an operating system 13a–13n, respectively. As used herein, operating systems 13a–13n are collectively referred to as operating system 13. In one instance, operating system 13 is an International Business Machines' Multiple Virtual Storage (MVS) operating system for controlling execution of programs and the processing of data, as is well known. In addition, in accordance with the principles of the present invention, each operating system 13a–13n includes a management facility 15a–5n, respectively, for managing one or more coupling facilities in a data processing system, as described in detail herein.

In addition, each CPC 12a–12n contains a plurality of intersystem (I/S) channels 18a–18n, a plurality of local caches 20a–20n, and a plurality of input/output (I/O) channels 22a–22n, respectively. (Local caches 20a–20n are referred to herein collectively as local cache 20. Similarly, intersystem channels 18a–18n and input/output channels 22a–22n are collectively referred to as intersystem channels 18 and input/output channels 22, respectively.) It will be understood that input/output channels 22 are part of the well known channel subsystem (CSS), which also includes intersystem channels 18 disclosed herein, even though channels 18 and 22 are shown separately in FIG. 1 for convenience.

Coupled to each CPC 12a–12n is an external time reference (ETR) 24, which provides time stamps of control information to be written into a log to document recovery from failures, backing out of undesired operations and for audit trails. External time reference 24, which uses fiber optic interconnect cables, synchronizes the time clocks (not shown) of CPCs 12a–12n to a precision equal to or greater than the duration of the shortest externally visible operation. External time reference 24 provides for cable length propagation time differences, where those differences are important, in order to be able to maintain synchronization to within the length of the mentioned external operation.

As depicted in FIG. 1, each central processing complex 12a–12n is coupled via a link 26a–26n, respectively, to input/output system 14. Input/output system 14 includes, for example, a dynamic switch 28, which controls access to multiple input/output (I/O) control units (CU) 30a through 30n and one or more direct access storage devices (DASD) D1 through DN (collectively referred to as DASD 32), which are controlled by the control units. Dynamic switch 28 may be an ESCON Director Dynamic Switch available from IBM Corporation, Armonk, N.Y. Such a dynamic switch is disclosed in U.S. patent application Ser. No. 07/429,267 for "Switch and its Protocol," filed Oct. 30, 1989 and assigned to the owner of the present invention, which application is incorporated herein by reference in its entirety. As is known, input/output commands and data are sent from a central processing complex 12a–12n to an I/O control unit 30a–30n through dynamic switch 28 by means of I/O channels 22a through 22n of the respective CPCs 12a through 12n. Channel programs for a particular I/O channel are established by channel command words (CCWs), as is well known in the art.

One or more of direct access storage devices 32 includes one or more data sets 31a–31n, respectively. In particular, DASD 32 may include one or more couple data sets for storing status information relating to one or more CPCs 12 (i.e., read information for all CPCs and write information relating to one CPC) and/or one or more function data sets for storing the active and administrative policy information, as described in detail below. In one embodiment, the couple and function data sets are not stored on the same DASD data set or volume.

Each central processing complex 12a–12n is also coupled via a bus 34a–34n, respectively, to coupling facility 16. Coupling facility 16 contains storage accessible by the CPCs, performs operations requested by programs in the CPCs and maintains status regarding structures and users of structures located within the coupling facility. The coupling facility enables sharing of data, which is directly accessible by multiple operating systems. As described further below, the coupling facility contains control information regarding shared data and may contain shared data. In one embodiment, coupling facility 16 is a structured-external storage (SES) processor and includes, for example, a plurality of intersystem (I/S) channels 36 for communicating with intersystem channels 18a–18n, one or more buffers 38 located within intersystem channels 36 for storing data received from intersystem channels 18a–18n, message processors 40a –40n for handling messages, a selector 44 for directing message requests received over an intersystem channel to a message processor 40a –40n, a coupling facility cache 46 and a coupling facility list 52, which are described in further detail below. Even though only one coupling facility 16 is shown in the embodiment of FIG. 1, it will be understood that multiple coupling facilities may be provided for, each with its own I/S channels and message paths connected to all or some subset of the CPCs 12a–12n.

Figures 2, 5:
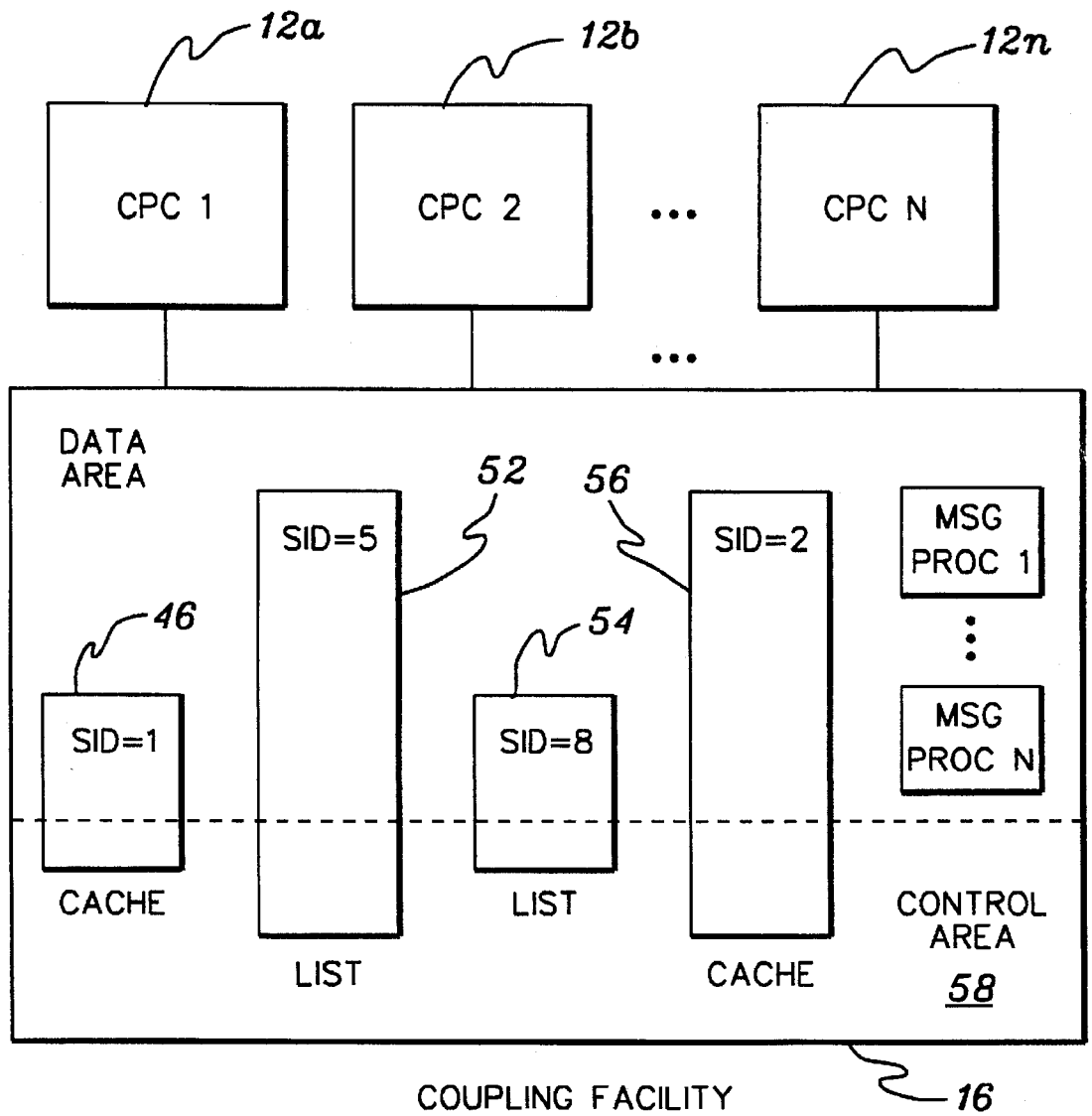
FIG. 2 depicts one example of a coupling facility including multiple storage structures, in accordance with the principles of the present invention.
FIG. 5 depicts one example of a local-cache control block associated with each local cache of the data processing system depicted in FIG. 1, in accordance with the principles of the present invention.

Coupling facility cache 46 of coupling facility 16 is one example of a coupling facility storage structure. As shown in FIG. 2, coupling facility 16 includes multiple storage structures, such as storage structures 46, 52, 54 and 56. The storage structures include, for instance, list structures (for example, 52 and 54) and cache structures (for example, 46 and 56). Each coupling facility storage structure contains data objects and control objects. The data objects may reside in any storage location, whereas the control objects are generally restricted to control area 58.

Allocated structures (such as cache structures 46 and 56 and list structures 52 and 54) reside in separate coupling facility storage locations and are located by a structure identifier (SID). The SID value provides an identification of a target structure by a command. A command of a particular structure type, such as a cache-structure or list-structure command, may only address or alter the contents of a single structure of the given type. The allocation of a structure is described in detail below.

Figure 3:
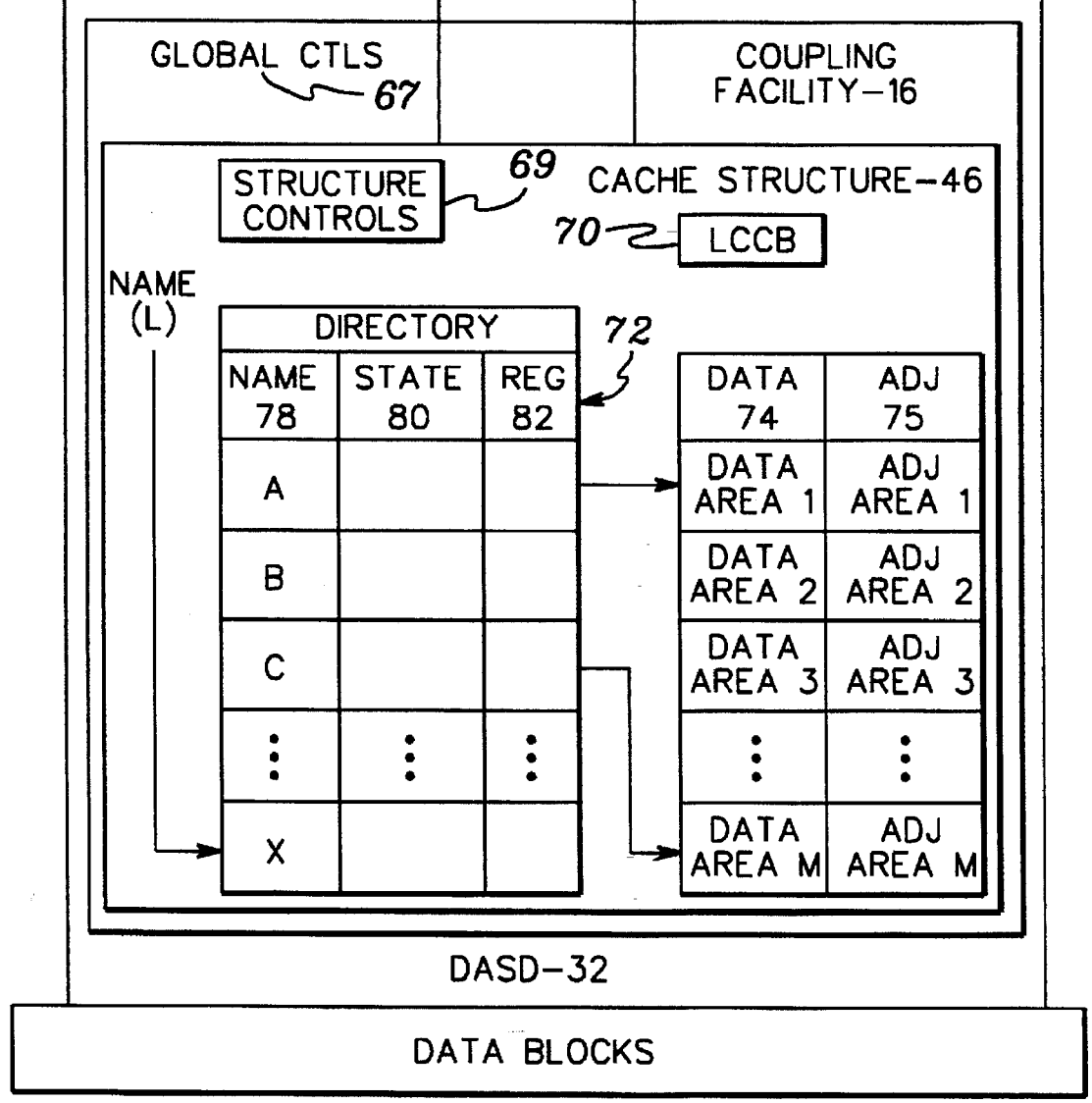
FIG. 3 depicts one embodiment of a three-level storage hierarchy in a network of attached processors, in accordance with the principles of the present invention.
Figure 7:
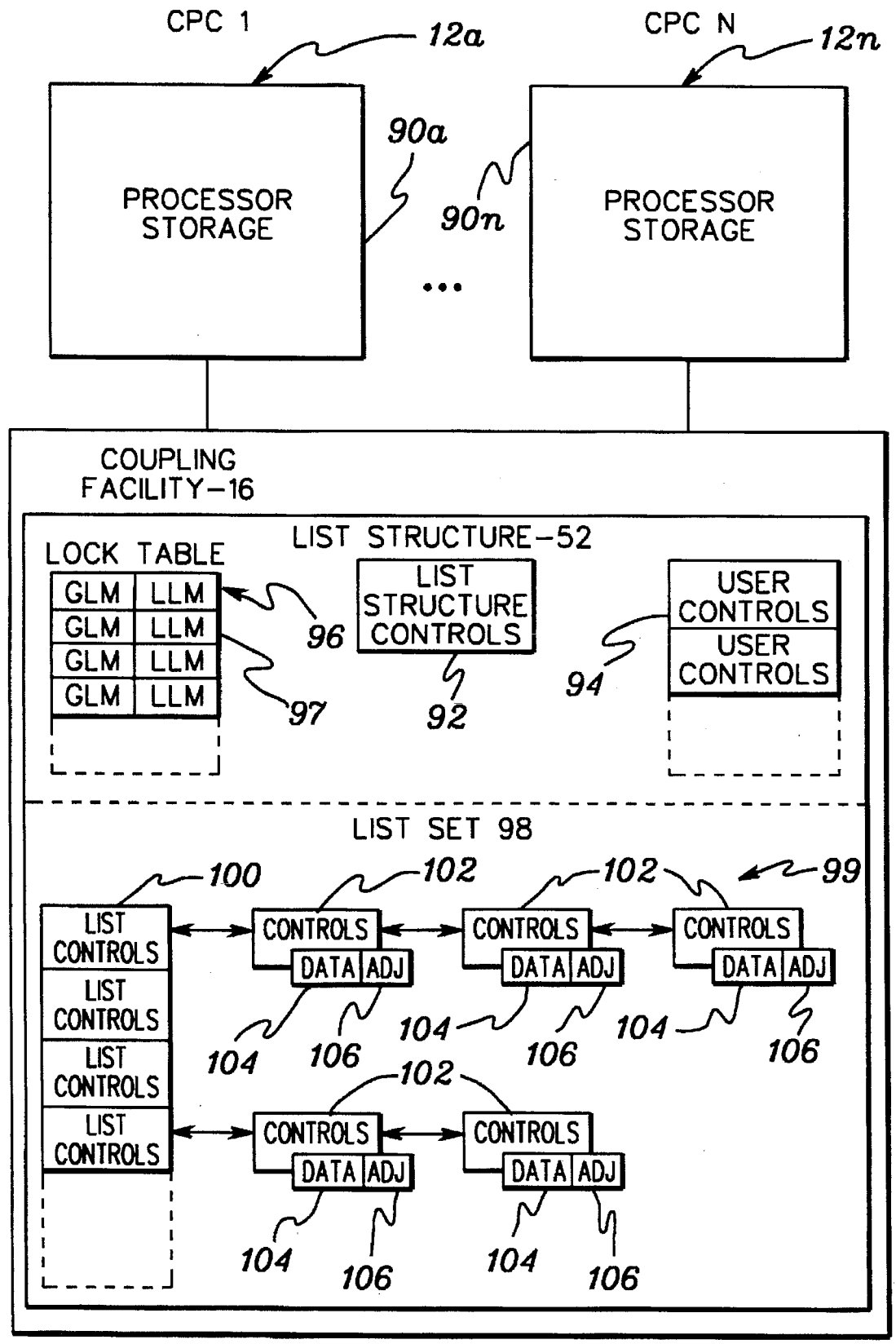
FIG. 7 depicts one example of a list structure, in accordance with the principles of the present invention.

The partitioning of the coupling facility storage and control area 58 into structures, as shown in FIGS. 2, 3 and 7, is managed by the operating system program. The data objects are organized in tables or lists with an optional adjunct data area. The remaining objects are controls. The relative amount of storage assigned to data and control objects is determined by program-specified parameters in the allocation commands.

Referring to FIG. 3, a three-level storage hierarchy in a network of attached processors 12a–12n is described. The lowest level of the hierarchy is DASD 32, the intermediate level is coupling facility cache structure 46, and the highest level is local cache 20 (e.g., local caches 20a and 20b). Each of these levels is described below.

Direct access storage devices 32 include data blocks which represent data stored in the devices. Local caches 20a and 20b include, for instance, a 16-byte name field 60A, 60B for referencing data; a data field 64A, 64B for storing the data; an optional adjunct data field 66A, 66B for additional data; and a state field 68A, 68B, respectively, for indicating whether the data is valid or invalid. When the data is located in local cache 20, the state of the data is either valid or invalid. The data is validated by CPU instructions and invalidated by, for example, SES-write and SES-invalidate operations. The valid state of the data is tested by a CPU instruction. A valid named data object must be registered in a coupling facility cache directory, described below, in order to maintain local cache coherency. Local cache coherency is maintained by the invalidation process. A registered local-cache entry may test as invalid.

Cache structure 46 includes, for instance, a number of cache structure controls 69, a number of local-cache control blocks (LCCB) 70, a directory 72, a data area 74, and an adjunct area 75, each of which is explained in further detail below.

As shown in FIG. 4, cache structure controls 69 include, for instance, the following controls:

(a) Total-Directory-Entry Count (TDEC): A value that specifies the number of directory entries allocated for the cache.

(b) Total-Data-Area-Element Count (TDAEC): A value that specifies the number of data-area elements allocated for the cache.

(c) Adjunct-Assignment Indicator (AAI): A value that indicates the presence or absence of adjunct areas. Two possible values are: adjunct areas not assigned; adjunct areas assigned. When adjunct areas are assigned, an adjunct area is associated with each directory entry.

(d) Maximum Storage Class (MSC): A value that specifies the number of storage classes. Valid storage class values range from one to the maximum storage class value.

(e) Maximum Cast-Out Class (MCC): A value that specifies the number of cast-out classes. Valid cast-out class values range from one to the maximum cast-out class value.

(f) Data-Area-Element Characteristic (DAEX): A value that specifies the number of bytes in each data-area element. The size of the data-area element in bytes is the product of 256 and 2 raised to the power of the value specified in the data-area element characteristic.

(g) Maximum Data-Area Size (MDAS): A value that specifies the maximum allowable size of a data area as an integral multiple of the data-area-element size. The maximum data-area size is set by the program when the cache is allocated.

(h) Structure Size (SS): A value that specifies the number of units of, for example, SES storage allocated for the cache.

(i) Maximum Structure Size (MXSS): A value that specifies the maximum number of units of SES storage that can be allocated for the cache.

(j) Minimum Structure Size (MNSS): A value that specifies the minimum number of units of SES storage that can be allocated for the cache.

(k) Structure Authority (SAU): A value associated with each bit in a SID vector, described herein. The structure authority has two parts: A time of day (TOD), which reflects the moment when a system was allocating the structure and the system ID used to make the TOD unique. Paired with the sysplex name, it further identifies who caused the structure to be allocated.

(l) User Structure Control (USC): A value defined by the user.

(m) LCID Vector (LCIDV): A bit string with an initial value of zero. The bit positions start at zero and increase sequentially to the local-cache-identifier limit. The bit at position (i) in the string is set to one when a local cache is attached with a local-cache identifier (LCID) value of (i). When the bit is one, the local-cache-identifier is assigned. The bit at position (i) is reset to zero when the local cache is detached and LCID unassignment is requested, when the cache structure is de-allocated, or when a SES power-on reset occurs. When the bit is zero, the local-cache-identifier is not assigned.

A local cache may have, for instance, local-cache states and local-cache-identifier states, described below:

Local-Cache States: A cache structure local cache exists when the associated local-cache identifier is assigned. When a local cache exists, it is either in the attached or the detached state. A local cache is placed in the attached state by an attach-local-cache command, described below. A local cache is placed in the detached state by a detach-local-cache command, also described below, when the detachment process is complete.

Local-Cache-Identifier States: A local-cache identifier is in the assigned state when the associated assigned bit in the local-cache-identifier vector is one. A local-cache identifier is placed in the assigned state by the attach-local-cache command. A local-cache identifier is in the unassigned state when the associated bit in the local-cache-identifier vector is zero. A local-cache identifier is placed in the unassigned state by the detach-local-cache command, depending on LCID-unassignment control, described herein.

As mentioned above, in addition to structure controls 69, cache structure 46 includes local-cache control block 70. Local-cache control block 70 includes a number of local cache controls, described below, which are initialized when a local cache is attached to a coupling facility cache. In one embodiment, local-cache control block 70 includes the following fields (FIG. 5):

(a) Local-Cache Identifier (LCID): A value that identifies a local cache. The controls are deleted when the local-cache identifier is unassigned and they are valid when the local-cache identifier is assigned.

(b) Attachment Status (AS): A control that describes the state of the attachment of a local cache. When the value of the attachment status is one, the local cache is active. When the value of the attachment status is zero, the local cache is inactive.

The attachment status controls the execution of commands that specify the local cache. When the local cache is active, all commands that specify the local cache are processed normally. When the local cache is inactive, all commands that specify the local cache, except attach local-cache, detach local-cache and read local-cache information are suppressed with a request-exception condition.

(c) Local-Cache Token (LCT): A value used to identify the local cache on the CPC.

(d) Local-Cache Authority (LCAU): A value set by the program when the local cache is attached.

(e) System Identifier (SYID): A value specified by the program when a message path, used to communicate commands and messages (as described in co-pending U.S. patent applications entitled, "Communicating Messages Between Processors And A Coupling Facility," by D. A. Elko et al., Ser. No. 07/860,380, (Docket No. PO9-91-006), Filed: Mar. 30, 1992 and "Message Path Mechanism For Managing Connections Between Processors And A Coupling Facility," by D. A. Elko et al., Ser. No. 07/860,646, (Docket No. PO9-92-006), Filed: Mar. 30, 1992, each of which is hereby incorporated herein by reference in its entirety) is activated. The system identifier is maintained in a message-path status vector and copied into the local cache controls when an attach-local-cache command is communicated over the message path.

(f) Attachment Information (AINF): A value set by the program when the local cache is attached.

(g) Detachment Restart Token (DURT): A value used to indicate how far along a detachment process has proceeded.

Referring back to FIG. 3, cache structure 46 also includes a directory 72. Directory 72 is a collection of directory entries positioned into storage classes and arranged as a fully associative array. The directory is a repository of state and location information for the storage hierarchy. The subset of changed directory entries is additionally positioned into cast-out classes. As described with reference to FIGS. 3 and 6, directory 72 includes a name field 78, a state field 80 for indicating the state of each directory entry and a register field 82, described below. Whenever a named data object is placed in the higher two levels of the storage hierarchy (i.e., coupling facility cache structure 46 and local cache 20), its name is registered in name column 78 and its state is registered in state column 80 by coupling facility cache directory 72. In general, state information indicates whether the data is changed, unchanged, locked for cast-out, or resident in coupling facility 16. In particular, state field 80 includes:

(a) A User-Data Field (UDF): The user-data field contains a value that is associated with the data when it is initially changed in the SES cache and is maintained until the data area is re-used. The user-data field is valid when the data is cached as changed.

(b) A Storage Class (SC): A value which identifies the storage class assigned for the name.

(c) A Change Indicator (C): A value which, in conjunction with the cast-out lock, indicates the changed state of the data. When the change bit is one, the data is cached as changed. When the change bit is zero and the data is not locked for cast-out, the data is either not cached, or is cached but not changed. When the change bit is zero and the data is locked for cast-out, the data is cached as changed. Whenever the data is in the changed state, the most recent version of the data resides in the cache. When the change bit is one, the data bit must also be one.

(d) A Data-Cached Indicator (D): A value which indicates whether the data is located in the SES cache. When the data bit is one, the data is cached. When the data bit is zero, the data is not cached.

(e) A Cast-Out-Parity-Bits Indicator (CP): A field which indicates the current assignment of the cast-out parity. Three possible values are: cast-out parity is zero; cast-out parity is one; the cast-out parity is unknown.

(f) A Cast-Out Class (CC): A value which identifies the cast-out class assigned for the name.

(g) A Cast-Out-Lock Value (CLV): A value which indicates the cast-out state of the data. When the cast-out lock is zero, the data is not being cast-out. When the cast-out lock is not zero, the value of the first byte of the cast-out lock identifies the local cache that is casting out the data block from the SES cache to DASD. The value of the second byte identifies the cast-out process on the local system. When the cast-out lock is not zero, the data bit must be one.

(h) A Data-Area Size (DAS): A value that specifies the size of the data area as an integral multiple of the data-area-element size. The initial value is zero when the directory entry is assigned and is zero until the data bit is set to one.

In addition to the above, register 82 is a table containing information on the location of the locally cached copies of the data block. Each row in the table corresponds to an attached local cache. The columns contain the local cache identifier (LCID), local-cache-entry number (LCEN) and a valid bit (LVI) for the local-cache-entry number. A valid local-cache-entry number is registered in the local-cache register when the registration process is executed for the specified name and local cache. A local-cache-entry number is invalidated when a local cache is detected, or when an invalidate-complement-copies process is executed for the specified name and the local cache is a member of the set of local caches being invalidated. The LCEN field is invalid, when LVI is zero.

Location information includes which of the local caches 20a–20n contains a copy. Certain SES-read and SES-write commands register the local cache copy in coupling facility directory 72. SES write and SES-invalidate commands remove the registration and invalidate local copies.

Cache structure 46 further includes data areas 74 and optional adjunct data areas 75. The data sizes are variable with the range of variability being, in one embodiment, between 1 and n times the data-area element size. The data-area element size is fixed for each coupling facility cache structure 46 and is a power of 2 with a minimum size of 256 bytes.

Coupling facility cache 46 is normally smaller than DASD storage 32. Thus, periodically, the changed data is transferred from cache 46 to the backing DASD 32 (FIG. 3). This process, called cast-out, is controlled by the operating system program. In one embodiment, a control associated with a cast-out class includes a cast-out class count, which indicates the number of elements associated with the cast-out class. Cast-out involves for a coupling facility, such as a SES facility, the following operations:

A SES-read for cast-out operation is issued that sets the cast-out serialization and copies the data block to main storage which may or may not be put in local cache 20.

An I/O operation is executed that copies the data block to DASD 32.

A SES-unlock cast-out locks operation is issued that releases the cast-out serialization.

Multiple cast-out processes may co-exist for a single one of local caches 20a–20n. Whenever data is locked for cast-out, an identifier for local cache 20a–20n and an identifier for the cast-out process are placed in directory 72. This is disclosed in U.S. patent application Ser. No. 07/860,806 for "Management of Data Movement from a SES Cache to DASD" by D. A. Elko, et al. (Attorney Docket No. PO9-91-079), incorporated herein by reference in its entirety as noted.

Described in detail above is one example of a cache storage structure. In addition to cache structures, there are list structures, such as list structure 52, depicted in FIGS. 2 and 7. Referring to FIG. 7, the contents of a list structure, such as list structure 52, are described in detail.

List structure 52 resides within coupling facility 16. As shown in FIG. 7, in one embodiment, coupling facility 16 is coupled to processor storage 90a–90n located within each CPC 12a–12n, respectively. List structure 52 includes list-structure controls 92, user controls 94 and, optionally, a lock table 96, and/or a list set 98. List set 98 includes list controls 100 and list-entry controls 102. Each of the components of list structure 52 is described in detail below.

List structure controls 92 contain attributes of the structure and are initialized when list structure 52 is created. One example of the controls associated with list structure controls 92 is depicted in FIG. 8. Referring to FIG. 8, list structure controls 92 include:

(a) Maximum Data-List-Entry Size (MDLES): An object or field that specifies the maximum size of the data list entry.

(b) List-Structure Type (LST): An object or field that indicates the list objects created on allocation. A field contains a counter indicator (CI), a lock indicator (LI), a data indicator (DI), an adjunct indicator (AI), a name indicator (NI) and a key indicator (KI).

The counter indicator specifies that either: a list-entry count and list-entry-count limit are defined or a list-element count and list-element-count limit are defined.

The lock indicator specifies whether or not a lock table is created.

The data and adjunct indicators specify whether: no list-set is created; list entries have adjunct only; list entries have data only; or list entries have data and adjunct in the list entries.

The name indicator specifies whether or not list entries are named.

The key indicator specifies whether or not the list entries are keyed.

(c) Lock-Table-Entry Characteristic (LTEX): An object or field that specifies the number of bytes in each lock-table entry. The number of bytes is the product of 2 raised to the power of the LTEX value.

(d) List-Element Characteristic (LELX): An object or field that specifies the number of bytes in each list element. The number of bytes is the product of 256 and 2 raised to the power of the LELX value.

(e) Minimum Structure Size (MNSS): A value that specifies the minimum number of units of SES storage that can be allocated for the list.

(f) Lock-Table-Entry Count (LTEC): An object or field that specifies the number of lock-table entries allocated.

(g) List Count (LC): An object or field that specifies the number of lists created.

(h) Structure Size (SS): An object or field that specifies the amount of storage allocated.

(i) Maximum Structure Size (MXSS): A value that specifies the maximum number of units of SES storage that can be allocated for the list.

(j) Maximum List-Set-Element Count (MLSELC): An object or field that specifies the maximum number of list elements that are available for assignment to list entries or retry-data blocks, or both, in the list set.

(k) List-Set-Element Count (LSELC): An object or field that specifies the number of list elements that have been assigned to list entries or retry-data blocks, or both, in the list set.

(l) Non-Zero-Lock-Table-Entry-Count (NLTEC): An object or field that specifies the number of non-zero lock-table entries that exist in the structure.

(m) Maximum List-Set-Entry Count (MLSELC): An object or field that specifies the maximum number of possible list entries in a list set.

(n) List-Set-Entry Count (LSEC): An object or field that specifies the number of existing list entries in the list set.

(o) Structure Authority (SAU): A value associated with each bit in the SID vector.

(p) User Structure Control (USC): A field per structure defined by the user.

(q) User-Identifier Vector (UIDV): An object or field that specifies the assigned UIDs, described below.

Referring back to FIG. 7, user controls 94 are created and initialized when the list-structure user is attached. In one embodiment, user controls 94 include the following fields (FIG. 9):

(a) A User Identifier (UID): A value that identifies an attached list user. A user identifier is either in the assigned or the unassigned state. A user identifier is in the assigned state when the associated assigned bit in the user-identifier vector is one. A user identifier is placed in the assigned state by the attach-list-structure-user command. A user identifier is in the unassigned state when the associated assigned bit in the user-identifier vector is zero. A user identifier is placed in the unassigned state by the detach-list-structure-user command, depending on detachment-request type, described below.

(b) A User State (US): A field that specifies the state of the user. The value has the following encoding: the user is detached; the user is attached. A list structure user exists when the associated user identifier is assigned. When a list structure user exists, it is either in the active or the inactive state. A user is placed in the active state by the attach-list-structure-user command. A user is placed in the inactive state by the detach-list-structure-user command when the detachment process is complete.

(c) A List-Notification Token (LNT): A value that specifies a list-notification vector to the system.

(d) A User Authority (UAU): A value that is compared and conditionally updated.

(e) A System Identifier (SYID): A value specified by the program when a message path is activated. The system identifier is maintained in the message-path status vector and copied into the user controls when an attach-list-structure-user command is communicated over the message path.

(f) A User-Attachment Control (UAC): A field per attached user defined by the user.

(g) A Detachment Restart Token (DURT): A value used to indicate how far along a detachment process has proceeded.

Referring once again to FIG. 7, lock table 96 consists of a sequence of one or more lock table entries 97 identified by a lock-table-entry number (LTEN). In one embodiment, lock table entry 97 includes a lock-table-entry number (LTEN), which starts at zero and runs consecutively and a lock-table-entry value (LTEV), including a global-lock manager (GLM) object and optionally, a local-lock-manager (LLM) object or both. The lock-table entry format is determined by the list-structure type located within list structure controls 92.

Commands associated with list structure 52 provide a means for updating lock-table entry 97. That is, a command may compare global-lock managers (GLM) and conditionally replace a global-lock manager (GLM), a local-lock manager (LLM), or both the global-lock and local-lock managers (GLM) and (LLM). The list commands also provide a means for reading an entry in lock-table 96 or the next non-zero lock-table entry, or for clearing lock table 96.

As previously mentioned, also contained within list structure 52 is list set 98. In one example, list set 98 includes one or more lists 99 represented by list controls 100, which are numbered consecutively, starting at zero. In one embodiment, list controls 100 include the following controls, as depicted in FIG. 10:

(a) List-Entry-Count Limit (LECL): An object or field that specifies the maximum number of possible list entries in a list. This object is initialized to the maximum list-set-entry count when a list structure is created.

(b) List-Entry Count (LEC): An object or field that specifies the number of list entries currently in the list.

(c) List-State-Transition Count (LSTC): An object or field that specifies the number of empty to not-empty list state transitions that have occurred.

(d) List Authority (LAU): A value that is compared and conditionally updated. The LAU is initialized to zeros.

(e) User List Controls (ULC): A field per list defined by the user.

(f) List-Monitor-Table: The list-monitor table contains information used to process the list-notification vector of each user who has registered interest in the state transitions of the list.

The list-monitor table is a sequence of objects, called list-monitor-table entries. The number of list-monitor-table entries is determined when the table is created and is equal to the maximum number of list-structure users. The list-monitor-table entries are numbered from zero to the user-identifier limit and are indexed by the user identifier (UID).

Each list-monitor-table entry has a list-monitoring-active-bit object, a list-notification-request-type object and a list-notification-entry-number object, each of which is described below:

(1) List-Monitoring-Active Bit (LMAB): An object or field that specifies whether the user associated with the list-monitor-table entry is monitoring the list-state transitions of the list.

When a user is not monitoring a list, all previously issued list-notification commands on behalf of the associated user for this list are complete.

(2) List-Notification-Request Type (LNRT): An object or field that indicates whether the list-notification-vector summaries are to be updated when an empty to not-empty state transition occurs on a monitored list.

(3) List-Notification-Entry Number (LNEN): An object or field that specifies a list-notification-vector entry.

When a list-state transition occurs, one or more list-notification commands are initiated for each user who is monitoring the list to the system which attached the user. All the list-notification commands initiated as a result of the list-state transition are initiated before the command that caused the list-structure transition is completed.

The list-notification command provides the information necessary for the system to update one list-notification entry and, when requested, the associated list-notification summaries, to reflect the new list state.

A user becomes a list monitor by registering with the list by means of a registered-list-monitor command. A user ceases to be a list monitor by deregistering from the list by means of a deregister-list-monitor command or by detaching from the list structure by means of a detach-list-structure-user command.

A list-notification command issued to a system for a user as a result of a not-empty-to-empty list-state transition must complete before another list-notification command on behalf of the same list and user that specifies the opposite list-state transition may be issued.

All SES list-structure commands capable of adding, deleting, or moving a list entry execute the list-monitor-notification process for each user monitoring a list that changes state.

When a transition notification is initiated to a system, any previously initiated but unsent notifications for the same list and user may be purged.

Each list 99 consists of a sequence of zero or more entries. The list-structure type (described above) determines whether all the list entries in list set 98 have a data list entry 104, an adjunct list entry 106, or both. Associated with each entry of a list 99 is one of list-entry controls 102. Controls 102 contain list-entry-location information and other information for controlling operations against data list entry 104.

In particular, list entry controls 102 include the following controls, as depicted in FIG. 11:

(a) A Data-List-Entry Size (DLES) indicating the size of the associated data entry.

(b) A List Number (LN) representing the list that a particular entry is associated with.

(c) A List-Entry Identifier (LEID) identifying a particular list entry. The list-entry identifier is unique to a list set 98 and is assigned by coupling facility 16.

(d) A Version Number (VN) object that is conditionally compared and conditionally updated, reflecting a program specified state for the list entry.

(e) An optional List-Entry Key (LEK) indicating a key, if one exists. When list-entry keys exist, the keyed list entries are ordered by the key with the lowest numerical key at the leftmost position. Elements with the same key value may be located by first or last within the same key value.

When an unkeyed list entry is created or moved, the target list-entry position is always located by an unkeyed position. When a keyed list entry is created or moved, the target list-entry position is always located by a keyed position and first or last within the same key value.

(f) An optional List-Entry Name (LEN). A list-entry name is unique to a list set 98 (FIG. 7) at any particular instant and is provided by the operating system program.

List commands provide a means for conditionally creating, reading, replacing, moving, or deleting one entry in list 99. A number of comparisons may be requested during these processes. They include a list-number comparison, a version-number comparison, a global-lock-manager (GLM) comparison, or any combination of the preceding. Additionally, when global locks are compared, local locks (LLM) may be compared. A list entry may be moved from one list 99 to another within the same structure 52 or from one position to another within the same list 99. This is disclosed in U.S. patent application Ser. No. 07/860,655 for "Method and Apparatus for Performing Conditional Operations on Externally Shared Data" by J. A. Frey, et al. (Attorney Docket No. PO9-92-008), incorporated herein by reference in its entirety as noted.

The position of a list entry in list 99 is determined when it is created, and may be changed when any entry in the list is created, deleted or moved. A list entry or list-entry position is located within a list set 98 by means of the list-entry identifier or the optional list-entry name (as described above), or by position. Position is specified by means of a list number, a direction, and an optional list-entry key.

The list commands also provide a means for synchronously writing and moving, moving and reading, or reading and deleting one entry of list 99. More than one list entry may be deleted synchronously, and more than one data list entry 104 or adjunct list entry 106 may also be read synchronously. Data list entry 104 is always returned in the data area designated in main storage by a message command/response block, described below. The adjunct list entry is returned in either a message command/response block or the data area, depending on the command. This is disclosed in U.S. patent application Ser. No. 07/860,633 for "Apparatus and Method for List Management in a Coupled DP System" by J. A. Frey, et al., (Attorney Docket No. PO9-92-009), incorporated herein by reference in its entirety, as noted.

Figure 12:
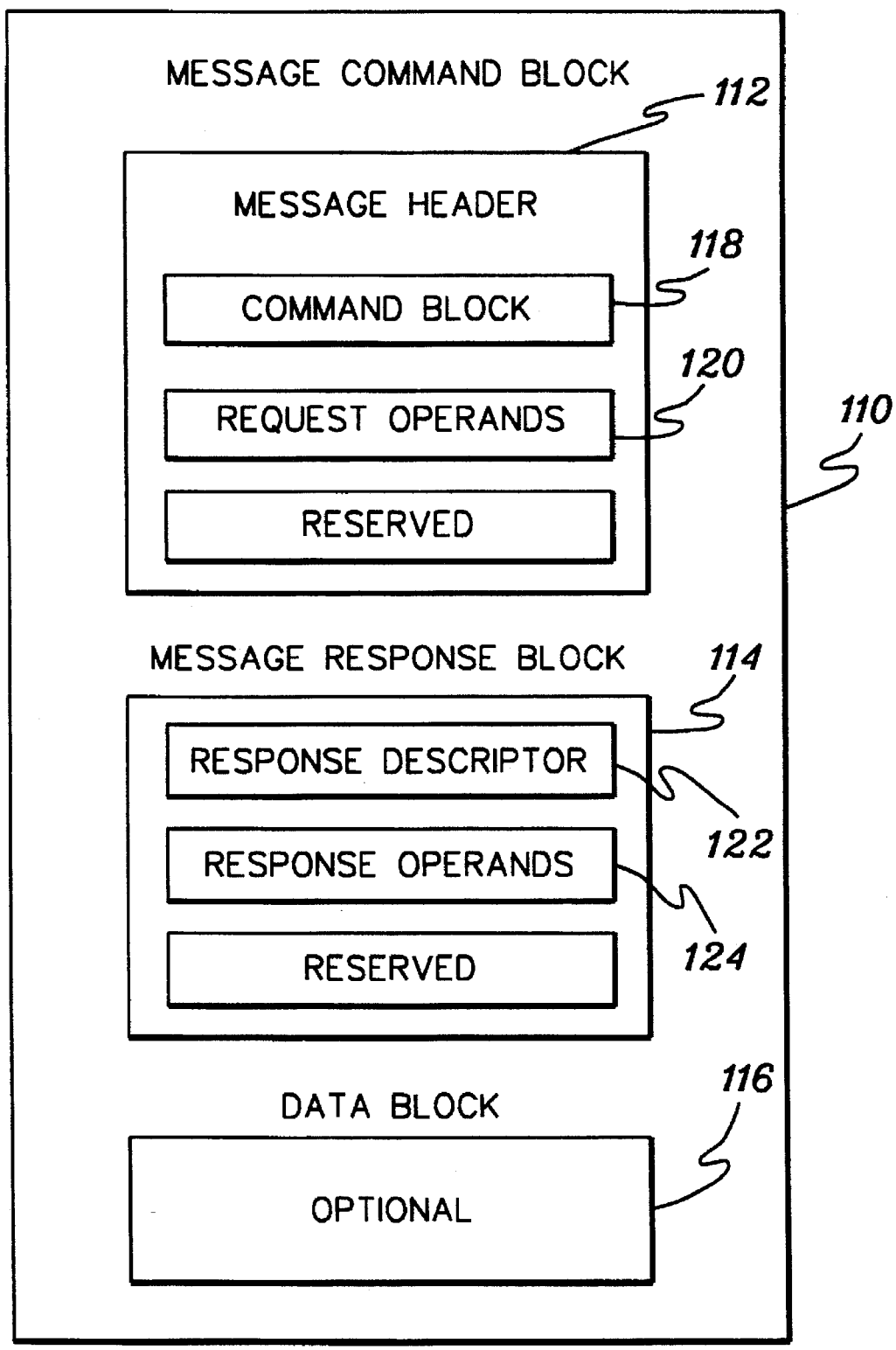
FIG. 12 depicts one example of a message command/response block, in accordance with the principles of the present invention.

In one embodiment, messages are communicated between CPC 12 and coupling facility 16 via a message command/response block 110 (FIG. 12). In one example, message command/response block 110 includes a message command block 112, a message response block 114 and an optional data block 116. Message command block 112 includes a command block 118 and a plurality of request operands 120 and message response block 114 includes a response descriptor 122 and a plurality of response operands 124. In one embodiment of the present invention, request operands 120 and response operands 124 include the operands listed below, which are depicted in FIG. 13. (An operand may be a request operand, a response operand or both, depending upon the command. It is also possible that other request and/or response operands exist, which are not shown in FIG. 13.) In one embodiment, the response/request operands include the following:

(a) Attachment Information (AINF): A value set by the program when the local cache is attached.

(b) Comparative Local-Cache Authority (CLCAU): A value used as a comparison value to the local-cache authority when a local-cache attachment is performed for an assigned local-cache identifier or when a local cache is detached.

(c) Comparative Structure Authority (CSAU): A value used as a comparison value to the structure authority when the structure is allocated and deallocated.

(d) Comparative User Authority (CUAU): A value that is compared to the user-authority object.

(e) Detachment-Request Type (DRT): A value that indicates whether the user identifier is to be unassigned when the list-structure user is detached. The value has one of two meanings: Keep the user identifier assigned and unassign the user identifier.

(f) List-Monitoring-Active Bit (LMAB): A value that specifies whether the user associated with the list-monitor-table entry is monitoring the list-state transitions of the list. The value has one of the two following meanings: Not monitoring the list and monitoring the list. When the list-monitoring-active bit indicates that the list is not monitored, all previously issued list-notification commands on behalf of the associated user for this list are complete.

(g) List-Notification-Entry Number (LNEN): An unsigned binary integer that specifies a list-notification-vector entry.

(h) List-Notification Token (LNT): A value that specifies a list-notification vector to the system. A list-notification token of zero indicates that the user may not be registered to monitor a list.

(i) LCID-Unassignment Control (LUC): A value that controls the unassignment of the local-cache identifier. When the value is one, the local-cache identifier is unassigned, and the local-cache controls are reset. The LCID value is available for assignment. When the value is zero, the LCID vector and the local-cache controls are not updated.

(j) Local-Cache Authority (LCAU): A value set by the program when the local cache is attached.

(k) Local-Cache-Entry Number (LCEN): A value that specifies a local cache entry.

(l) Local-Cache Identifier (LCID): An integer that identifies a local cache. The LCID must be assigned for a read-local-cache-information, attach local cache and detach local cache commands and must be attached for all other commands.

(m) Local-Cache Token (LCT): A value that identifies a local cache.

(n) Structure Authority (SAU): A value that is conditionally updated.

(o) User-Attachment Control (UAC): A field per attached user defined by the user.

(p) User Authority (UAU): A value that is compared and conditionally updated.

(q) User Identifier (UID): A value that identifies a user. A user identifier must identify an attached UID when a user is registered, and must identify an assigned UID when a user is deregistered or user controls are read.

(r) User State (US): A field that specifies the state of the user. The value has the following two meanings: The user is detached or the user is attached.

(s) User Structure Control (USC): A field per structure defined by the user.

(t) Allocation Type (AT): A field that indicates the type of allocation.

In addition to cache and list structures, there exists a lock structure which is comprised of a coupling facility list structure with an associated lock table and a set of operating system services to assist in lock contention resolution.

In support of the cache and list structures, described above, is a set of global controls 67, which is located in coupling facility 16 (see FIG. 3). In one embodiment, global controls 67 identify the coupling facility, describe its state, define its model-dependent limitations and summarize the status of its resources. In one example, global controls 67 include a free-space object, a free-control space object, a coupling facility authority object and a structure identifier (SID) vector. The SID vector is a string of bits, which increases sequentially having an initial value of zero. The structure identifier value provides an identification of a target structure by a command. A position i in the string is set to one when a structure is created with a SID value of i. The bit at position i is reset to zero when the structure is deallocated. A read SID vector command, returns the SID vector to the data area in the requesting program.

In one embodiment, a structure identifier is either in the assigned or unassigned state. A structure identifier is in the assigned state when the associated created bit in the structure-identifier vector is one. A structure identifier is placed in the assigned state when a structure is created by an allocate-cache-structure or allocate-list-structure command.

In addition, a structure identifier is in the unassigned state when the associated created bit in the structure-identifier vector is zero. A structure identifier is placed in the unassigned state by a deallocate-cache-structure or deallocate-list-structure command.

A coupling facility structure has one of the following states:

Allocated: The structure is created and commands are processed against structure objects.

Allocation Incomplete: An allocation process has been initiated for a structure, but the initialization of the structure objects has not completed.

Deallocation Incomplete: A deallocation process has been initiated for a structure, but the storage has not all been released.

Unassigned: The structure identifier (SID) value is available for selection by an allocate-cache-structure or allocate-list-structure command, as described in detail below.

A set of commands is provided for each coupling facility storage structure type, as well as additional commands for referencing global objects. The creation, deletion and attributes of a particular structure are controlled by the operating system program through allocation and de-allocation commands, described in detail below. Allocation commands for list structures are described in "Apparatus and Method For List Management In A Coupled DP System" (Docket No. PO9-92-009), by J. A. Frey et al., Ser. No. 07/860,633, Filed: Mar. 30, 1992, which is hereby incorporated by reference in its entirety. In addition, allocation commands for cache structures are described in "Sysplex Shared Data Coherency Method and Means" (Docket No. PO9-91-052), by D. A. Elko et al., Ser. No. 07/860,805, Filed: Mar. 30, 1992, which is also hereby incorporated by reference in its entirety.

In accordance with the principles of the present invention, an installation's rules governing the location and size of the allocated coupling facility structures are stored in a sysplex-wide coupling facility resource management policy (also known as an active policy). These rules determine the location of the coupling facility structures among the several coupling facilities which may be present in the sysplex configuration and their size in terms of the amount of coupling facility storage which is to be used. In one embodiment, the coupling facility policy is stored on a function data set, which is coupled to each central processing complex, as shown in the overview diagram of FIG. 14.

Referring to FIG. 14, the overview diagram is described in detail. In the system shown, two CPC's (CPC 12a and CPC 12b) exist. Each CPC is coupled to coupling facility 16; a couple data set 130, which includes the status for CPC 12a and CPC 12b; and a function data set 132, which includes an active policy 134 for coupling facility resources and one or more administrative policies 136, each of which is described in detail below.

CPC 12a includes a system monitor 126a located within operating system 13a and hardware 128a. Hardware 128a includes, for instance, I/S channels 18a (not shown) to connect coupling facility 16 via a bus 34a to CPC 12a, and I/O channels 22a (not shown), to couple CPC 12a via a link 26a to couple data set 130 and function data set 132.

Similarly, CPC 12b includes a system monitor 126b located within operating system 13b and hardware 128b. Hardware 128b includes, for instance, I/S channels 18b (not shown) to connect coupling facility 16 to CPC 12b via a bus 34b, and I/O channels 22b (not shown) to couple CPC 12b via a link 26b to couple data set 130 and function data set 132.

As described above, operating systems 13a, 13b include system monitor 126a, 126b, respectively, each of which monitors the status of CPC 12a and CPC 12b. Further, each operating system includes a coupling facility resource manager (CFRM) 127a, 127b, respectively, which govern the coupling facility resource use in a sysplex. CFRM provides services to the installation to manage the coupling facility resources usage based on the customer environment. These services include: externals to cover definition and environment setup which are provided by extensions to Cross-System Coupling Facility (XCF) (described in MVS/ESA Planning: SYSPLEX Management, IBM Publication (GC28-1620-1), Chapter 2 and Appendix A, which is incorporated herein by reference in its entirety), including a format utility and an administrative interface utility; externals to make CFRM operational to make a policy active and to determine coupling facility resource status in the sysplex; and situations managed include gain/loss of coupling facility access via coupling facility resource management policy enforcement, gain/loss of function data set which contains CFRM data, and cleanup of coupling facility resources for system failure.

Prior MVS/ESA versions provided support to recognize system failure as part of system monitor 126a, 126b and to allow the surviving systems to initiate recovery processing for the failed system. Part of the recovery processing is to cleanup on behalf of the failed system. In accordance with the principles of the present invention, cleanup for coupling facility resource management will be described below with reference to FIG. 39.

In addition to the above, components of the operating system use function data set 132 to provide a general repository mechanism for sysplex-wide policy information, (e.g., CFRM). Support is provided to allow the system programmer to tailor a function data set which supports CFRM. The tailoring is accomplished by specification of coupling facility resource management defined externals on format utility control card input. The format utility supporting function data set 132 is an extension of the XCF format utility.

In one embodiment, a primary and an alternate function data set is supported by XCF. In the event of an error on the primary function data set, XCF will automatically switch over to use the alternate function data set, if one exists. During their use, XCF synchronizes access to the primary and alternate function data sets to ensure their consistency. The capacity of an alternate function data set may be larger than its primary function data set, but may not be smaller. The operator can request that the alternate function data set be switched to become the primary. This might be done to increase the capacity of the function (if the alternate was larger than the primary that had been in use), or for maintenance of the volume on which the primary function data set resides.

Function data sets need not have full connectivity to all systems in the sysplex. Each XCF function determines whether or not it will provide function to any system when there is not full connectivity to all systems. If a function will operate without full connectivity, the function's services will not be available on systems which lack connectivity to the function data set.

As mentioned above, function data set 132 includes policy information. Policy information is used by functions to automate the operation of the function by providing administrative specification rather than requiring operator actions or responses. It allows the installation to control and manage the use of resources by the function without operator intervention. The policy may take the form of goals, rules, specific actions to be taken or not to be taken, weights, timing values, etc.

The scope of a policy matches the scope of the function for which the policy is in effect. This may or may not be the entire sysplex. Some functions may choose not to operate unless all systems in the sysplex participate in the function, and so the policies for those functions may not be usable unless full function data set connectivity exists.

As shown in FIG. 14, there are two classes of policy: administrative policy 136 and active policy 134. An administrative policy (also referred to as an administrative coupling facility resource management policy) is one which has been defined by the system administrator using an interface provided by Cross-System Extended Services (XES) and stored on a function data set, which is associated with the particular function. The administrative policy is not actively being used by the sysplex in real time. Many administrative policies for a given function may be defined. Each policy may be relevant at different times, reflecting varying workloads, configurations, or other installation considerations. The operator makes a policy active, or changes the active policy which is in effect for a function, via a SETXCF operator command, in response to these factors. Some functions support the deactivation of a policy entirely (via the SETXCF command), others do not.

One example of a SETXCF start command is as follows:

SETXCF START,POLICY,TYPE=CFRM,POLNAME=DAILY

The above command starts an active policy, named DAILY, for CFRM.

An administrative policy is supported by MVS services which enables the systems administrator to define for each structure, the quantity of the total coupling facility resource and a preference list of coupling facilities in which the coupling facility structure should be assigned. The preference list is used to designate the location of coupling facility structures so as to manage performance and capacity considerations. The systems administrator may also define an exclusion list of coupling facility structures which can be used to request that coupling facility structures occupy different coupling facilities if possible. The exclusion list is used to isolate coupling facility structures to different failure domains so as to avoid possible single points of failure for subsystem/system components who require high availability.

In one embodiment, an XCF format utility, such as the one described below, is used to create one or more administrative policies; delete administrative policies that are no longer required; and report on the administrative policy definitions.

The XCF format utility processing handles parsing of the input control card. Specifying the name (CFRM) allows the XCF format utility to load the data definition for coupling facility resource management. It is the data definition which supplies the item names supported by coupling facility resource management. The externalized item names allow a function data set to be built that will be large enough to support both policy and status data required by coupling facility resource management.

For coupling facility resource management, the external items allowed as control card input to the XCF format utility are as follows, each of which is described in detail below:

(a) POLICY—number of named administrative coupling facility resource management policies;

An example, could be a customer whose environment varies based on the time of day such that it would be appropriate to have an administrative policy for each shift of weekday operation and for weekend operation. In this example, the system programmer could request four as the number of administrative policies that can be defined within a function data set.

(b) CF—number of coupling facilities;

This should be the current number of coupling facilities the installation has installed or is planning to install and use in the sysplex referencing the function data set being formatted. The system programmer controls the number of coupling facilities that can be governed by one policy by specifying a list of coupling facilities and having each coupling facility used in the preference list of at least one structure. CFRM only allows the sysplex to use the resources of the coupling facilities listed in the active policy.

(c) STR—number of coupling facility structures per named administrative coupling facility resource management policy; and The system programmer will determine this number based on the subsystem/system components which require coupling facility structures.

(d) CONNECT—number of connections per coupling facility structure.

The number of connections is a per structure number and the same number applies to all structures in any policy. This number is used to determine function data set size necessary to maintain real time status data associated with the active policy.

The real time maximum number of connections for a named structure type (e.g, lock, list, cache) is calculated at the first connect as the minimum of the formatted number from policy, subsystem/system component requested number of connectors, and any coupling facility implementation limit number. The number of connections in use is established by the subsystem/ system component use of IXLCONN, described below, and the number must be within the maximum established by the first connect.

The installation is given the flexibility to determine a maximum value based on the customer environment since limiting the number of connections to a coupling facility structure will lessen the amount of space used by the function data set. This value will be used to reserve total function data set space for all coupling facility structures in the active policy and will be rounded to the next highest unit of 8. For example, if a named coupling facility structure supports a subsystem/ system component which does one connection per system in a 4 system sysplex, then the number of connections could be defined to be 8.

Sample JCL to run the format utility to format a primary and an alternate function data set is depicted below:

```
//IXCCFRM  JOB
//STEP 10    EXEC   PGM=IXCL1DSU
//STEPLIB    DD     DSN=SYS1.MIGLIB,DISP=SHR
//SYSPRINT   DD     SYSOUT=A
//SYSIN      DD     *
         DEFINEDS  SYSPLEX(PLEX1)
                   DSN(SYS1.XCF.FDS01) VOLSER(3380X1)
                   NOCATALOG
               DATA TYPE(CFRM)
                   ITEM NAME(POLICY) NUMBER(6)
                   ITEM NAME(CF) NUMBER(5)
                   ITEM NAME(STR) NUMBER(20)
                   ITEM NAME(CONNECT) NUMBER(32)
         DEFINEDS  SYSPLEX(PLEX1)
                   DSN(SYS1.XCF.FDS02)
                     VOLSER(3380X2)
                   NOCATALOG
               DATA TYPE(CFRM)
                   ITEM NAME(POLICY) NUMBER(6)
                   ITEM NAME(CF) NUMBER(5)
                   ITEM NAME(STR) NUMBER(20)
                   ITEM NAME(CONNECT) NUMBER(32)
```

MVS provides a utility program to create and modify administrative policy data which is stored in the coupling resource facility management function data set. The installation may define multiple administrative policies based on their specific needs.

IXCMIAPU is one example of a utility program to update administrative policy data in the coupling facility resource management function data set. Typically, the program will be used to update administrative data in the operational function data set for a given data type. However, for migration purposes, a formatted but not-operational function data set can be updated using the utility by specifying a specific data set name on the data type control statement.

The utility program can, for instance, define administrative policies which contain information about how coupling facility resources are to be managed within an MVS sysplex (within each policy, the user will completely define a set of coupling facilities and coupling facility structures, along with their associated attributes); delete administrative policies which are no longer required by the installation; and produce a report of the contents of all administrative policies defined in the coupling facility resource management function data set administrative policy 136.

One example of sample JCL to run the program is listed below:

```
//IXCCFRMP   JOB
//STEP20     EXEC   PGM=IXCMIAPU
//SYSPRINT   DD     SYSOUT=A
//SYSIN      DD     *
       DATA TYPE(CFRM) DSN(SYS1.XCF.FDS01)
       VOLSER(3380X1) REPORT(YES)
       DEFINE POLICY NAME(POLICY1) REPLACE(YES)
           CF  NAME(FACIL01)
               TYPE(123456)
               MFG(IBM)
               PLANT(PK)
               SERIAL(123456789012)
               PARTITION(1)
               CPCID(00)
               SIDE(0)
           CF  NAME(FACIL02)
               TYPE(123456)
               MFG(IBM)
               PLANT(PK)
               SERIAL(123456789012)
               PARTITION(2)
```

-continued
```
               CPCID (00)
               SIDE (1)
       STRUCTURE NAME(LIST_01)
               SIZE(1000)
               PREFLIST(FACIL01, FACIL02)
               EXCLLIST(CACHE_01)
       STRUCTURE NAME(CACHE_01)
               SIZE(1000)
               PREFLIST(FACIL01, FACIL02)
               EXCLLIST(LIST_01)
       DELETE POLICY NAME(POLICY2)
```

Wherein:

PGM=IXCMIAPU is the utility program.

SYSPRINT is a DD statement that describes where the output messages from the utility are to be written. The SYSPRINT DD is required.

SYSIN is a DD statement that describes the utility control statements which are input to the utility.

DATA is a required primary control statement which directs the utility to process a specified function data set type.

Type(couple-data-type) is a required keyword for the data statement which specifies the type of data to be processed by the utility.

DSN(data-set-name) is an optional keyword which can be specified on the DATA statement to specify the name of a formatted coupling facility resource management function data set which is to be updated.

VOLSER(volser) specifies the name of the volume on which the function data set resides if the data set is not cataloged. Volser is only allowed when the DSN keyword is also specified.

REPORT(YES/NO) is an optional keyword which indicates that a report of the administrative data is to output to the SYSPRINT file. The default is REPORT (YES).

DEFINE POLICY NAME(polname) is a primary control statement. It begins the definition of a new administrative policy. The limit of the number of DEFINE POLICY statements is established when the target function data set is formatted using the XCF format utility. The NAME keyword specifies the policy name which can be 1–8 characters in length. One or more secondary control statements can be specified to define coupling facilities and coupling facility structures within the named policy.

The following rules apply to DEFINE control statements:

(a) A policy name can only be defined once within a single run of the utility; and (b) If the policy name was previously defined in the function data set but had never been defined in this run of the utility, then the policy is allowed to be replaced only if the REPLACE(YES) keyword was specified on the DEFINE POLICY statement.

REPLACE (YES/NO) is an optional keyword which can be specified on the DEFINE POLICY statement which is used to control whether or not an existing policy is allowed to be replaced. The default is REPLACE(NO).

CF—is a secondary control statement which defines a coupling facility within the scope of a given administrative policy.

NAME(cfname) specifies the name which will be associated with the coupling facility identifier information for further reference within the scope of this policy definition. The coupling facility can be 1–8 characters in length. The limit for the number of coupling facilities which can be defined in a policy is established when the target coupling facility resource management function data set is formatted. Each CF within a policy must be referenced by at least one STRUCTURE PREFLIST within the same policy. The coupling facility identifier includes the following:

TYPE(tttttt) is a required 6 character string which specifies the coupling facility machine type.

MFG(mmm) is a required three character string which specifies the coupling facility manufacturer.

PLANT(pp) is a required 2 character string which specifies the coupling facility plant of manufacture code.

SERIAL(pppppppppppp) is a required 12 character string which specifies the coupling facility serial number.

PARTITION(p) is a required hexadecimal digit qualifier for a given coupling facility to uniquely identify a coupling facility to a specific PR/SM Partition.

SIDE(0/1) is an optional keyword which is used to identify a coupling facility to a specific physical side of a CPC running in physically partitioned mode. The SIDE qualifier is optional; if omitted, the coupling facility is assumed to reside on a CPC running in single image mode.

CPCID(nn) is an optional keyword which is used to identify a coupling facility to a specific S390/Micro Processor. The number is a 2 hexadecimal digit (0-F) number. The CPCID qualifier is optional; if omitted, the coupling facility is assumed to reside on a CPC which is not a S390/Micro Processor.

STRUCTURE is a secondary control statement which defines a coupling facility structure within the scope of a given policy.

NAME(strname) is the name associated with the coupling facility structure within the scope of a given policy. The name must begin with an uppercase alphabetic character. The limit for the number of coupling facility structures which can be defined in a policy is established when the target coupling facility resource management function data set is formatted.

SIZE(nnnnnn) is a 1–6 decimal digit number which specifies the amount of space to use when the coupling facility structure is allocated in a coupling facility.

PREFLIST(cfname1,cfname2, . . . , cfname8) is an ordered list of 1–8 coupling facility names from which the system is to choose when allocating a coupling facility structure. The system will attempt to allocate a structure in the first coupling facility which is both in the preference list and is able to contain the coupling facility structure (i.e., enough space is available, connectivity to the coupling facility has been established, etc.), while also attempting to honor the exclusion list.

EXCLIST(strname1, strname2, . . . , strname8) is a list of 1–8 coupling facility structure names with which this coupling facility structure should not share the same coupling facility. The system attempts to honor the intentions of the exclusion list, but will not fail a request to allocate a structure when all other requirements for structure allocation have been satisfied and the exclusion list cannot be honored.

DELETE POLICY NAME(polname) is a primary control statement. It allows the user to delete an administrative policy from the coupling facility resource management function data set. This control statement has no secondary control statements.

The following rules apply to DELETE POLICY:

(a) Policy DELETE statements will be treated in the order that they are encountered;

(b) If the user attempts to delete a policy which had previously been defined in a policy run, then it will be considered an error; and (c) If a policy is not found for a DELETE statement, this will also be treated as an error.

In the above definitions, a number of statements are considered required. However, what is required in one embodiment, may be optional in another.

In addition to administrative policies, there exists an active policy, in accordance with the principles of the present invention. An active policy (also referred to as an active coupling facility resource management policy) is an administrative policy which has been explicitly made active via an operator command, and whose policy specification is actively being used in the sysplex. In one embodiment, there may be at most one active policy for a function at a given point in time. The single policy is consistently viewed by all the systems in the sysplex. Software components request access to a coupling facility structure in the coupling facility by specifying the coupling facility structure name of a coupling facility structure defined in that policy. Thus, the active policy is used to control the distribution (quantity and location) of coupling facility resources.

An active coupling facility resource management policy becomes active when it is placed in use by the SETXCF START operator command. The active policy is used to govern decision making for distribution of coupling facility resources within the sysplex. The active coupling resource management policy is also used to maintain coupling facility resource status data.

As described below, the active policy can be changed during ongoing operation of systems in the sysplex. Through operator commands, the active policy can be changed to another policy definition. In one embodiment, changes to individual portions of policy definition are not supported through operator interfaces. If changes are required to parts of a policy, a new policy is created with the necessary modifications. Operator support is provided to cause one of the predefined policies to be made current for actively controlling the distribution of coupling facility resources.

Figure 15:
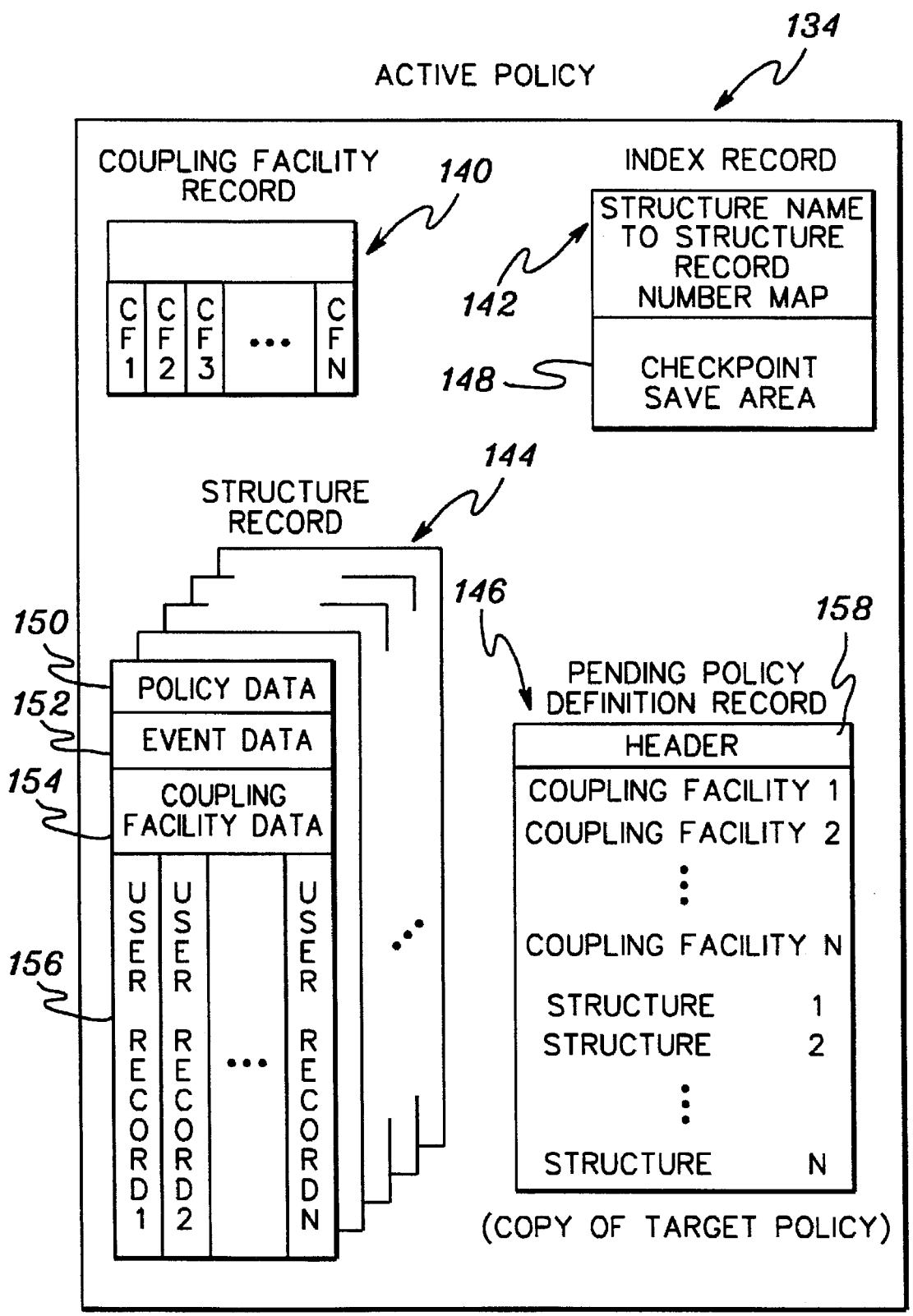
FIG. 15 depicts one embodiment of the fields associated with the active policy of FIG. 14, in accordance with the principles of the present invention.

Referring to FIG. 15, in one embodiment, in accordance with the principles of the present invention, active policy 134 includes a coupling facility record 140, an index record 142, one or more structure records 144, and a pending policy definition record 146, each of which is described below.

Coupling facility record 140 includes a record for each coupling facility in the sysplex. This record includes the coupling facility name, coupling facility identifier and the indication of which systems have connectivity to the coupling facility.

Index record 142 includes the structure name to structure record number map and a checkpoint save area 148.

In one embodiment, the checkpoint save area includes a number of records for recording intended modifications to resources (such as cache, list, lock structures) within a coupling facility prior to making the modifications. In one example, modifications which may occur include an allocate, deallocate, attach or detach command, as described below. A record for allocation or deallocation of a structure includes the structure name, structure identifier (SID), coupling facility identifier, and structure authority (SAU). For a detach or attach command, the record includes a SSID, type of detach (i.e., RELEASE or KEEP) and user attach authority.

The checkpoint save area is used by XCF allocation and release routines to save information about a structure that is in the process of being allocated for the first user or released by the last user. The checkpoint save area is also used to save information about connections that are in the process of being attached or detached from a structure.

The allocation of a structure occurs before the allocated indicator (not shown) in the active policy structure record 144 is written out to the function data set. The release of a structure occurs after the allocated indicator in the active policy structure record is turned off and written to the function data set. This is necessary so that connects and releases on other systems see an atomic allocation and release. Atomic meaning that the structure allocation will not appear in the active policy until the structure is really allocated and being used by a connector. The same concept applies for release. Thus, other instances of the allocation and release code can make decisions based on the active policy data.

There is a need to save information that structure allocations and releases are underway, however, due to system failures and loss of system connectivity to a coupling facility. XCF would like to know which structures it was in the midst of processing when the error occurred. Thus, the checkpoint save area is used to record such allocations and releases.

As described below, during the allocate process, the structure information will be added to the checkpoint save area and written to the function data set before the hardware operation is performed. After the structure is allocated and the user information is added to the SSID array (SSID is used herein as a subsystem id, referring either to a LCID for a cache structure or a UID for a list structure), the checkpoint save area is cleared out. Thus, if an error occurs during the allocation process, XCF will be able to release the structure.

During the release process, the structure information will be added to the checkpoint save area and written to the function data set before the hardware operation is performed. The SSID array is also updated at the same time to indicate that there are no active users of the structure. After the structure is deallocated, the checkpoint save area is cleared out. Thus, if an error occurs during the release process, XCF will be able to release the structure. This same concept applies to users of the structure.

In addition to index record 142, structure records 144 also exist within the active policy. Each of structure records 144 includes, for example, policy data 150 (e.g., characteristics such as size, exclusion and preference lists), event data 152 (for keeping track of events), coupling facility data 154, indicating where hardware resources are allocated, and a number of user records 156 for describing status of users (e.g., user record 1—user record n). Further, the structure record includes status information.

Pending policy definition 146 is a copy of the target active policy and includes, for instance, each of the coupling facilities and structures in the administrative policy being made active via, for example, a SETXCF START operator command. The pending policy includes both compatible and incompatible changes for the active policy. Pending policy definition 146 includes a header 158, which includes, for instance, a number of flags, a count of the number of structures that need to be added to the active policy that could not be added from the pending policy and a count of the number of facilities that need to be added to the active policy that could not be added from the pending policy.

Whenever a function data set supporting a CFRM is first made available in the sysplex, coupling facility resource management becomes operational. During the process of making the CFRM operational, coupling facility resource management is given the opportunity to cleanup its data in the function data set and perform system level initialization.

For coupling facility resource management, the run time status data maintained in the active policy is cleaned up. This includes:

(a) Setting the connectivity of systems to coupling facilities to indicate no system has access to any coupling facility; and (b) Setting the connections to the coupling facility structure to a failed state or removing the connections from the record.

After CFRM has had the opportunity to cleanup its data on the function data set, the next step in making it operational is system level initialization for the service. Since the policy data is maintained on a function data set, the policies carry over from one IPL to the next, or from one usage of CFRM to the next. For coupling facility resource management, system level initialization is based on the state of the active coupling facility resource management policy.

An active policy may have an empty state or a state in which information is included. An empty state is when the function data set has been formatted and made available to coupling facility resource management but a named administrative policy with coupling facility definitions and coupling facility structure definitions has not been activated. It may also be true that administrative policies had not yet been defined. A SETXCF STOP operator command could also be used to cause the active policy to be empty. The SETXCF STOP technique would be used to cause the sysplex to transition to a state where coupling facility resources are not being used.

An active policy in the information state is one which contains active policy information, which was defined using the administrative interface and activated using the SETXCF START command.

If the active policy is empty, the CFRM is operational but usage of coupling facility resources by the sysplex will not be allowed. It is the active coupling facility resource management policy that provides the rules which allow coupling facility resource management to control coupling facility resource usage based on installation criteria. All requests (e.g., IXLCONN, described below) which are for use of the coupling facility resource will be given a return code to indicate the request was denied. This environment does allow for the definition of administrative policies in preparation for activating a named administrative coupling facility resource management policy.

If the active policy contains information, then each system in the sysplex with access to the function data set will initialize to use coupling facility resources. Coupling facility resource management initialization process of each system with access to the function data set, consists of attempting to gain ownership of all the coupling facilities in the active policy for the sysplex and recording system connectivity to all the coupling facilities physically accessible.

It is the processing of gain ownership of a coupling facility, on behalf of a sysplex, that will query the operator before attempting to use a coupling facility when this sysplex was not the previous owner. The operator may respond, indicating that the coupling facility is to be used or is not to be used. If the operator indicates that the coupling facility is not to be used, coupling facility resource management will cause the coupling facility not to be used. If the operator indicates that the coupling facility is to be used, then gain ownership processing will proceed. If this is not successful, the operator prompt will be repeated. An architected set of services assist programming in assigning management responsibility for a coupling facility. This is described in "Authorization Method For Conditional Command Execution," by Elko et al., Ser. No. 08/021,285 (PO9-92-019), filed Feb. 22, 1993, which is incorporated herein by reference in its entirety.

A coupling facility may become usable by a sysplex through dynamic changes in the configuration or by change in the coupling facility resource management policy, which allows the sysplex to begin using a coupling facility. For the hardware configuration change, coupling facility resource management will determine if the new coupling facility may be used, based on the active policy. For the active policy change, coupling facility resource management will query to determine accessibility to the coupling facility for each system in the sysplex. For both cases, the system level initialization processing will happen for each system that can access the coupling facility defined in the active policy.

When a coupling facility first becomes accessible to a sysplex, the contents of the coupling facility are examined. When a coupling facility first becomes accessible to a sysplex, MVS support insures that the coupling facility should be used by the sysplex. If a coupling facility is to be used by a sysplex and the coupling facility contains coupling facility structure(s) which are not known to MVS support, the operator will be given the option of whether the unrecognized coupling facility structure should be kept but not used, used normally, or deleted.

Reconciliation of active policy and the resource usage in the coupling facility is intended to cleanup for sysplex wide loss of connectivity to the coupling facility; cleanup for sysplex wide failure (re-IPL sysplex); and aid the installation in reconstruction of failed CFRM function data sets.

During reconciliation of the active policy with a coupling facility (for which the sysplex gained ownership), if the facility has structures or connections not in the active policy, then the information in the coupling facility is used to reconstruct the policy. For example, if a structure is not found in the policy, then the structure name and the structure version are filled in the policy from the coupling facility information. If a connection is not found in the policy, the connect name and connection version are filled in to the policy from the coupling facility.

When reconciliation is done using an old function data set that was formatted for a smaller number of structures and/or connections, then the process will add to the active policy as much as possible and communicate to the operator the information necessary to create the function data set required to support the current configuration. After the new function data set is created (using XCF format utility), the installation should use a SETXCF COUPLE command to first add a function data set as an alternate data set; and second, switch to use the alternate as the primary. (A SETXCF COUPLE command is known in the art, but has been enhanced in accordance with the principles of the present invention, to include function data sets. A keyword has been added to identify the function.)

Any coupling facilities which are physically accessible to a system in the sysplex but not described in the active coupling facility resource management policy will not be used by the sysplex for allocation of coupling facility resources. To begin using physically accessible coupling facilities for allocation of coupling facility resources, a named administrative policy with coupling facility definition and coupling facility structure definitions is activated using the SETXCF START operator command. When a SETXCF START operator command is issued to change from the current active policy to a named administrative policy, the coupling facility resource management transitions to the target policy. The change is pending until all the transition processing has completed.

Coupling facility resource management policy activation results in a transition over time from the current active coupling facility resource management policy to the target administrative coupling facility resource management policy named on the command. The transition from an empty active coupling facility resource management policy to a target coupling facility resource management policy takes effect immediately, but other transitions will follow the rules, described below. In particular, compatible changes are made immediately and incompatible changes are stored for subsequent implementation.

1. Changes to the name for any coupling facility takes effect immediately. The name of the coupling facility is consistently updated in all the preference lists of the coupling facility structure definitions in the active policy. The only delay for the operational use of the new name is until all systems can update to reflect knowledge of the new name. This delay could be noticed by an operator using the new name since the name could be unknown on the systems which have not completed the update. The recognition of coupling facility name change is handled internally by coupling facility resource management.

2. Deletions of coupling facility or coupling facility structure and modifications to coupling facility structure:

If coupling facility resources are not allocated (not actively being used), the change takes effect immediately;

If coupling facility resources are allocated (actively being used), the change remains pending until all coupling facility resources are released. Based on the usage of coupling facility resources, the hierarchy requires that the following order be observed.

(a) All connections to an allocated coupling facility structure are removed to cause the structure to become not actively used.

To initiate the removal of active connections to a coupling facility structure use the command appropriate for the subsystem using the structure. If all connectors comply with the request the result should be no active connections. To initiate the removal of failed-persistent connections to a coupling facility structure use the SETXCF FORCE,CONNECTION operator command to delete each individual failed-persistent connection. The FORCE operator command invokes the force service, which is described below.

(b) An allocated coupling facility structure (in the coupling facility to be deleted or the coupling facility structure being deleted or modified) is removed from the coupling facility to cause the structure and/or the coupling facility to become not actively used.

For a persistent coupling facility structure, once there are no longer any connections in the active or failed-persistent state, issuing SETXCF FORCE, STRUCTURE forces deletion of the coupling facility structure. For a non-persistent coupling facility structure, the removal of all connections results in deletion of the coupling facility structure. The SETXCF FORCE structure command invokes the force service, which is described below.

3. Additions of coupling facility or coupling facility structure takes effect immediately assuming the installation has caused the coupling facility resource usage governed by the prior active policy to be released. Since the function data set is formatted to contain a fixed number of coupling facility definitions and coupling facility structure definitions comprising the active policy, the deletions which are pending may cause additions to also become pending.

A SETXCF STOP command is used to cause the coupling facility resource management policy to become empty.

All coupling facility and coupling facility structure definitions in the active policy are to be deleted. The transition to an empty active coupling facility resource management policy follows the rule listed above for deletions of coupling facility or coupling facility structure. The activation of an empty policy results in a transition over time to having the CFRM operational but the sysplex will not be using coupling facility resources. To again use coupling facility resources in the sysplex, the SETXCF START operator command should be issued with a named administrative policy.

Figure 16:
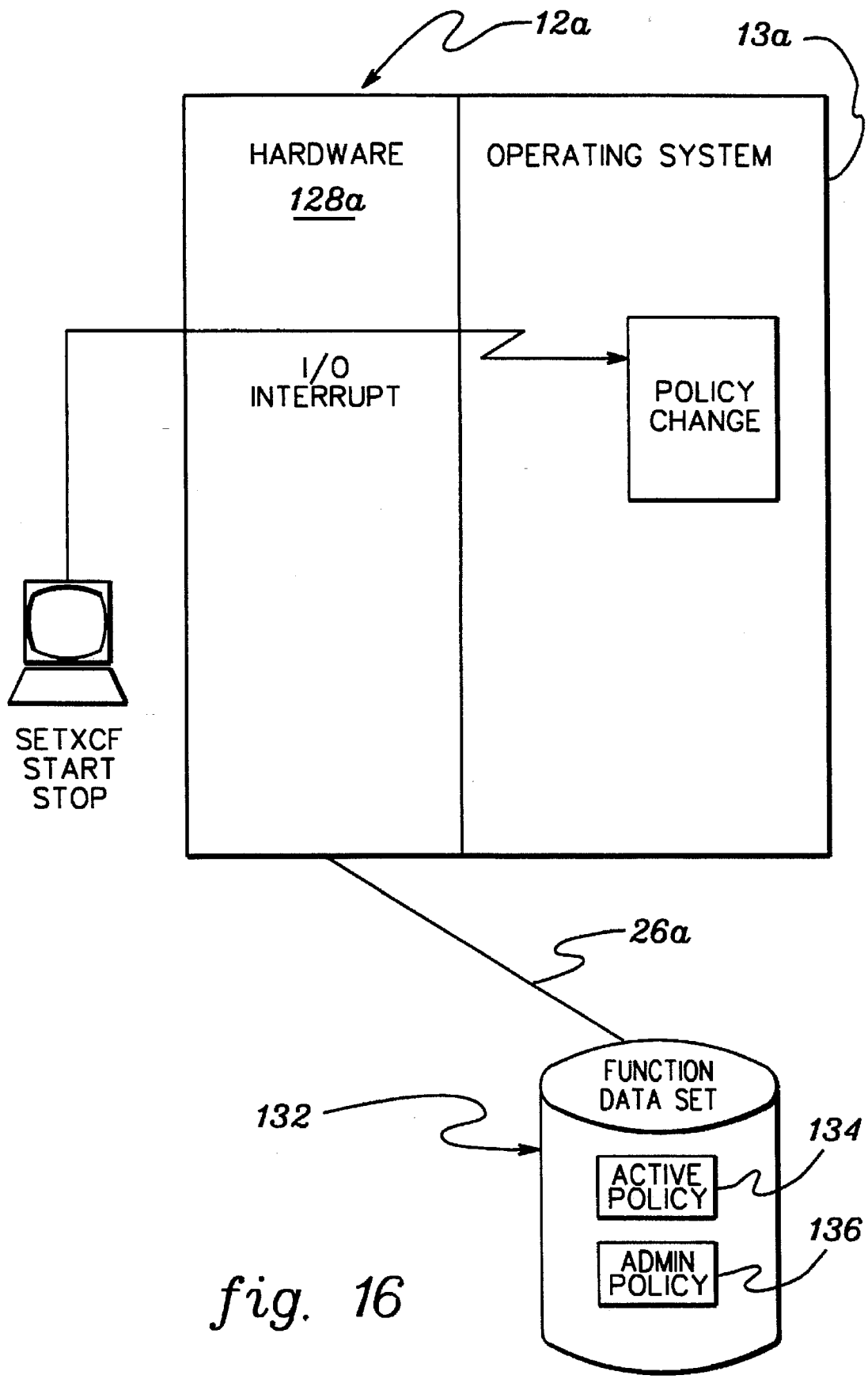
FIG. 16 illustrates one example of an overview diagram depicting initiation of a SETXCF START or SETXCF STOP operator command, in accordance with the principles of the present invention.

A policy change routine is used to determine if an administrative policy is to become a new active policy. It is the SETXCF command that is used to activate a named administrative coupling facility resource management policy, as shown in the overview diagram of FIG. 16. As shown, a command, such as a SETXCF START command entered through the operator's console, causes an I/O interrupt resulting in control being given to a policy change routine, which is used to request an administrative policy to become the active policy located on function data set 132. (Function data set 132 is coupled to CPC 12a (and, in particular, I/O channels 22a (not shown)) via a link 26a.)

Figure 17A:
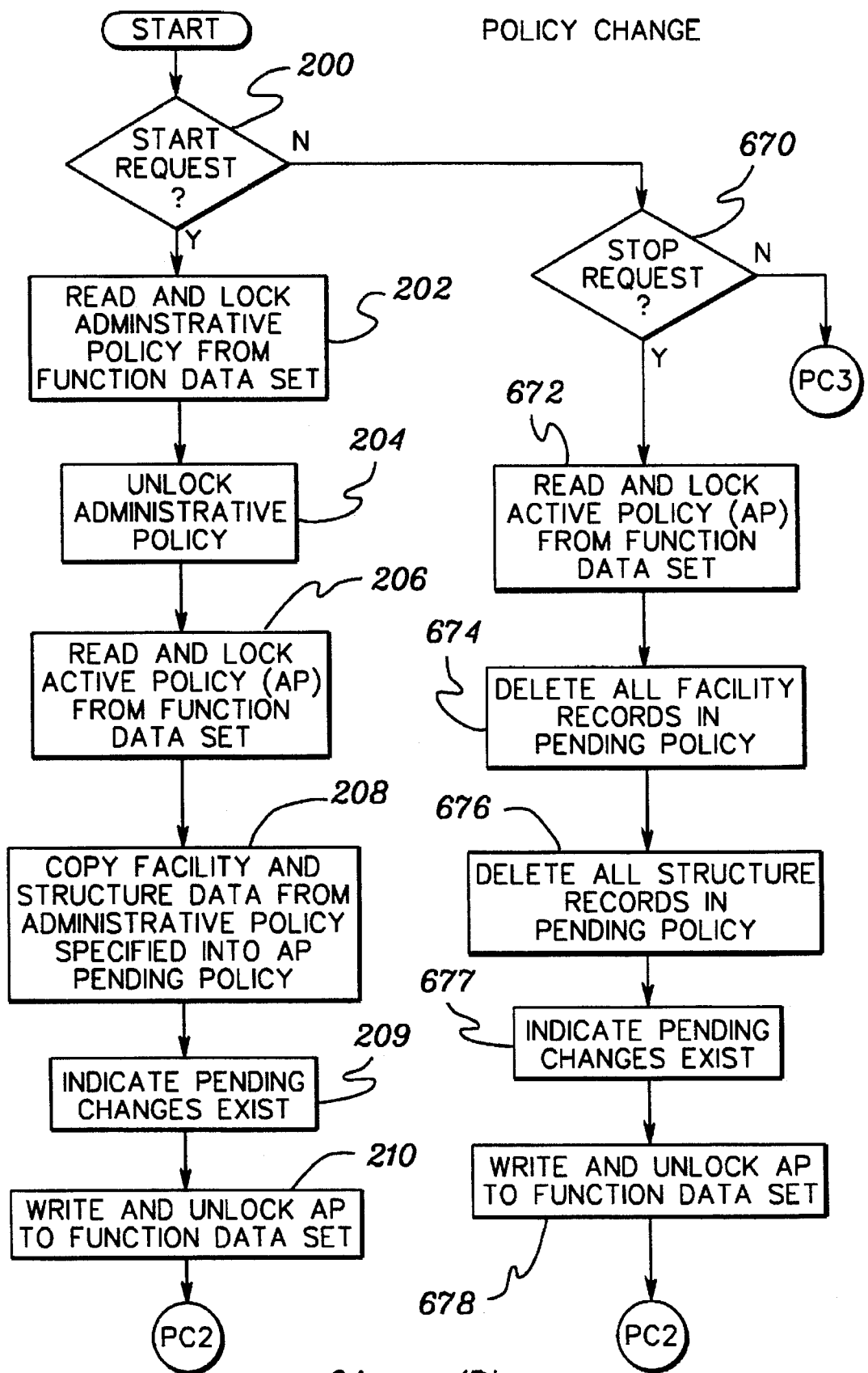
FIGS. 17a–17c depict one embodiment of the logic associated with a policy change routine, in accordance with the principles of the present invention.
Figure 17B:
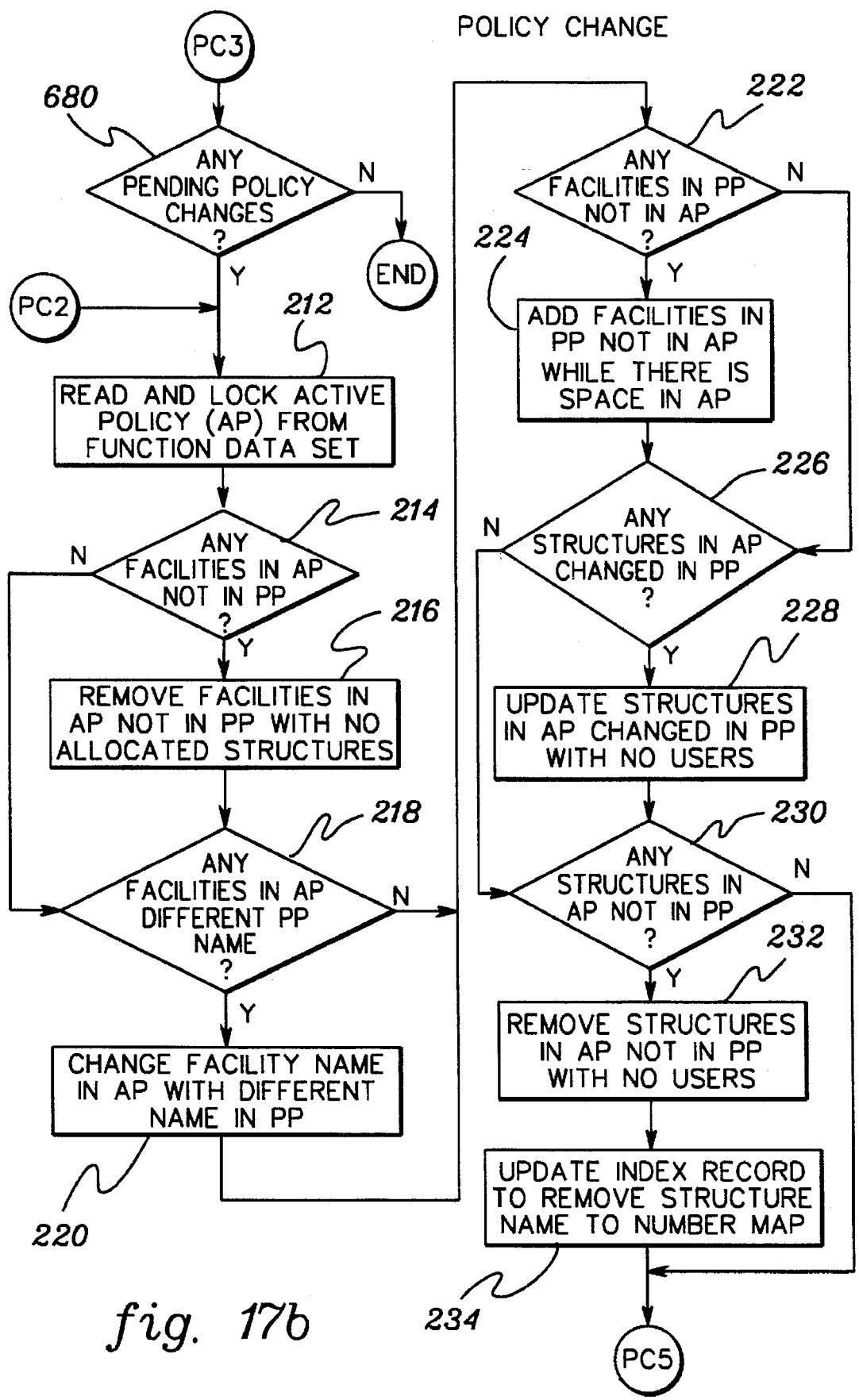
Figure 17C:
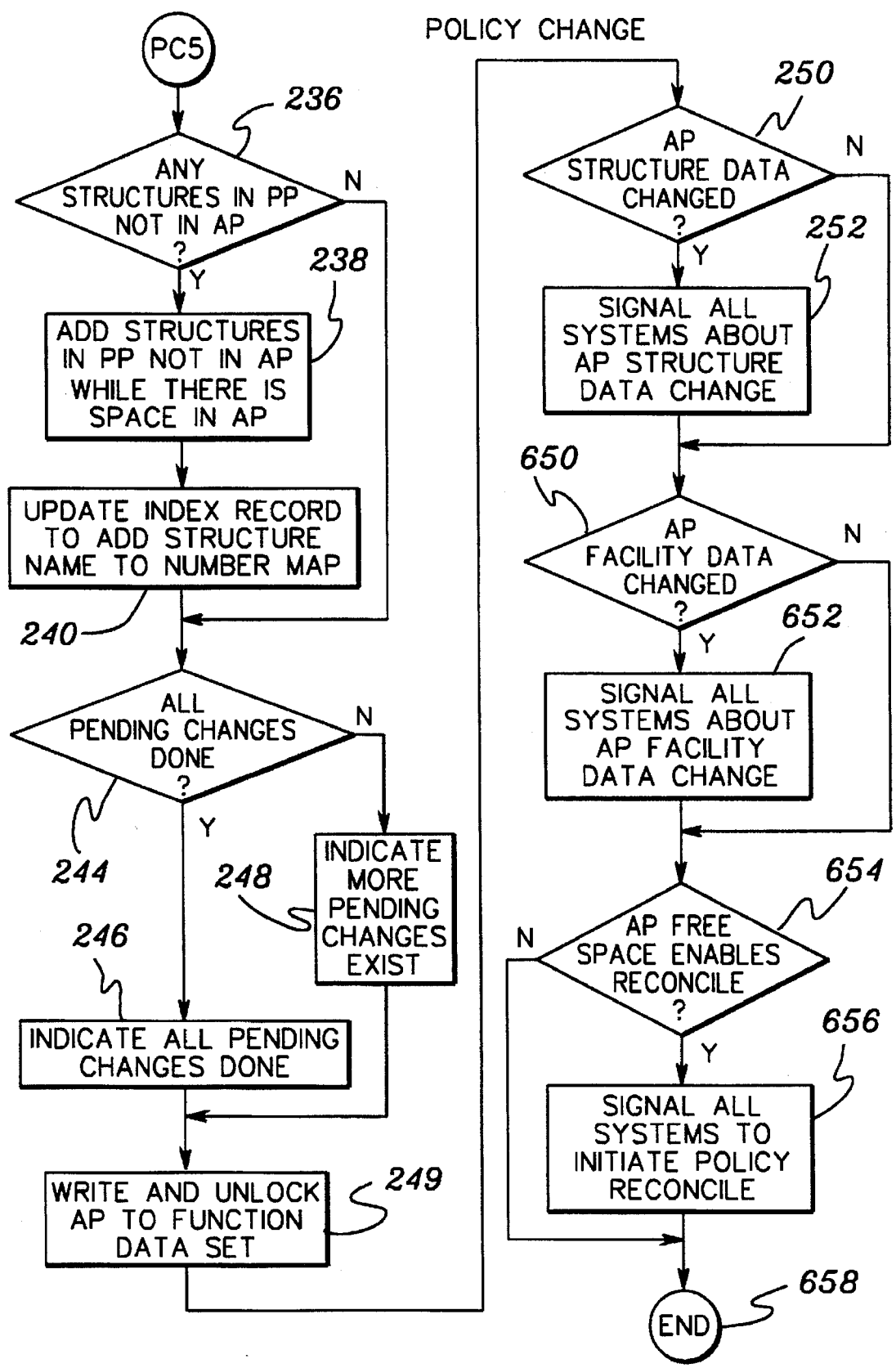

One embodiment of the logic associated with a policy change routine is described in detail with reference to FIGS. 17a–17c. Initially, a determination is made as to whether a start request, such as SETXCF START, was received, INQUIRY 200 "START REQUEST?" If a start request was received, then the administrative policy from the function data set is read and the function data set is locked, STEP 202 "READ AND LOCK ADMINISTRATIVE POLICY FROM FUNCTION DATA SET." Thereafter, the administrative policy is unlocked, STEP 204, and the active policy is read and the function data set is locked, STEP 206. The facility and structure data from the administrative policy is copied into the active policy pending policy definition record 146 (FIG. 15), STEP 208 "COPY FACILITY AND STRUCTURE DATA FROM ADMINISTRATIVE POLICY SPECIFIED INTO AP PENDING POLICY." Thereafter, an indication is made in the pending policy header that pending changes exist, STEP 209, and the active policy is written to the function data set and the function data set is unlocked, STEP 210.

Subsequently, the active policy is read from the function data set and the function data set is locked, STEP 212. Using the information read from the active policy, synchronization of the information in the pending and active policy begins. Initially, a determination is made as to whether any facilities in the active policy exists that are not in the pending policy, INQUIRY 214 "ANY FACILITIES IN AP NOT IN PP?" If there are facilities in the active policy that are not in the pending policy, then the facilities in the active policy not in the pending policy, which have no allocated structures, are removed, STEP 216 "REMOVE FACILITIES IN AP NOT IN PP WITH NO ALLOCATED STRUCTURES."

Subsequent to removing the specified facilities, or if there are no facilities in the active policy that are not in the pending policy, a determination is made as to whether there is any discrepancies in the names of the facilities in the active policy and those in the pending policy, INQUIRY 218 "ANY FACILITIES IN AP DIFFERENT PP NAME?" If there are facilities in the active and pending policies with different names, then the facility name in the active policy is changed to coincide with the different name in the pending policy, STEP 220 "CHANGE FACILITY NAME IN AP WITH DIFFERENT NAME IN PP." This is accomplished by updating coupling facility record 140 (FIG. 15).

After changing the facility name, or if the facility names in both the active policy and the pending policy coincide, then another determination is made as to whether there are any facilities in the pending policy which are not in the active policy, INQUIRY 222 "ANY FACILITIES IN PP NOT IN AP?"

Should there be facilities in the pending policy that are not in the active policy, the facilities in the pending policy are added to the active policy while there is space in the active policy, STEP 224. After adding the facilities to the active policy, or if there are no facilities in the pending policy that are not in the active policy, a check is made to see if any structures in the active policy changed in the pending policy, INQUIRY 226 "ANY STRUCTURES IN AP CHANGED IN PP?" If so, those structures with no users are updated in the active policy to coincide with those in the pending policy, STEP 228 "UPDATE STRUCTURES IN AP CHANGED IN PP WITH NO USERS." Thereafter, or if there are no structures in the active policy with no active users that are changed in the pending policy, a further determination is made as to whether any structures in the active policy are not in the pending policy, INQUIRY 230 "ANY STRUCTURES IN AP NOT IN PP?"

If there are structures in the active policy that are not in the pending policy, then the structures in the active policy that do not have any users associated therewith are removed from the active policy, STEP 232 "REMOVE STRUCTURES IN AP NOT IN PP WITH NO USERS" and index record 142 is updated to remove the structure name to number map, STEP 234 "UPDATE INDEX RECORD TO REMOVE STRUCTURE NAME TO NUMBER MAP."

Subsequent to updating the index record, or if there are not any structures in the active policy with no active users that are not in the pending policy, a determination is made as to whether there are any structures in the pending policy that are not in the active policy, INQUIRY 236 "ANY STRUCTURES IN PP NOT IN AP?" Should there be structures in the pending policy that are not in the active policy, then as long as there is space in the active policy, the structures are added to the active policy, STEP 238 "ADD STRUCTURE IN PP NOT IN AP WHILE THERE IS SPACE IN AP." In addition, the index record is updated in order to add structure name to number map, STEP 240. After updating the index record or if the structures in the pending policy coincide with the structures in the active policy, a determination is made as to whether all pending changes have been made, INQUIRY 244 "ALL PENDING CHANGES DONE?" In particular, the structure and facility counts in the pending policy header are checked. When all of the pending changes are complete, then an indication of such is made in the header record of the pending policy, STEP 246. Otherwise, if there are more changes to be made, an indication of further pending changes is made, STEP 248.

Thereafter the active policy is written to the function data set and the function data set is unlocked, STEP 249 "WRITE AND UNLOCK AP TO FUNCTION DATA SET."

Subsequently, a check is made to see if active policy structure data located in the policy data 150 of structure record 144 is changed, INQUIRY 250 "AP STRUCTURE DATA CHANGED?" Should structure data be changed, a signal is passed to all systems, indicating that the active policy structure data has changed, STEP 252 "SIGNAL ALL SYSTEMS ABOUT AP STRUCTURE DATA CHANGE." In one embodiment, the logic associated with signaling all systems about the structure data change is described in detail with reference to FIG. 18.

Figure 18:
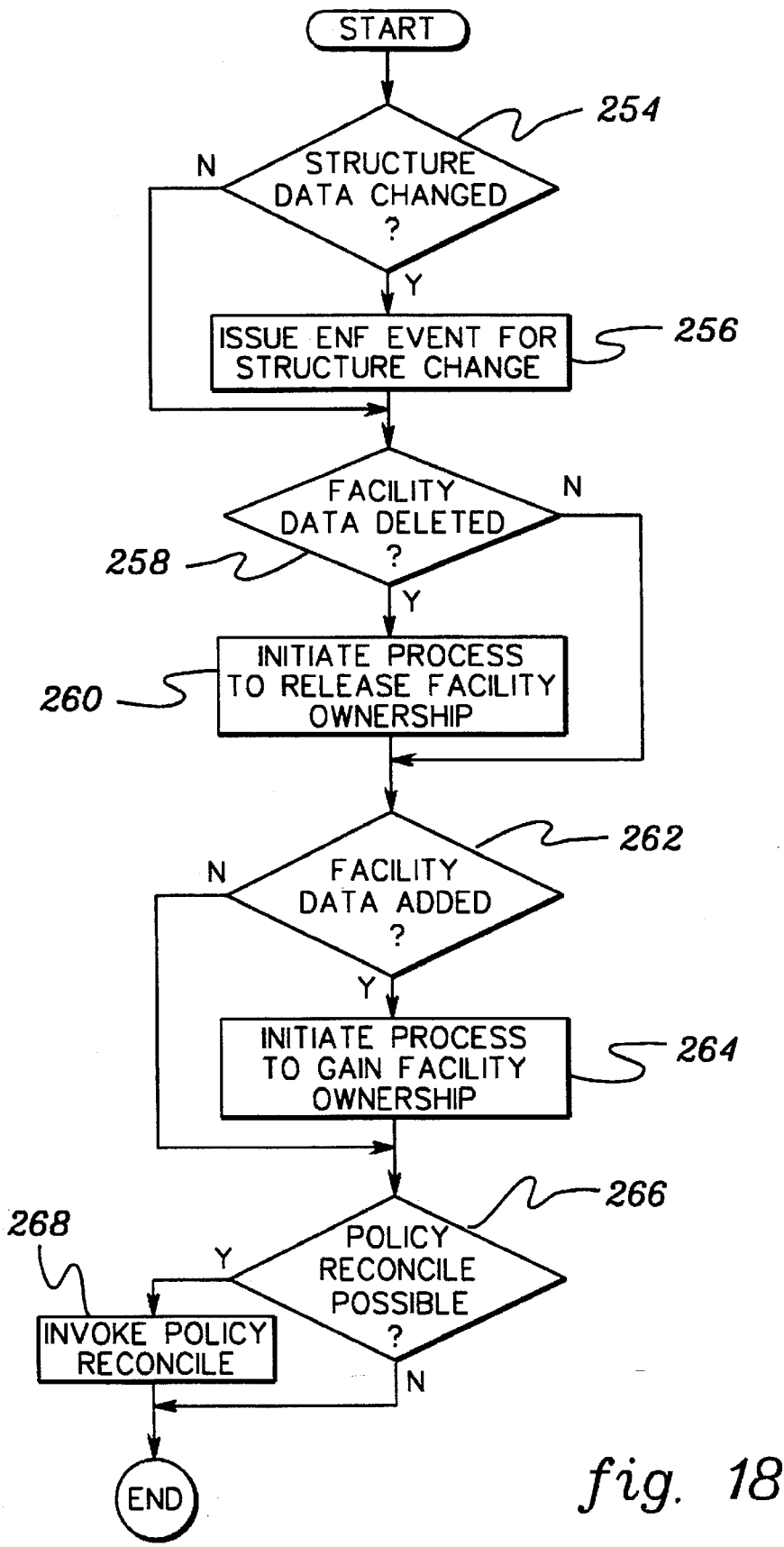
FIG. 18 illustrates one embodiment of the logic associated with a policy change signal process, in accordance with the principles of the present invention.

Referring to FIG. 18, an inquiry is made into whether the structure data has changed, INQUIRY 254 "STRUCTURE DATA CHANGE?" If the structure data has changed, as indicated by the signal passed by the policy change routine, a known event notification facility (ENF) is utilized to provide notification for structure change is issued, STEP 256. Thereafter, or if no structure data was changed, a determination is made as to whether facility data located in coupling facility record 140 of the active policy was deleted, INQUIRY 258 "FACILITY DATA DELETED?" If facility data was deleted, as indicated by a signal passed by the policy change routine, then a process to release facility ownership is initiated, STEP 260 "INITIATE PROCESS TO RELEASE FACILITY OWNERSHIP." This is accomplished through manipulation of the coupling facility global controls, including the authority operand in global controls 67, as described in "Authorization Method for Conditional Command Execution," by Elko et al., Ser. No. 08/021,285 (PO9-92-018), filed Feb. 22, 1993, which is incorporated herein by reference in its entirety.

After initiating the process to release facility ownership, or if there was no facility data deleted, a further check is made to see whether facility data was added to coupling facility record 140, INQUIRY 262 "FACILITY DATA ADDED?" Should facility data be added, as indicated by the signal passed by the policy change routine, the process to gain facility ownership is initiated, STEP 264 "INITIATE PROCESS TO GAIN FACILITY OWNERSHIP," as described above.

Subsequent to initiating the process to gain facility ownership, or if no facility data was added, a check is made to see if policy reconciliation is possible, INQUIRY 266 "POLICY RECONCILE POSSIBLE?" If policy reconciliation is not possible, as indicated by the signal passed by the policy change routine, then the policy change signal process is complete. On the other hand, if policy reconciliation is possible, then a policy reconciliation routine is invoked, STEP 268 "INVOKE POLICY RECONCILE."

One embodiment of the policy reconciliation routine is described in detail with reference to FIGS. 19a–19c. The policy reconciliation routine is used to reconcile the information regarding coupling facility information and information within the active policy. As described below, a number of comparisons are made to reconcile any differences.

Policy reconciliation will be called when ownership of a coupling facility is gained, a new policy is activated, or when space is made available in the active policy and there exists some structures, or users of the structures, which could not be reconciled when ownership of the coupling facility was gained. The general strategy is to determine if reconciliation of users or structures is required.

The data maintained in the coupling facility is assumed to be more accurate than the data maintained in the active policy in the function data set on DASD, since the coupling facility actually contains the structures relevant to the exploiting subsystem/system components. The reconciliation process is done for each coupling facility for which the sysplex has gained ownership and consists of obtaining resource usage from the coupling facility and matching this to the data contained in the active policy. The active policy is reconstructed with operator intervention minimized. As described below, structure reconstruction/reconciliation consists of deallocating structures which are not persistent and have no persistent connections, checking to make sure that all persistent structures are represented in the active policy, and dealing with structures allocated by other sysplexes via operator intervention. Connection reconstruction/reconciliation consists of deleting connections which are not persistent and checking to make sure that all persistent connections are represented in the active policy.

On completion of active policy to coupling facility reconcile and coupling facility to active policy comparison reconcile, there may have been detected allocated structures which are owned by a different sysplex. The operator is prompted once per different sysplex to determine if structures within the coupling facility owned by a different sysplex should be ignored or deallocated. Structures owned by different sysplexes are ignored or deallocated, based on operator response.

Figure 19A:
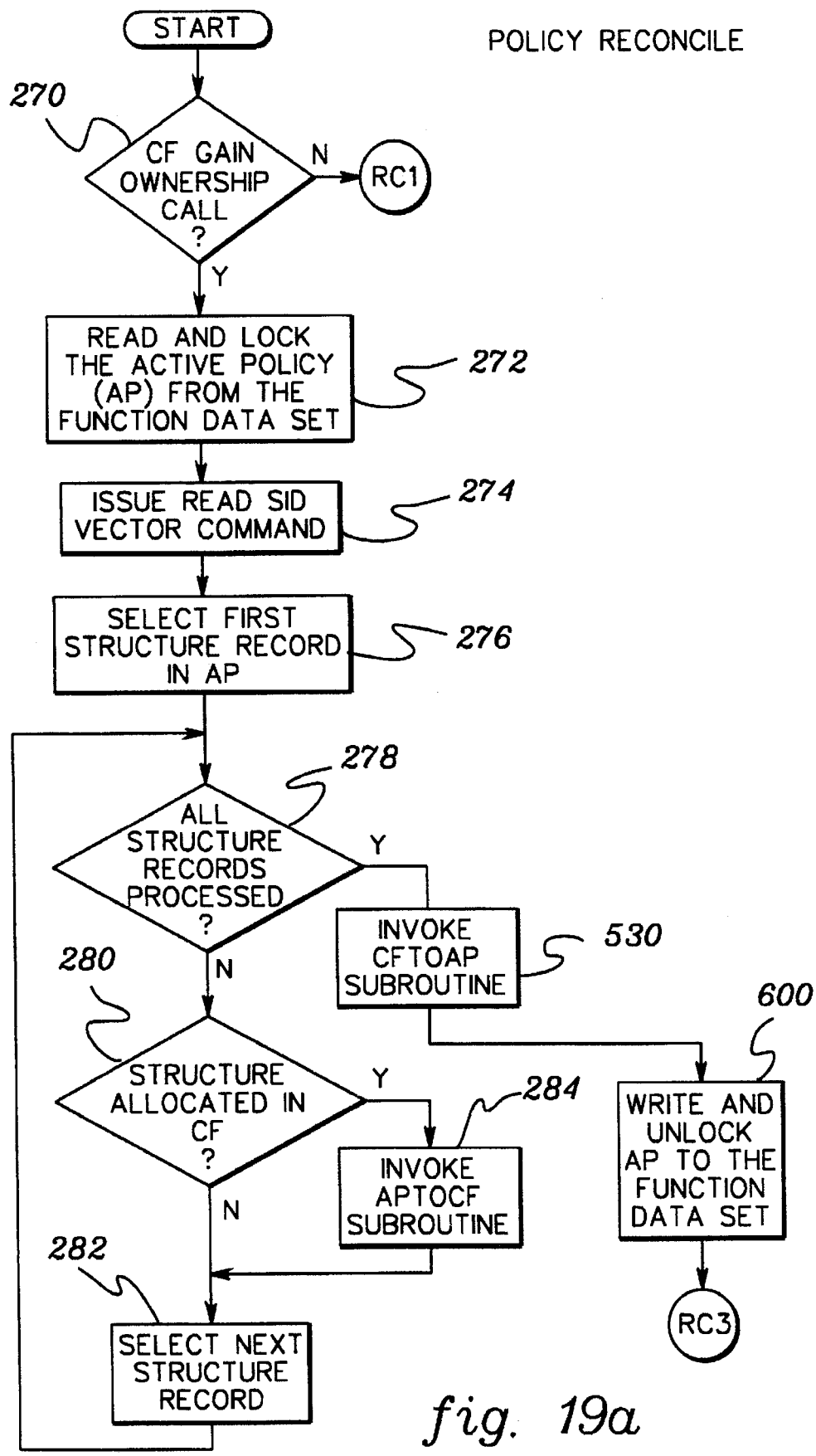
FIGS. 19a–19c depict one embodiment of the logic associated with a policy reconciliation routine, in accordance with the principles of the present invention.
Figure 19B:
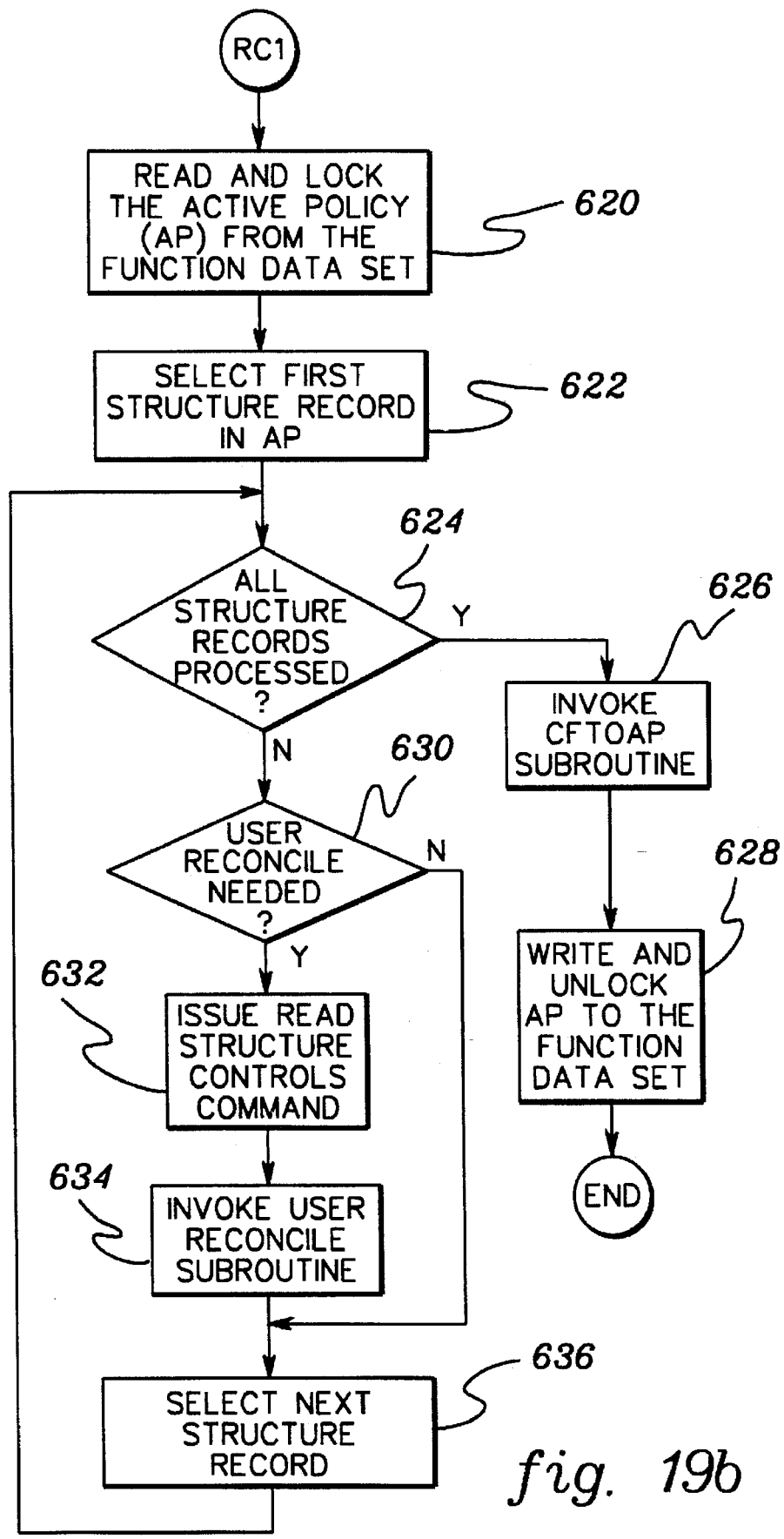

Referring to FIG. 19a, initially, an inquiry is made as to whether coupling facility gain ownership call is made, INQUIRY 270 "CF GAIN OWNERSHIP CALL?" Should such a call be made, then the active policy is read from the function data set and the function data set is locked, STEP 272. Thereafter, a read SID vector command is issued in order to obtain all structure identifiers, STEP 274 "ISSUE READ SID VECTOR COMMAND." Subsequent to obtaining the structure identifiers, the first structure record in the active policy is selected, STEP 276 "SELECT FIRST STRUCTURE RECORD IN ACTIVE POLICY."

Figure 20A:
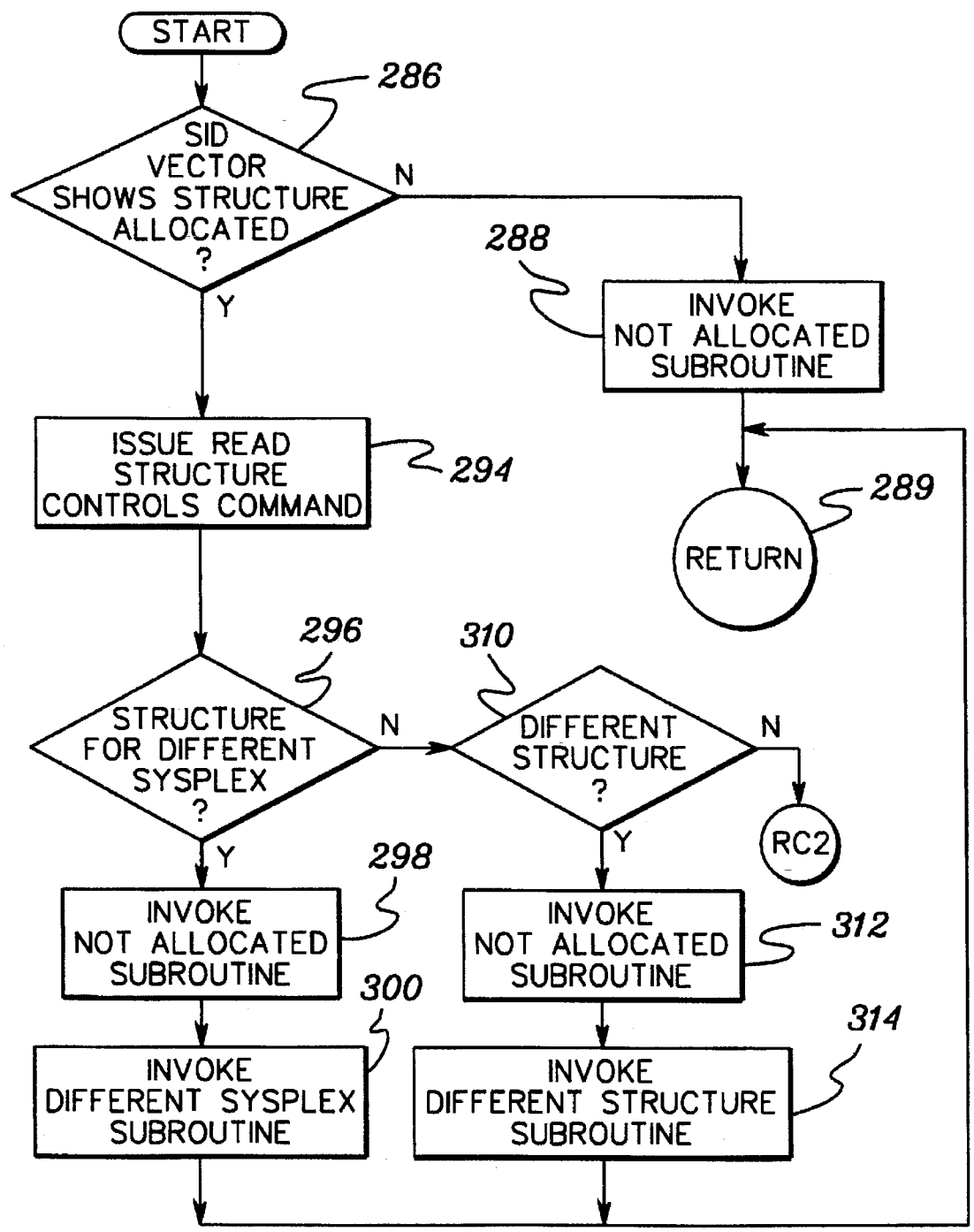
Figure 20B:
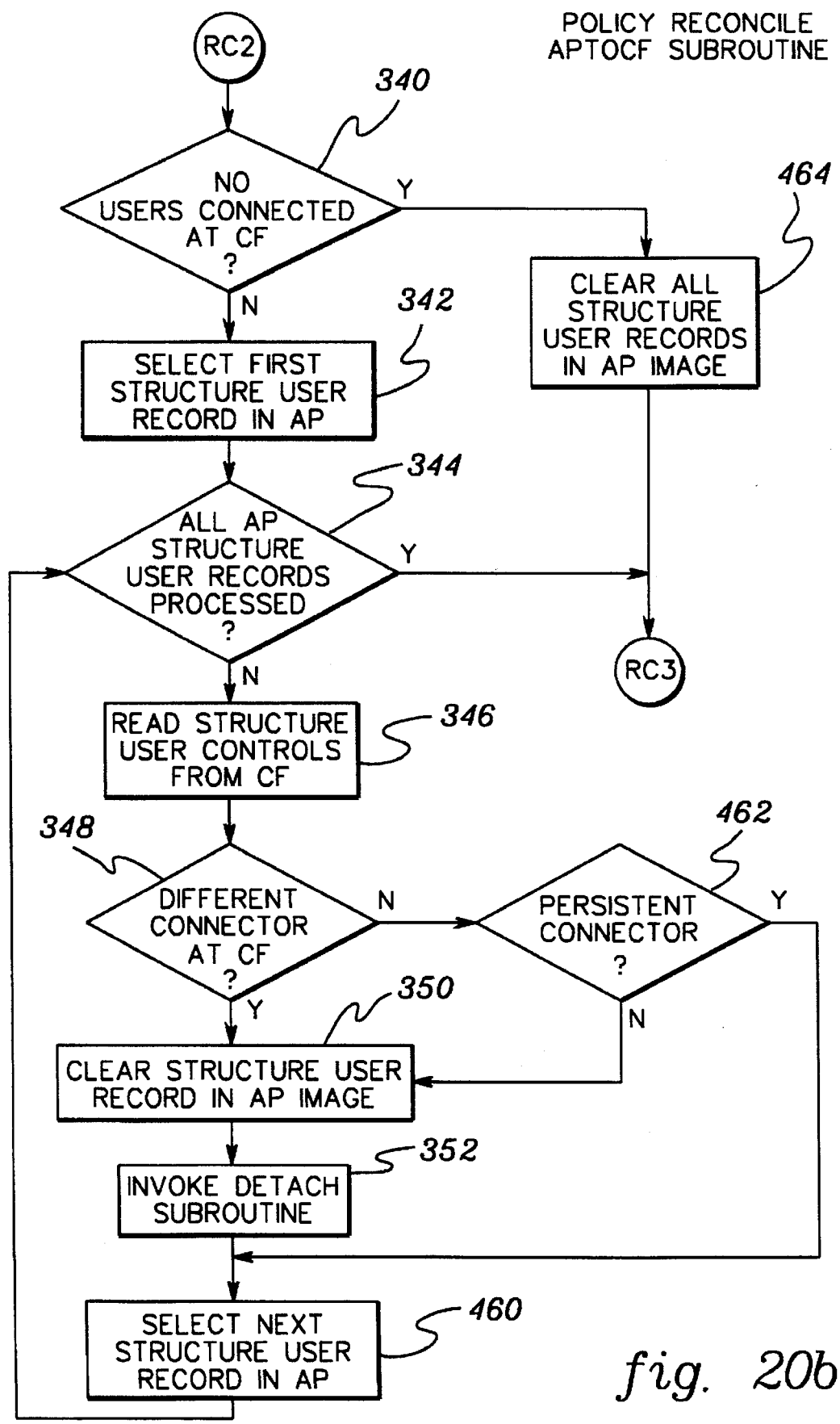

If all of the structure records have not been processed, INQUIRY 278 "ALL STRUCTURE RECORDS PROCESSED?" and the structure is not allocated in the coupling facility, INQUIRY 280, then the next structure record is selected, STEP 282, and flow passes to INQUIRY 278 "ALL STRUCTURE RECORDS PROCESSED?" Returning to INQUIRY 280, if the structure is allocated in the coupling facility, then an active policy to coupling facility reconciliation subroutine is invoked, STEP 284 "INVOKE APTOCF SUBROUTINE." One embodiment of the active policy to coupling facility reconciliation subroutine is described in detail with reference to FIG. 20a–20c.

Referring to FIG. 20a, initially, an inquiry is made to determine whether the SID vector shows the structure as allocated, INQUIRY 286 "SID VECTOR SHOWS STRUC- TURE ALLOCATED?" In particular, if the bit associated with the SID in the SID vector is one, the structure is allocated, and if the bit is zero, the structure is not allocated. When the structure is not allocated, a not allocated subroutine is invoked, STEP 288 "INVOKE NOT ALLOCATED SUBROUTINE." One embodiment of the not allocated subroutine is described in detail with reference to FIG. 21. Referring to FIG. 21, all structure user records in the active policy image in virtual storage are cleared, STEP 290 "CLEAR ALL STRUCTURE USER RECORDS IN AP IMAGE." Thereafter, the structure record status located in structure record 144 in the active policy image is cleared, STEP 292, and processing of the not allocated subroutine is completed.

Returning to FIG. 20a and, in particular, STEP 288, after the not allocated subroutine is complete, the active policy to coupling facility subroutine is also complete.

Returning to INQUIRY 286, if the structure is allocated, a read structure controls command is issued, STEP 294. In particular, if the structure is a cache structure, then cache structure controls 69 (as depicted in FIG. 4) are accessed and one or more of the controls are returned, along with a successful response code in the response operands depicted in FIG. 13. Further, if the structure is a list structure, then list structure controls 92 (as depicted in FIG. 8) are accessed and the appropriate controls and a successful response code are returned in the response operands depicted in FIG. 13.

Subsequent to reading the structure controls, a determination is made as to whether the structure is for a different sysplex, INQUIRY 296 "STRUCTURE FOR DIFFERENT SYSPLEX?" Should the structure be for a different sysplex, then the not allocated subroutine, as described above with reference to FIG. 21, is invoked, STEP 298 "INVOKE NOT ALLOCATED SUBROUTINE." Thereafter, a different sysplex subroutine is invoked, STEP 300 "INVOKE DIFFERENT SYSPLEX SUBROUTINE."

One embodiment of a different sysplex subroutine is described in detail with reference to FIG. 22. In particular, an entry for the structure owned by the different sysplex is built in local storage, STEP 302 "BUILD ENTRY FOR STRUCTURE OWNED BY DIFFERENT SYSPLEX." This entry includes the coupling facility identified by the authority control in global controls 67, the sysplex name, structure name and the SID. Subsequent to building the entry, the entry is added to a different sysplex queue stored in local processor storage in order of different sysplex name, STEP 304.

Subsequent to completing the different sysplex subroutine, processing of the active policy to coupling facility subroutine ends.

Returning to INQUIRY 296, if the structure is not for a different sysplex, then a further determination is made as to whether it is a different structure, INQUIRY 310 "DIFFERENT STRUCTURE?" Should the structure be different, then the not allocated subroutine described above is invoked, STEP 312. Thereafter, a different structure subroutine, described below, is invoked, STEP 314 "INVOKE DIFFERENT STRUCTURE SUBROUTINE."

One embodiment of a different structure subroutine is described in detail with reference to FIG. 23. Referring to FIG. 23, initially, a determination is made as to whether the structure is persistent, INQUIRY 320 "STRUCTURE PERSISTENT?" Should the structure be persistent, the different structures subroutine ends and flow returns to FIG. 20a and, in particular, STEP 288, "INVOKE NOT ALLOCATED SUBROUTINE." On the other hand, if the structure is not persistent, then a deallocate subroutine, described below with reference to FIG. 27, is invoked, STEP 322 "INVOKE DEALLOCATE SUBROUTINE." Thereafter, flow returns to FIG. 20a and, in particular, STEP 289 "RETURN."

Returning to INQUIRY 310 "DIFFERENT STRUCTURE?", if the structure is not different, then an inquiry is made as to whether users are connected at the coupling facility, INQUIRY 340 (FIG. 20b) "NO USERS CONNECTED AT CF?" If there are users connected at the coupling facility, then the first structure user record in the active policy is selected, STEP 342 "SELECT FIRST STRUCTURE USER RECORD IN AP." Thereafter, a determination is made as to whether all of the active policy structure user records have been processed, INQUIRY 344 "ALL AP STRUCTURE USER RECORDS PROCESSED?" If all of the active policy structure user records have not been processed, then the structure user controls from the coupling facility are read, STEP 346 "READ STRUCTURE USER CONTROLS FROM CF." In particular, if the structure is a cache structure, then local cache control block 70 is accessed and a successful response code along with a number of the objects from the local cache control block are returned in response operands of FIG. 13. Further, if the structure is a list structure, then the operands of list user control block 94 are accessed and returned, along with a successful response code, in the response operands of FIG. 13. If there is no structure user controls, flow passes to STEP 350, as described below.

Subsequent to reading the structure user controls from the coupling facility, a determination is made as to whether there is a different connector at the coupling facility, INQUIRY 348 "DIFFERENT CONNECTOR AT CF?" Should there be a different connector at the coupling facility, then the structure user record in the active policy image is cleared and a detach subroutine, described below, is invoked, STEPS 350, 352.

Figure 24:
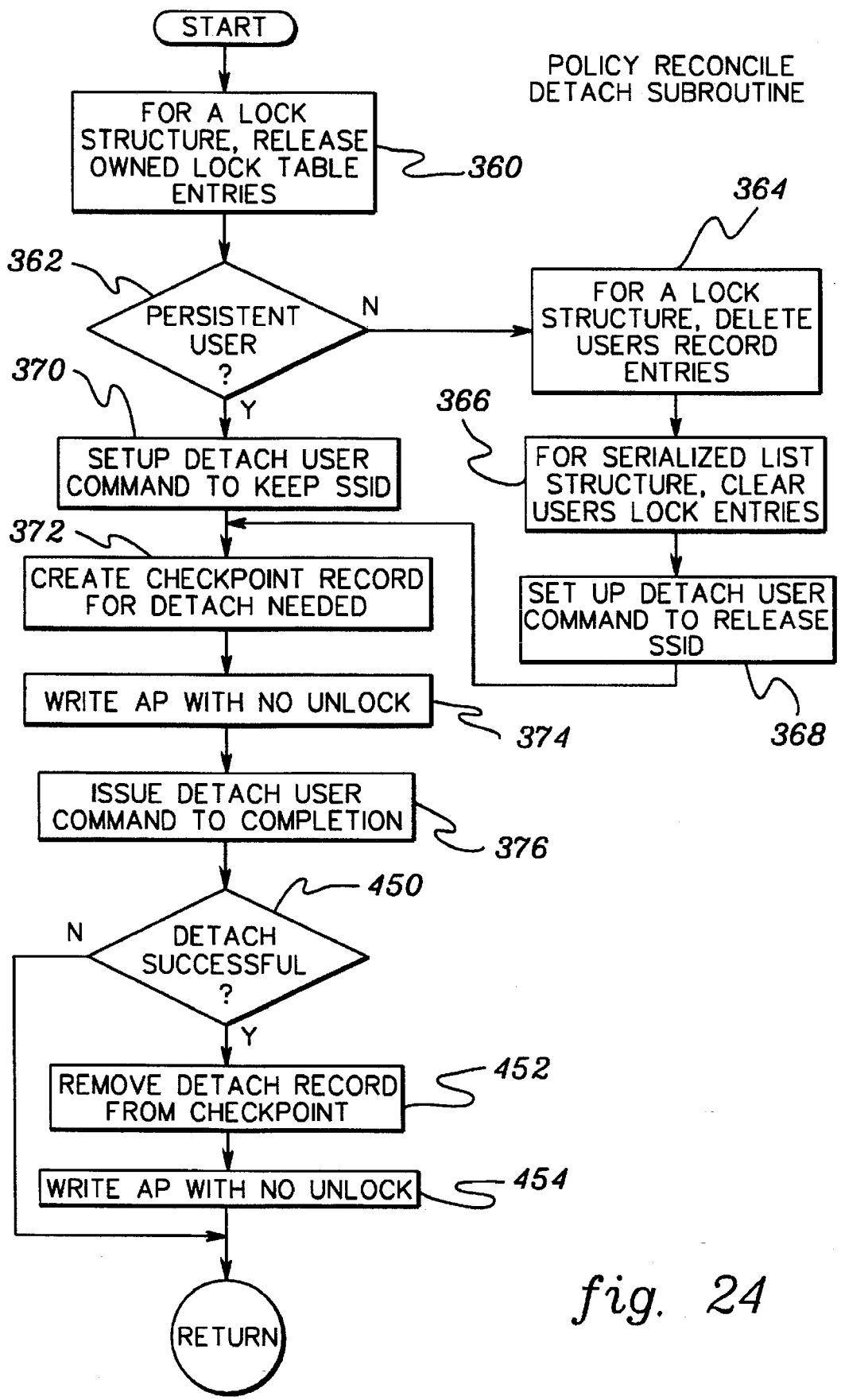
FIG. 24 illustrates one example of the logic associated with a detach subroutine for the policy reconciliation routine of FIGS. 19a–19c, in accordance with the principles of the present invention.

One embodiment of a detached subroutine is described in detail with reference to FIG. 24. Initially, the owned lock table entries are released for a lock structure, STEP 360 "FOR A LOCK STRUCTURE, RELEASE OWNED LOCK TABLE ENTRIES." Thereafter, if the user is not persistent, INQUIRY 362 "PERSISTENT USER?", the user record entries for a lock structure are deleted, STEP 364, the users lock entries for a serialized list structure are cleared, STEP 366, and the detach user command, described below with reference to FIGS. 25a–25b, is set up to release the SSID, STEP 368.

Figure 25A:
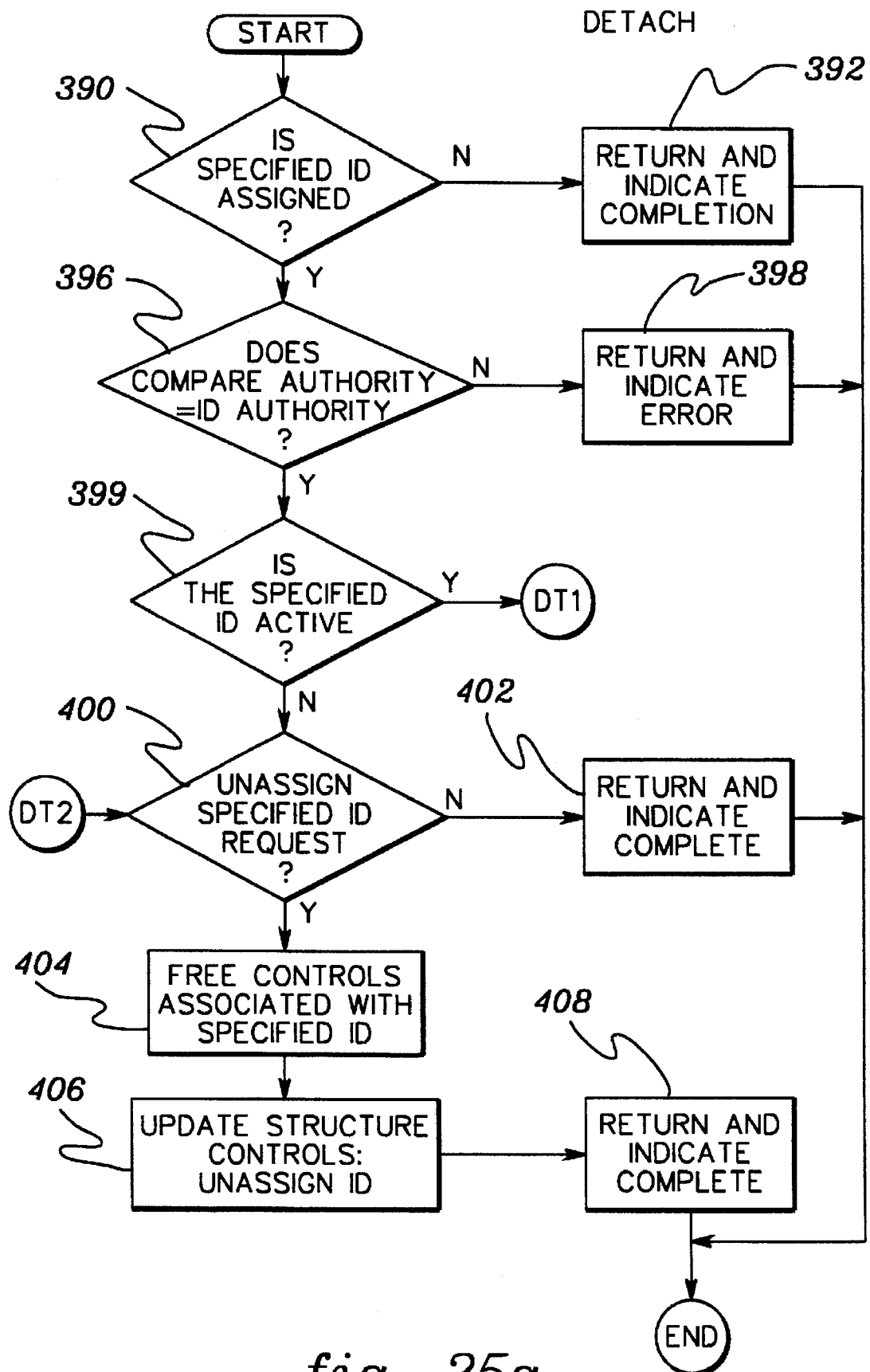
FIGS. 25a–25b depict one embodiment of the logic associated with a detach command, in accordance with the principles of the present invention.
Figure 25B:
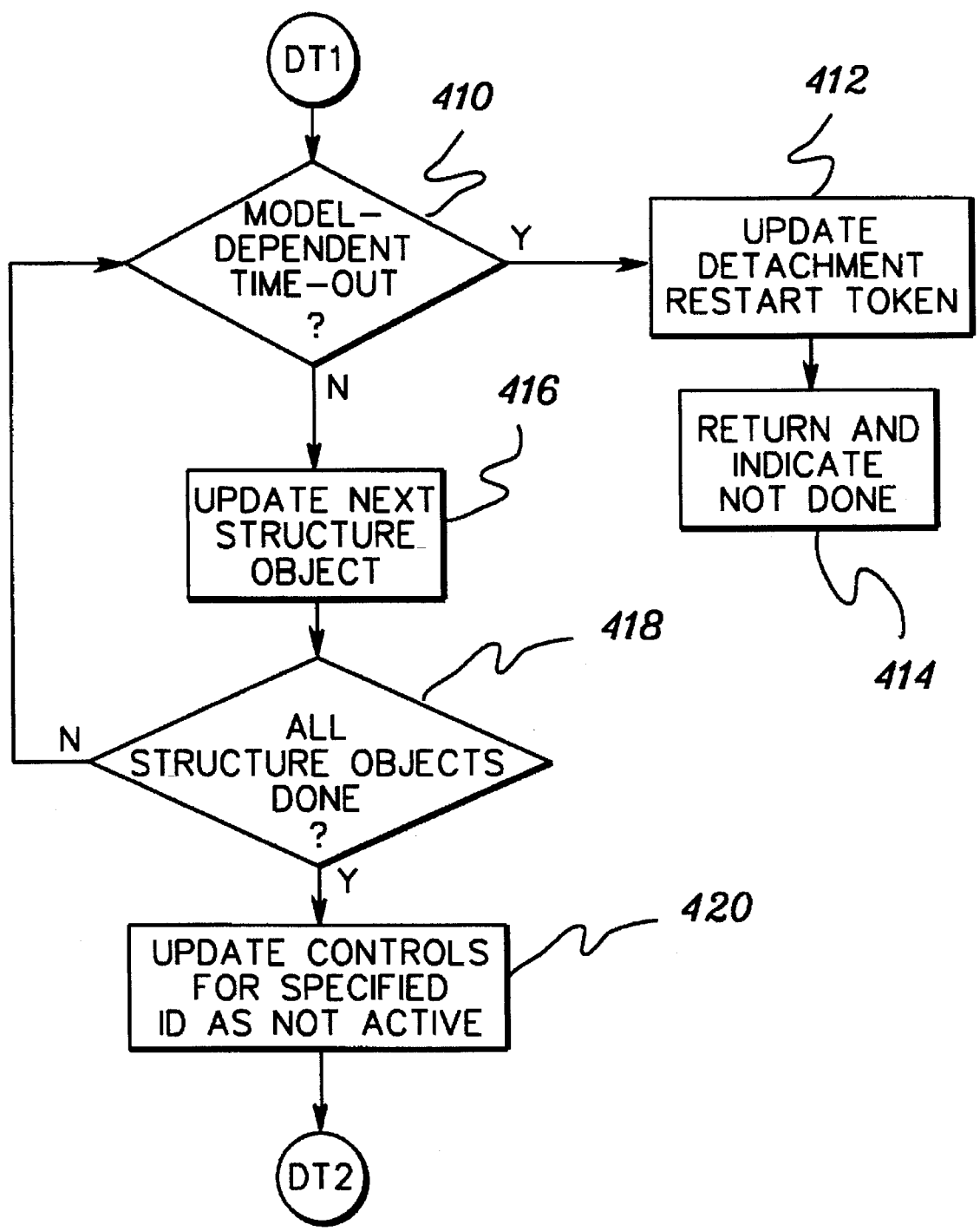

Returning to INQUIRY 362, if the user is persistent, then the detach user command is set up to keep the SSID, STEP 370, "SET UP DETACH USER COMMAND TO KEEP SSID." After setting up the detach user command to either keep or release the SSID, a checkpoint record is created which indicates that detach is needed, STEP 372 "CREATE CHECKPOINT RECORD FOR DETACH NEEDED." Subsequently, the active policy is written with no unlock, STEP 374, and a detach user command, as described below with reference to FIGS. 25a–25b, is processed to completion, STEP 376 "ISSUE DETACH USER COMMAND TO COMPLETION."

In particular, a detach-local-cache command is issued to update the directory and local cache controls of a coupling facility cache. Alternatively, a detach-list-structure-user command is used to detach a list structure user. One embodiment of the logic associated with a detach-local-cache command and/or a detach-list-structure-user command is described in detail below with reference to FIGS. 25a–25b. The particular controls associated with the detach-list-structure-user command are included in parentheses after the associated cache controls for the detach-local cache command.

Referring to FIG. 25a, a determination is made as to whether a local cache identifier (FIG. 5) (or a user identifier in FIG. 9 in the case of the detach-list-structure-user command) is assigned, INQUIRY 390 "IS SPECIFIED ID ASSIGNED?" In particular, the LCID (or UID) string, which is indexed by LCID (or UID) is checked to see if the bit is on. If the bit is equal to one, the local identifier (or user identifier) is assigned. When the local cache identifier (or user identifier) is not assigned indicating that detachment has been completed, a completion code is returned, STEP 392 "RETURN AND INDICATE COMPLETION."

Should the local cache identifier (or user identifier) be assigned, an authority comparison takes place, INQUIRY 396 "DOES COMPARE AUTHORITY=ID AUTHORITY?" In particular, comparative local-cache authority (or comparative user authority) (FIG. 13) is compared to local-cache authority (FIG. 5) (or user authority (FIG. 9)). Should the comparison fail, the command is completed and the value of the local-cache authority (or user authority and user-attachment control) (FIG. 13) is returned, as well as an error code, STEP 398 "RETURN AND INDICATE ERROR."

If the comparison is successful, a determination is made as to whether the local cache identifier (or user identifier) is active, INQUIRY 399 "IS THE SPECIFIED ID ACTIVE?" That is, is the local cache identifier (or user identifier) inactive, as designated by the attachment status (FIG. 5) (or user attachment control (FIG.9))? Should the local cache identifier (or user identifier) be inactive, a determination is made as to whether the local cache identifier (or user identifier) is to be unassigned, INQUIRY 400 "UNASSIGN SPECIFIED ID REQUEST?" In particular, the LCID-unassignment control (or the detachment-request type) (FIG. 13) is checked, and if it is zero, no action is taken and a successful response code is returned, STEP 402 "RETURN AND INDICATE COMPLETE."

On the other hand, when the LCID-unassignment control (or detachment-request type) is set to one indicating that the local cache identifier (or user identifier) is to be released, then the local-cache controls in FIG. 5 (or the list-user controls in FIG. 9) and the designated bit in the LCID vector (or the user identifier vector) are reset and a successful response code is returned, STEPS 404, 406, and 408.

Returning to INQUIRY 399 "IS THE SPECIFIED ID ACTIVE?", when the local-cache identifier (or user identifier) is active, as designated by the attachment status in FIG. 5 (or user attachment control in FIG. 9) and therefore, attached, an inquiry is made into whether a model-dependent time-out has occurred, INQUIRY 410 (FIG. 25b) "MODEL-DEPENDENT TIME-OUT?" When the model-dependent time-out value is exceeded, the detachment restart token is updated in the local cache controls (for a list structure, list user controls is updated) and an exception response is returned, STEPS 412, 414.

However, when the model-dependent time-out has not been exceeded, the detachment process continues. In particular, for a cache detachment, the directory is searched starting with the directory entry specified by the detachment restart token in the local-cache controls. When the detachment restart token is not zero, detach processing is resumed at the directory entry specified in the token.

Each directory entry is processed as follows: the local-cache register is updated by clearing the row assigned to the local-cache specified by the LCID request operand, STEP 416 "UPDATE NEXT STRUCTURE OBJECT." The cast-out lock is tested. When the first byte of the cast-out lock is set to the value specified in the LCID operand, the cast-out lock is reset to zero, and the change bit in state field 80 is set to indicate the data is changed.

When the entire directory has not been processed, INQUIRY 418, "ALL STRUCTURE OBJECTS DONE?", flow returns to INQUIRY 410. However, when the entire directory has been processed, INQUIRY 418 "ALL STRUCTURE OBJECTS PROCESSED?", the attachment status control is updated as not active, STEP 420. Further, when the local-cache unassignment control is one, INQUIRY 400 (FIG. 25a), the designated bit in the LCID vector and the local-cache controls are reset and a successful response is returned, STEPS 404, 406 and 408.

When the entire directory has been processed, the attachment status is reset to inactive, STEP 420, and when the local-cache unassignment control is zero, INQUIRY 400, a successful response code is returned, STEP 402. The remaining local-cache controls and the LCID vector are not changed.

When the model-dependent time-out period has not been exceeded and it is a list structure detachment process, the next list-monitor table entry associated with the list-structure user is updated by resetting the associated list-monitoring-active bit, STEP 416 "UPDATE NEXT STRUCTURE OBJECT." When all of the list-monitoring-active bits of all the list-monitor-table entries associated with the list-structure user are reset, INQUIRY 418 "ALL STRUCTURE OBJECTS DONE?", then the user-attachment control is updated to inactive, STEP 420 "UPDATE CONTROLS FOR SPECIFIED ID AS NOT ACTIVE," and flow passes to INQUIRY 400 "UNASSIGN SPECIFIED ID REQUEST?" Should all the structure objects not be done, flow passes back to INQUIRY 410 "MODEL-DEPENDENT TIME-OUT?"

If a detach-list-structure-user command is reissued until a successful response code is returned and no intervening register-list-monitor commands are received for the same user, then all the list-notification commands issued on behalf of the detached user are complete.

The detach-list-structure user command is an exception to the specification of command-concurrent references. A register-list-monitor command is permitted to complete successfully during execution of a detach-list-structure-user command. The program serializes the detachment process with the issuance of register-list-monitor commands, if all list-notification commands for a user must be complete when a user is detached.

An assigned user identifier for a detached user may be unassigned by issuing the detach-list-structure-user command with the appropriate detachment-request type.

Returning to FIG. 24 and, in particular, INQUIRY 450, if the detach command processed successfully, INQUIRY 450, then the detach record is removed from the checkpoint save area, STEP 452 "REMOVE DETACH RECORD FROM CHECKPOINT." Further, the active policy is written with no unlock, STEP 454. After writing the active policy with no unlock or if the detach was unsuccessful, then the detach subroutine is complete and flow returns to FIG. 20b and, in particular, STEP 460 "SELECT NEXT STRUCTURE USER RECORD IN AP."

After selecting the next structure user record in the active policy, STEP 460, flow returns to INQUIRY 344 "ALL AP STRUCTURE USER RECORDS PROCESSED?", and processing continues, as described above.

Returning to INQUIRY 348, if there is not a different connector at the coupling facility, then a determination is made as to whether the connector is persistent, INQUIRY 462 "PERSISTENT CONNECTOR?" Should the connector not be persistent, then flow passes to STEP 350 "CLEAR STRUCTURE USER RECORD IN AP IMAGE," and processing continues as described above. On the other hand, should the connector be persistent, then flow passes to STEP 460 "SELECT NEXT STRUCTURE USER RECORD IN AP," and processing continues, as described herein.

Returning to INQUIRY 340, if there are no users connected at the coupling facility, then all of the structure user records in the active policy image are cleared, STEP 464 "CLEAR ALL STRUCTURE USER RECORDS IN AP IMAGE." Subsequent to clearing all of the structure user records, or if all the active policy structure user records have been processed, INQUIRY 344, a user reconciliation subroutine, described below, is invoked, STEP 470 (FIG. 20c) "INVOKE USER RECONCILE SUBROUTINE."

Figure 26:
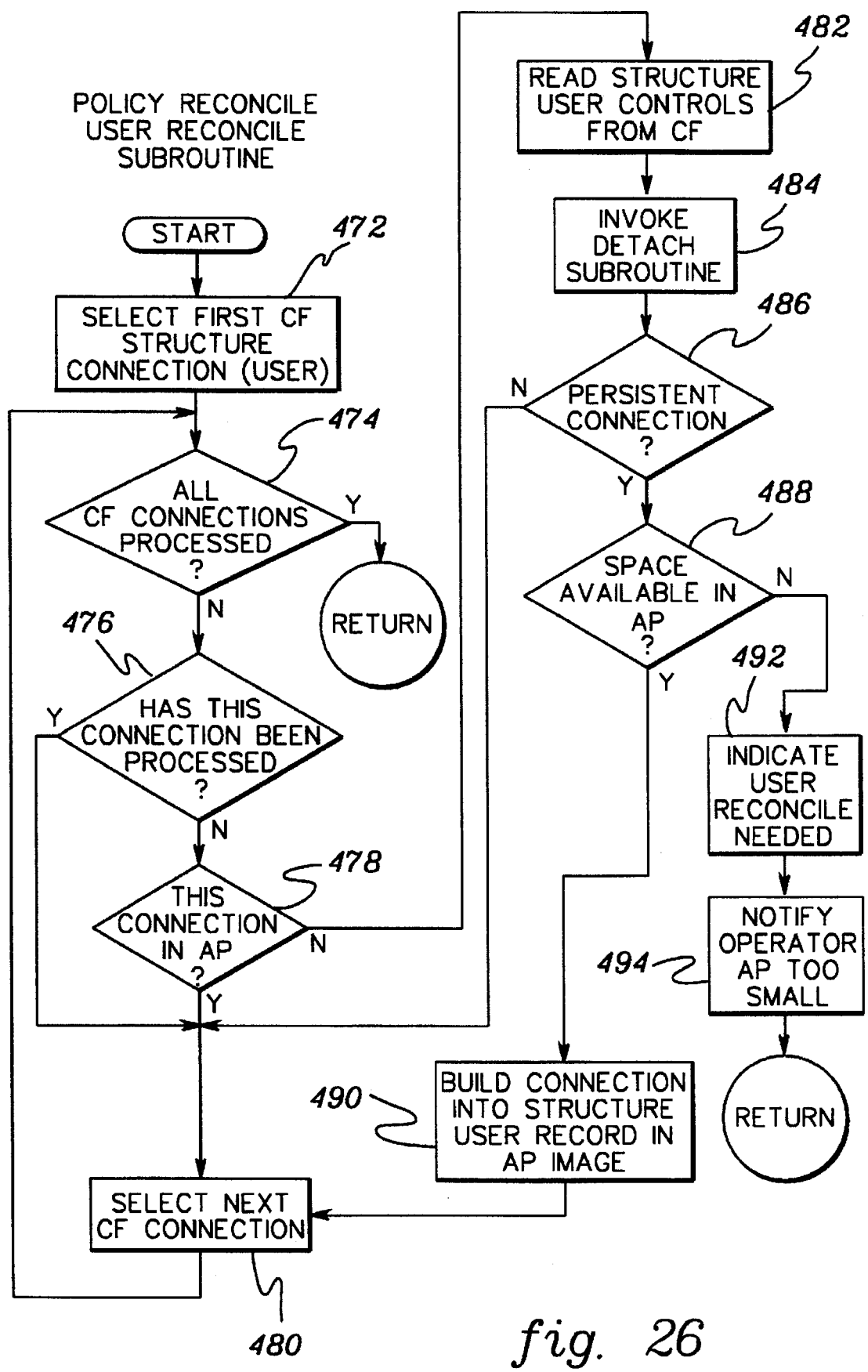
FIG. 26 depicts one embodiment of a policy reconciliation user reconcile subroutine, in accordance with the principles of the present invention.

One embodiment of the user reconcile subroutine is described in detail with reference to FIG. 26. Initially, the first coupling facility structure connection is selected from the coupling facility structure controls (e.g., LCID vector for a cache or a UID vector for a list), STEP 472 "SELECT FIRST CF STRUCTURE CONNECTION (USER)." Thereafter, a determination is made as to whether all the coupling facility connections have been processed, INQUIRY 474 "ALL OF CONNECTIONS PROCESSED?" Should all of the connections be processed, then processing of the user reconcile subroutine is complete.

On the other hand, if all of the connections have not been processed, then an inquiry is made as to whether this particular connection has been processed, INQUIRY 476 "HAS THIS CONNECTION BEEN PROCESSED?" If this connection has not been processed, then another inquiry is made to determine whether this connection is in the active policy, INQUIRY 478 "THIS CONNECTION IN AP?" Should this connection be in the active policy, or if this connection has been processed, then the next coupling facility connection is selected from the structure controls, STEP 480 "SELECT NEXT CF CONNECTION," and processing continues with INQUIRY 474 "ALL CF CONNECTIONS PROCESSED?"

Returning to INQUIRY 478, "THIS CONNECTION IN AP?", if this connection is not in the active policy, then the structure user controls are read from the coupling facility, as described above, STEP 482 "READ STRUCTURE USER CONTROLS FROM CF." Next, the detach subroutine, also described above, is invoked, STEP 484 "INVOKE THE DETACH SUBROUTINE."

Should this connection be persistent, INQUIRY 486 "PERSISTENT CONNECTION?" and if there is space available in the active policy, INQUIRY 488 "SPACE AVAILABLE IN AP?", then the connection is built into the structure user record in the active policy image, STEP 490 "BUILD CONNECTION INTO STRUCTURE USER RECORD IN AP IMAGE," and flow passes to STEP 480 "SELECT NEXT CF CONNECTION."

Returning to INQUIRY 486, "PERSISTENT CONNECTION?", if this connection is not persistent, then flow passes to STEP 480, "SELECT NEXT CF CONNECTION" and processing continues as described herein.

Returning to INQUIRY 488, if there is not available space in the active policy, then an indication is made in structure record 144 (e.g., in the status information) that a user reconciliation is need, STEP 492 "INDICATE USER RECONCILE NEEDED." In addition, a notification is passed to the operator that the active policy is too small, STEP 494 "NOTIFY OPERATOR AP TOO SMALL." Subsequent to notifying the operator, the user reconciliation subroutine is complete and flow passes back to FIG. 20c and, in particular, INQUIRY 500 "ANY STRUCTURE USERS?"

Should there be no structure users and, if the structure is not persistent, INQUIRY 502, a deallocate subroutine, described below, is invoked, STEP 504 "INVOKE DEALLOCATE SUBROUTINE."

Figure 31:
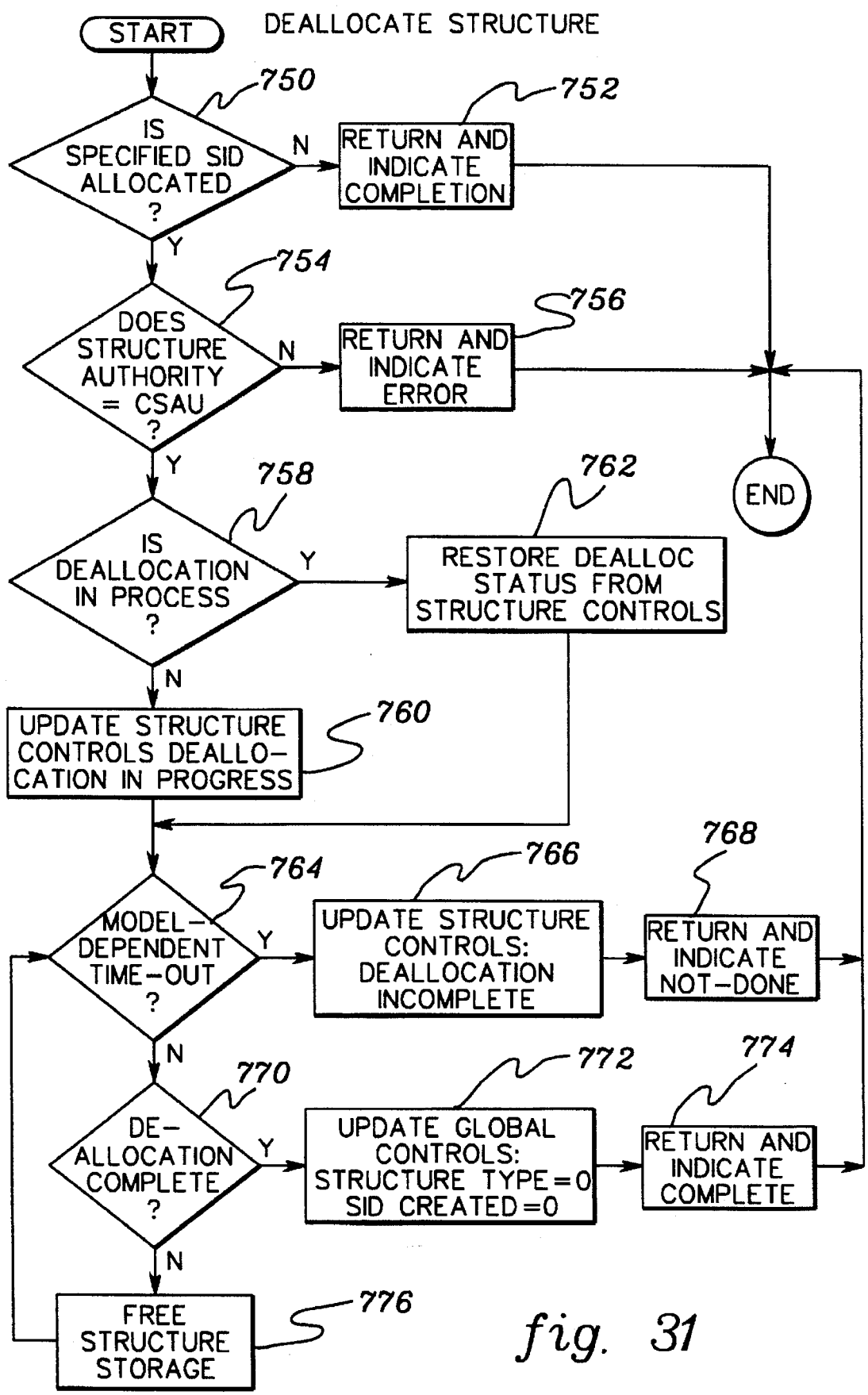
FIG. 31 depicts one embodiment of the logic associated with a deallocate structure command, in accordance with the principles of the present invention.

One embodiment of the deallocate subroutine is described in detail with reference to FIG. 27. The checkpoint record for deallocate is created in the checkpoint save area, STEP 510 "CREATE CHECKPOINT RECORD FOR DEALLOCATE," and the active policy is written with no unlock, STEP 512. Thereafter, the deallocate command, as described with reference to FIG. 31, is processed to completion, STEP 514 "ISSUE DEALLOCATE COMMAND TO COMPLETION."

If the deallocate command was unsuccessful, INQUIRY 516, then the policy reconciliation deallocate subroutine is complete. However, if the deallocate command was successful, then the deallocate record specifying the intended modification is removed from the checkpoint save area, STEP 518 "REMOVE DEALLOCATE RECORD FROM CHECKPOINT," and the active policy is written with no unlock, STEP 520 "WRITE AP WITH NO UNLOCK." Thereafter, the policy reconciliation deallocate subroutine is complete and flow returns to STEP 522 of FIG. 20c.

At STEP 522, the not allocated subroutine, described above, is invoked. Thereafter, or if there are structure users, or if the structure is persistent, the active policy to coupling facility subroutine is complete and flow returns to FIG. 19a and, in particular, STEP 282 "SELECT NEXT STRUCTURE RECORD." Processing continues, as described above.

Figure 28A:
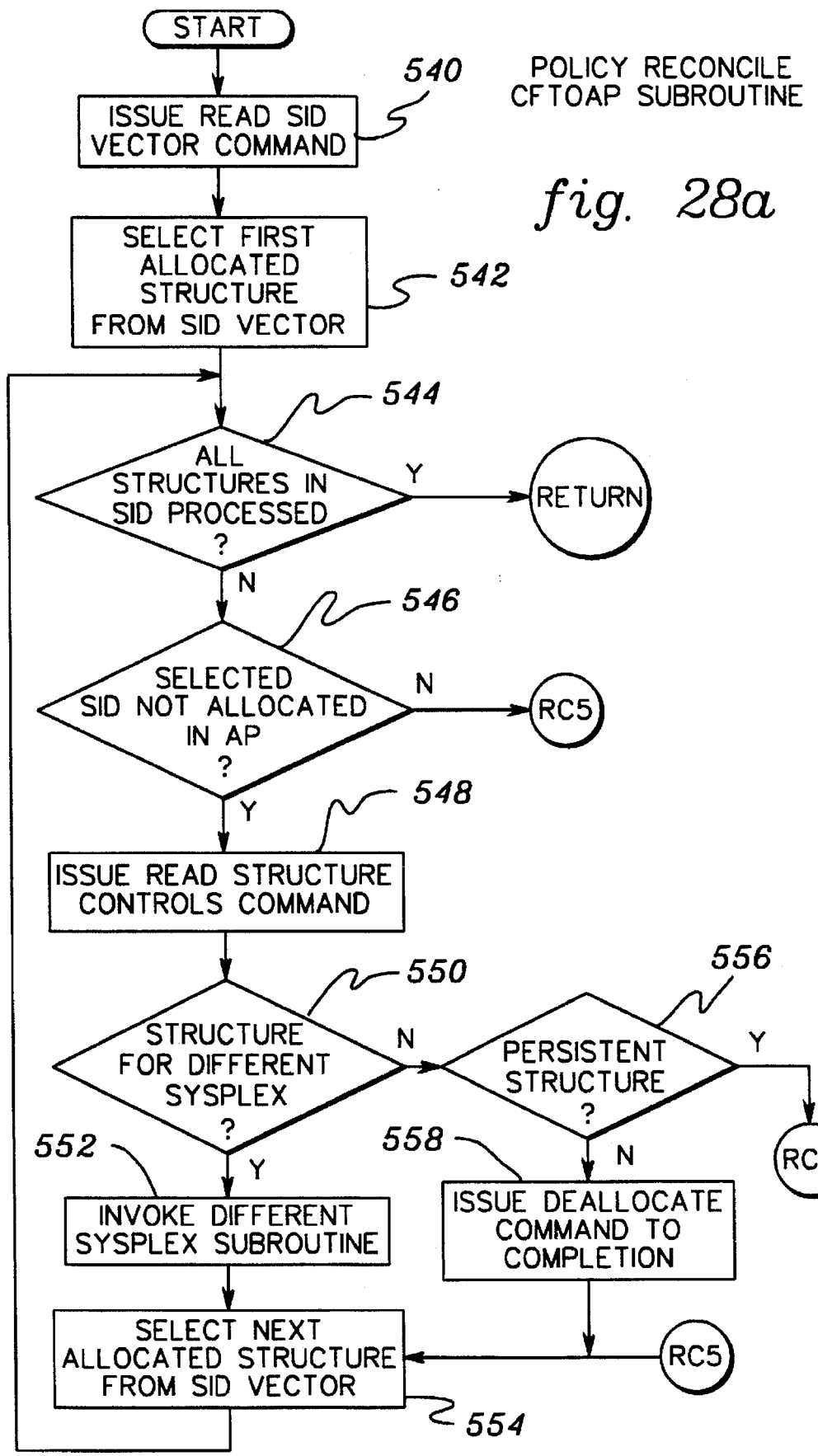
FIGS. 28a–28c illustrate one example of a coupling facility to active policy subroutine associated with the policy reconciliation routine of FIGS. 19a–19c, in accordance with the principles of the present invention.
Figure 28B:
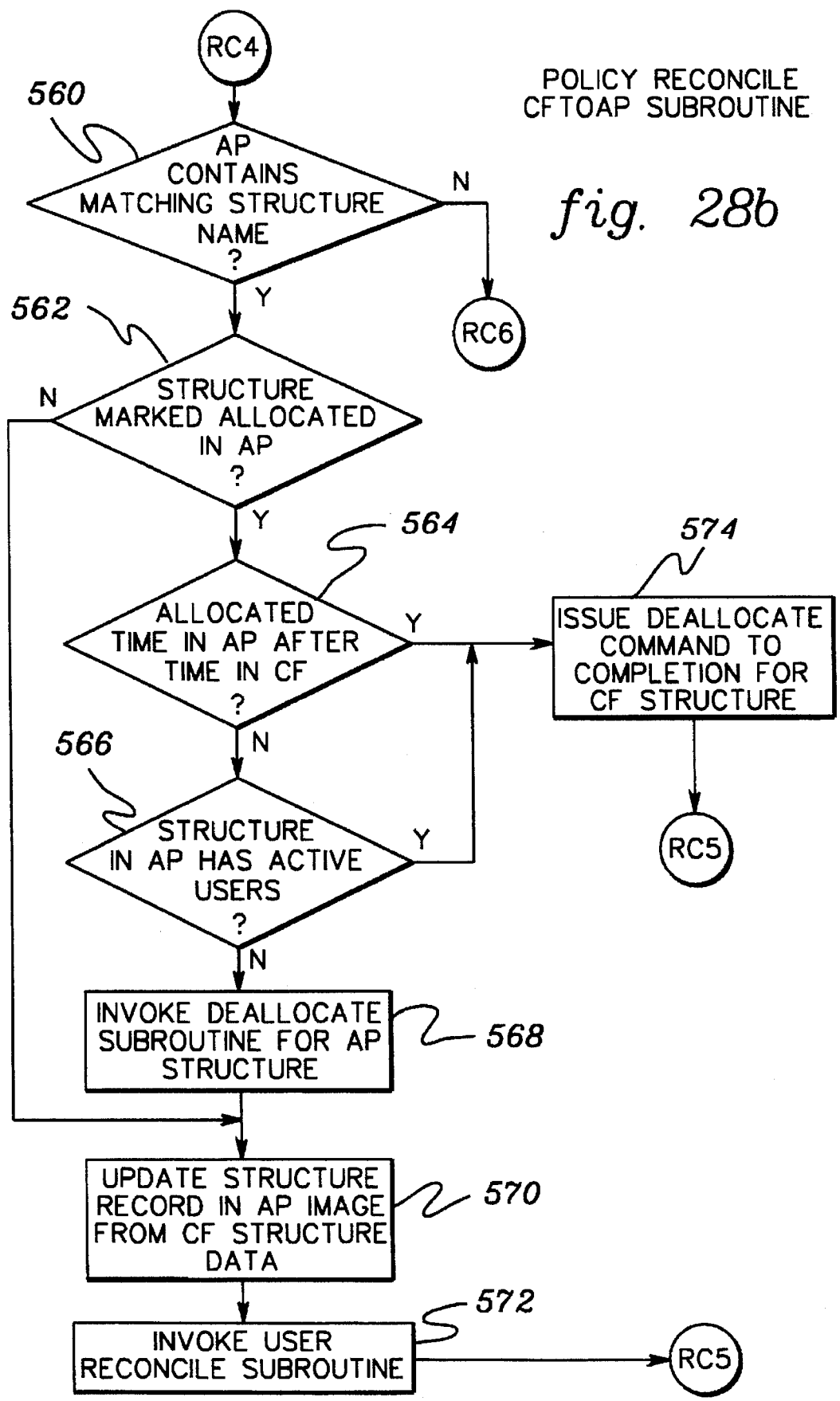

Returning to INQUIRY 278, "ALL STRUCTURE RECORDS PROCESSED?", if all of the structure records have been processed, then a coupling facility to active policy subroutine is invoked, STEP 530 "INVOKE CFTOAP SUBROUTINE." One embodiment of the coupling facility to active policy subroutine is described in detail with reference to FIGS. 28a–28c.

Initially, the read SID vector command is issued in order to determine all structure identifiers, STEP 540 "ISSUE READ SID VECTOR COMMAND." Thereafter, using the structure identifiers, the first allocated structure is selected from the SID vector, STEP 542, and a determination is made as to whether all structures in the SID are processed, INQUIRY 544 "ALL STRUCTURES IN SID PROCESSED?" Should all of the structures in the SID vector be processed, then the coupling facility to active policy subroutine is complete and flow returns back to FIG. 19a, as described in detail below.

However, if all of the structures in the SID vector are not processed, then a determination is made as to whether the selected SID is allocated in the active policy, INQUIRY 546 "SELECTED SID NOT ALLOCATED IN AP?" If the selected SID is not allocated in the active policy, then a read structure controls command, described above, is issued, STEP 548, and a determination is made as to whether the structure is for another sysplex, INQUIRY 550.

If the structure is for a different sysplex, then the different sysplex subroutine, described above with reference to FIG. 22, is invoked, STEP 552 "INVOKE DIFFERENT SYSPLEX SUBROUTINE." Thereafter, the next allocated structure is selected from the SID vector, STEP 554 "SELECT NEXT ALLOCATED STRUCTURE FROM SID VECTOR," and flow passes to INQUIRY 544 "ALL STRUCTURES IN SID PROCESSED?"

Returning to INQUIRY 550, "STRUCTURE FOR DIFFERENT SYSPLEX?" if the structure is not for a different sysplex and the structure is not persistent, INQUIRY 556 "PERSISTENT STRUCTURE?", then the deallocate command, described below, is issued to completion, STEP 558. Thereafter, flow passes to STEP 554 "SELECT NEXT ALLOCATED STRUCTURE FROM SID VECTOR," and processing continues as described herein.

Returning to INQUIRY 546, "SELECTED SID NOT ALLOCATED IN AP?", should the selected SID be allocated, processing continues with STEP 554 "SELECT NEXT ALLOCATED STRUCTURE FROM SID VECTOR."

Returning to INQUIRY 556, "PERSISTENT STRUCTURE?", should a persistent structure exist, then an inquiry is made to determine whether the active policy contains a matching structure name, INQUIRY 560 "AP CONTAINS MATCHING STRUCTURE NAME?" Should the active policy contain a matching structure name, then a further determination is made as to whether the structure is marked allocated in coupling facility data 154 in the active policy, INQUIRY 562 "STRUCTURE MARKED ALLOCATED IN AP?"

If the structure is marked allocated in the active policy and there is not allocated time in the active policy after the allocated time in the coupling facility structure controls (based on time stamps in the active policy and in the coupling facility), INQUIRY 564 and the structure in the active policy does not have active users, INQUIRY 566, then the deallocate subroutine for the structure in the active policy is invoked, STEP 568 "INVOKE DEALLOCATE SUBROUTINE FOR AP STRUCTURE."

Subsequent to invoking the deallocate subroutine for the structure in the active policy, or if the structure is not marked allocated in the active policy, INQUIRY 562, then the structure record in the active policy image is updated from the coupling facility structure data, STEP 570 "UPDATE STRUCTURE RECORD IN AP IMAGE FROM CF STRUCTURE DATA," and the user reconciliation subroutine is invoked, STEP 572 "INVOKE USER RECONCILE SUBROUTINE." Subsequently, flow returns to STEP 554 "SELECT NEXT ALLOCATED STRUCTURE FROM SID VECTOR."

Returning to INQUIRY 564 (FIG. 28b), "ALLOCATED TIME IN AP AFTER TIME IN CF?", if there is allocated time in the active policy after the allocated time in the coupling facility structure record, or if the structure in the active policy has active users, INQUIRY 566, then the deallocate command is issued to completion, STEP 574 "ISSUE THE DEALLOCATE COMMAND TO COMPLETION FOR CF STRUCTURE." After the deallocate command completes, flow returns to STEP 554, "SELECT NEXT ALLOCATED STRUCTURE FROM SID VECTOR."

Figure 28C:
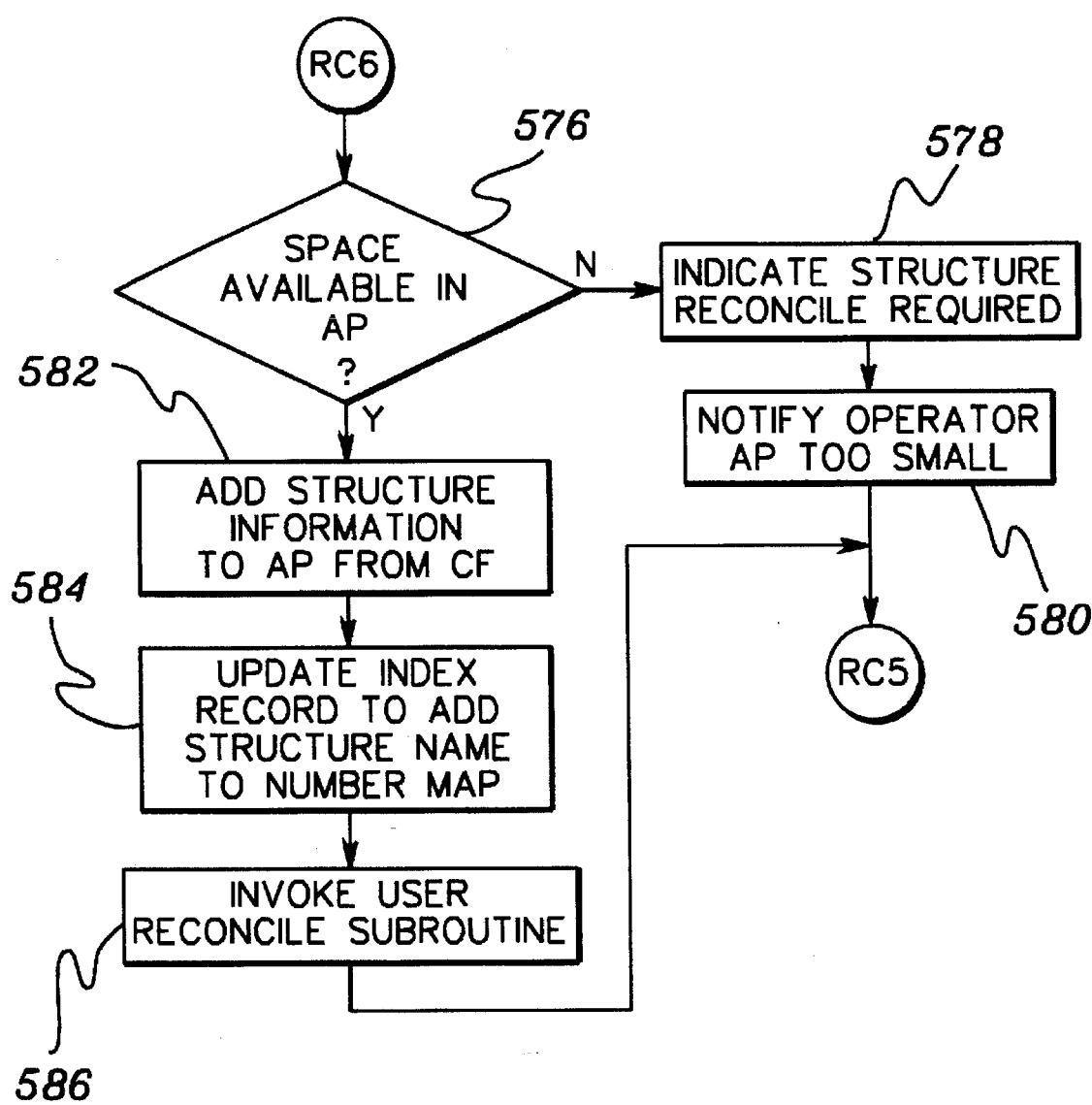

Returning to INQUIRY 560, "AP CONTAINS MATCHING STRUCTURE NAME?", if the active policy does not contain a matching structure name, then a determination is made as to whether there is available space in the active policy, INQUIRY 576, "SPACE AVAILABLE IN AP?" (FIG. 28c). If space is not available in the active policy, then an indication that structure reconciliation is required is made in the coupling facility record of the active policy, STEP 578 "INDICATE STRUCTURE RECONCILE REQUIRED," and a notification is sent to the operator specifying that the active policy is too small, STEP 580 "NOTIFY OPERATOR AP TOO SMALL." Thereafter, flow returns to STEP 554 (FIG. 28a) "SELECT NEXT ALLOCATED STRUCTURE FROM SID VECTOR."

Returning to INQUIRY 576, if there is available space in the active policy, then the structure information is added to the active policy from the coupling facility, STEP 582 "ADD THE STRUCTURE INFORMATION TO AP FROM CF." In addition, the index record is updated to add the structure name to number map, STEP 584, the user reconciliation subroutine is invoked, STEP 586, and flow returns to STEP 554 "SELECT NEXT ALLOCATED STRUCTURE FROM SID VECTOR."

Figure 19C:
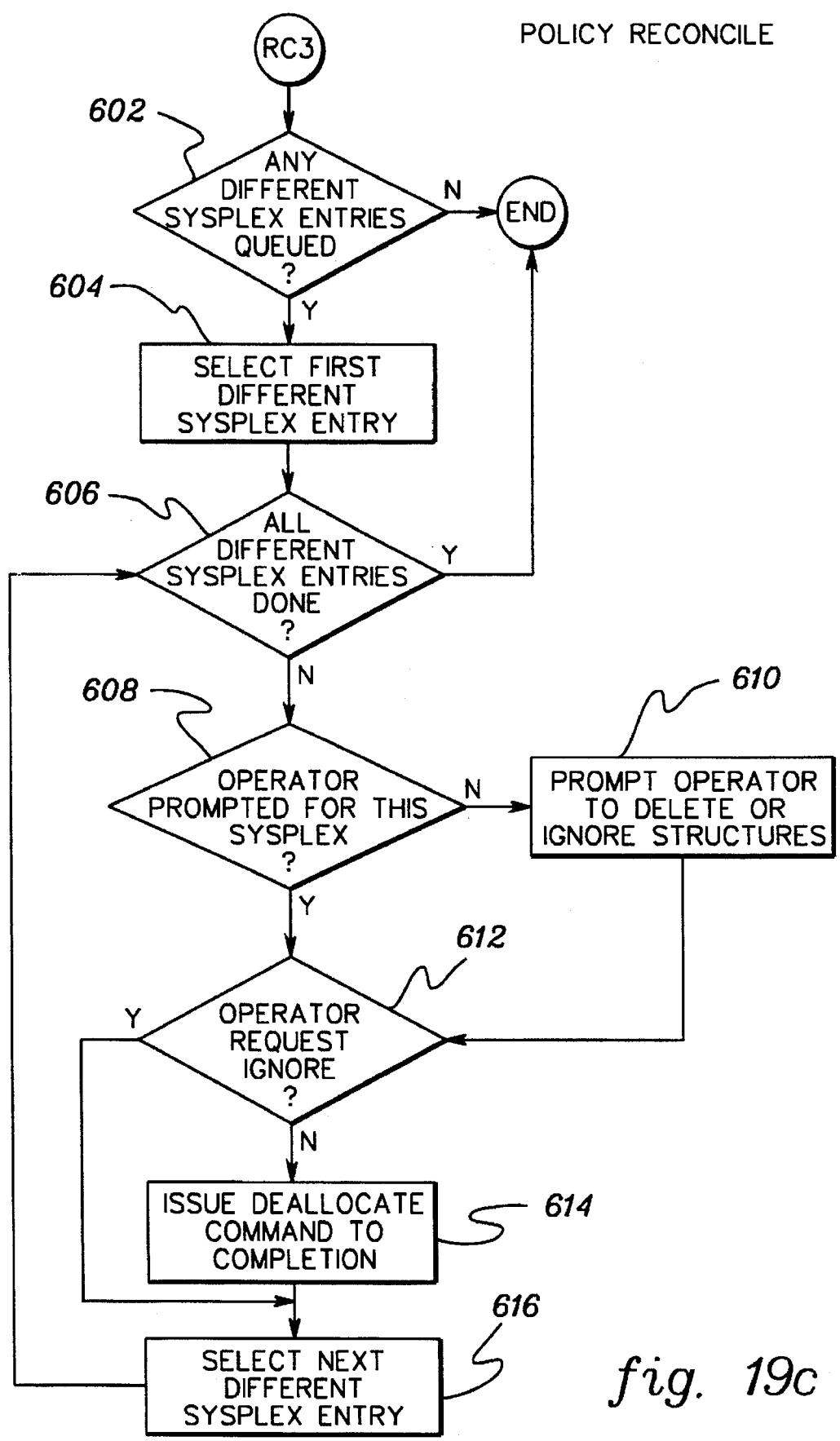

Returning to FIG. 19a and, in particular, STEP 530, after the coupling facility to active policy subroutine is complete, the active policy is written to the function data set and the function data set is unlocked, STEP 600 "WRITE AND UNLOCK AP TO THE FUNCTION DATA SET." Thereafter, a determination is made as to whether any different sysplex entries are queued, INQUIRY 602 "ANY DIFFERENT SYSPLEX ENTRIES QUEUED?" (FIG. 19c). If no different sysplex entries are queued, then the policy reconciliation subroutine has completed.

On the other hand, if there are different sysplex entries queued, then the first different sysplex entry is selected, STEP 604 "SELECT FIRST DIFFERENT SYSPLEX ENTRY," and a determination is made as to whether all the different sysplex entries are completed, INQUIRY 606, "ALL DIFFERENT SYSPLEX ENTRIES DONE?" Should all of the different sysplex entries be complete, the policy reconciliation subroutine is complete, as described above.

However, if all of the different sysplex entries are not complete, a determination is made as to whether the operator was prompted for this sysplex, INQUIRY 608, "OPERATOR PROMPTED FOR THIS SYSPLEX?" If the operator was not prompted for this sysplex, then the operator is prompted to specify DELETE or IGNORE for the structures, STEP 610 "PROMPT OPERATOR TO DELETE OR IGNORE STRUCTURES." Subsequent to prompting the operator, or if the operator was prompted for the sysplex, then a further determination is made as to whether the operator's request is IGNORE, INQUIRY 612 "OPERATOR REQUEST IGNORE? " If the operator request is not IGNORE, then the deallocate command is issued to completion, STEP 614 "ISSUE DEALLOCATE COMMAND TO COMPLETION." Thereafter, or if the operator request is IGNORE, the next different sysplex entry is selected, STEP 616, and flow returns to INQUIRY 606 "ALL DIFFERENT SYSPLEX ENTRIES DONE?"

Returning to INQUIRY 270 (FIG. 19a), "CF GAIN OWNERSHIP CALL?", if the policy reconcile routine was not invoked from new coupling facility gain ownership call, then the active policy is read from the function data set and the function data set is locked, STEP 620 "READ AND LOCK ACTIVE POLICY (AP) FROM FUNCTION DATA SET." Thereafter, the first structure record in the active policy is selected, STEP 622, and a determination is made as to whether all of the structure records have been processed, INQUIRY 624 "ALL STRUCTURE RECORDS PROCESSED?" When all of the structure records are processed, the coupling facility to active policy subroutine is invoked, STEP 626 "INVOKE CFTOAP SUBROUTINE," and the active policy is written to the function data set, which is unlocked, STEP 628.

Returning to INQUIRY 624 (FIG. 19b), if all of the structure records have not been processed, a determination is made as to whether a user reconciliation is needed, INQUIRY 630 "USER RECONCILE NEEDED?" If user reconciliation is needed, then the read structure controls command is issued in order to read the cache structure controls or list structure controls as appropriate, STEP 632 "ISSUE READ STRUCTURE CONTROLS COMMAND." Thereafter, the user reconciliation subroutine is invoked, STEP 634, and the next structure record is selected, STEP 636 "SELECT NEXT STRUCTURE RECORDS." Processing then continues with INQUIRY 624 "ALL STRUCTURE RECORDS PROCESSED?"

Returning to INQUIRY 630, "USER RECONCILE NEEDED?", if a user reconciliation is not needed then flow passes to STEP 636 "SELECT NEXT STRUCTURE RECORD," and processing continues as described herein.

As shown in FIG. 18, after the policy reconciliation routine is complete, then so is the policy change signal process. Therefore, returning to FIG. 17c and, in particular, STEP 252, after the systems have been signaled about the active policy structure data change, or if there is no active policy structure data change, INQUIRY 250, a determination is made as to whether the active policy facility data changed, INQUIRY 650 "AP FACILITY DATA CHANGE?" Should the active policy facility data be changed, then all of the systems are signaled about such a change, as described above with reference to FIG. 18. Thereafter, or if there was no active policy facility data change, a determination is made as to whether the active policy free space enables reconciliation, INQUIRY 654 "AP FREE SPACE ENABLES RECONCILE?" Should reconciliation be possible, then all systems are signaled to initiate policy reconciliation, as described above, STEP 656 "SIGNAL ALL SYSTEMS TO INITIATE POLICY RECONCILE." Thereafter, or if the active policy free space does not enable reconciliation, the policy change routine is complete, STEP 658 "END."

Returning to INQUIRY 200 (FIG. 17a) "START REQUEST?", if a start was not requested, then a determination is made as to whether a stop, such as a SETXCF STOP, was requested by an operator, INQUIRY 670 "STOP REQUEST?" Should a stop request be made, then the active policy is read from the function data set and the function data set is locked, STEP 672. Thereafter, all of the facility and structure records in the pending policy are deleted, STEP 674 "DELETE ALL FACILITY RECORDS IN PENDING POLICY," and STEP 676, "DELETE ALL STRUCTURE RECORDS IN PENDING POLICY." Subsequently, an indication is made in the pending policy that pending changes exist, STEP 677, and the active policy is written to the function data set and the function set is unlocked, STEP 678 "WRITE AND UNLOCK AP TO FUNCTION DATA SET." Thereafter, flow passes to STEP 212 (FIG. 17b), "READ AND LOCK ACTIVE POLICY (AP) FROM FUNCTION DATA SET," and processing continues as described herein.

Returning to INQUIRY 670 (FIG. 17a), if there is not a stop request, then a determination is made as to whether there are any pending policy changes, INQUIRY 680 "ANY PENDING POLICY CHANGES?" If there are no pending policy changes, then the policy change routine is complete. However, if there are pending policy changes, then flow passes to STEP 212 "READ AND LOCK ACTIVE POLICY (AP) FROM FUNCTION DATA SET," and processing continues, as described above.

Described above, in accordance with the principles of the present invention, is the logic associated with initiating a new active policy. As described, incompatible changes are stored for subsequent implementation, while compatible changes are made immediately. In addition, a capability is provided for reconciling information in the active policy with information in the coupling facility.

Described below is a mechanism by which a user of the coupling facility becomes connected to the coupling facility. Included within this discussion is a mechanism for keeping track of intended modifications to coupling facility resources (e.g. structures and/or connections) prior to making the modifications. The intended modifications are stored in the checkpoint save area.

A user gains access to a coupling facility structure through use of an operating system service, referred to as Cross-System Extended Services or XES. A user of a coupling facility structure is termed a connected XES user. XES supports the defined list, and cache structures. Additionally, XES supports the use of a list structure for high performance database locking (a lock structure) and specialized use of a list structure with a lock table comprising only global management objects termed a serialized list.

As mentioned above, an XES supported lock structure is comprised of a list coupling facility structure and operating system services. A lock table associated with the list may contain both global management and local management objects. The list set is used in a manner which assigns one list to each assigned user identifier. List entries are comprised of adjunct only areas. The list set is termed a record substructure. A list for a given user identifier is termed a record substructure header. Entries on a given list are termed record substructure entries.

A user is connected or reconnected to a structure, such as a cache, list or lock structure via, for example, an operating system connection service. One embodiment of the logic associated with a connection service is described in detail with reference to FIGS. 29a–29e. Initially, a checkpoint cleanup routine (FIG. 30), which is responsible for processing checkpoint save area 148, as described below, is invoked, STEP 700 "INVOKE CHECKPOINT CLEANUP."

Checkpoint cleanup processing is invoked when successful deallocate requests have completed for a coupling facility structure. The process is invoked on any system in the sysplex where a successful deallocation has occurred. The checkpoint cleanup process attempts to complete detach and deallocate processing, which is recorded in the checkpoint save area of the active policy. These requests represent prior attempts to perform detach or deallocate processing which did not complete successfully. If the recorded detach or deallocate command can be issued to completion successfully, the associated record in the checkpoint save area of the active policy is deleted. Otherwise, the detach or deallocate record remains in the checkpoint save area of the active policy. Subsequent processing will continue to complete the update of the coupling facility.

In one embodiment, the logic associated with a checkpoint cleanup routine, in accordance with the principles of the present invention, is described in detail with reference to FIGS. 30a–30b.

Figure 30A:
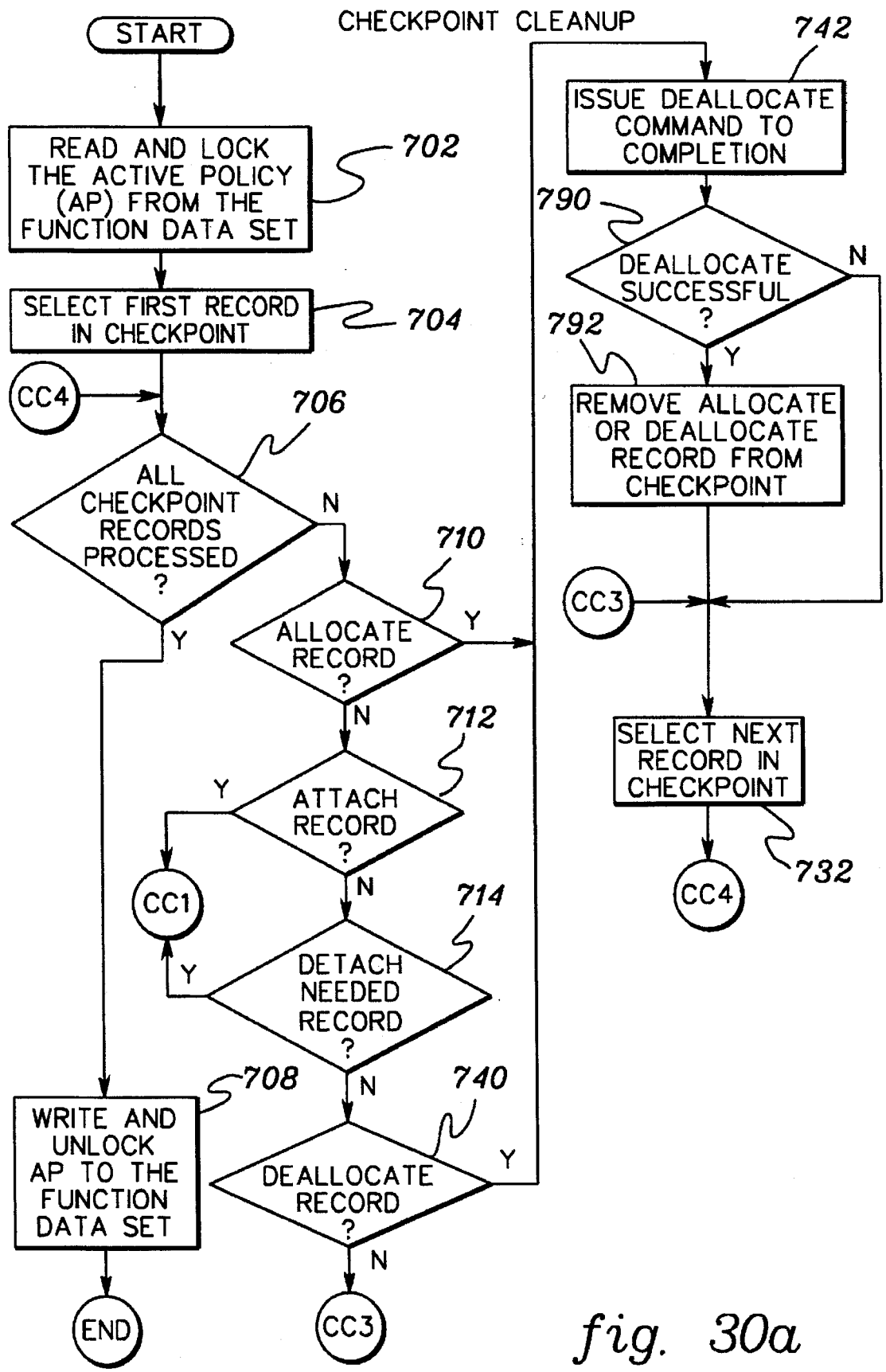
FIGS. 30a–30b depict one embodiment of the logic associated with a checkpoint cleanup routine, in accordance with the principles of the present invention.
Figure 30B:
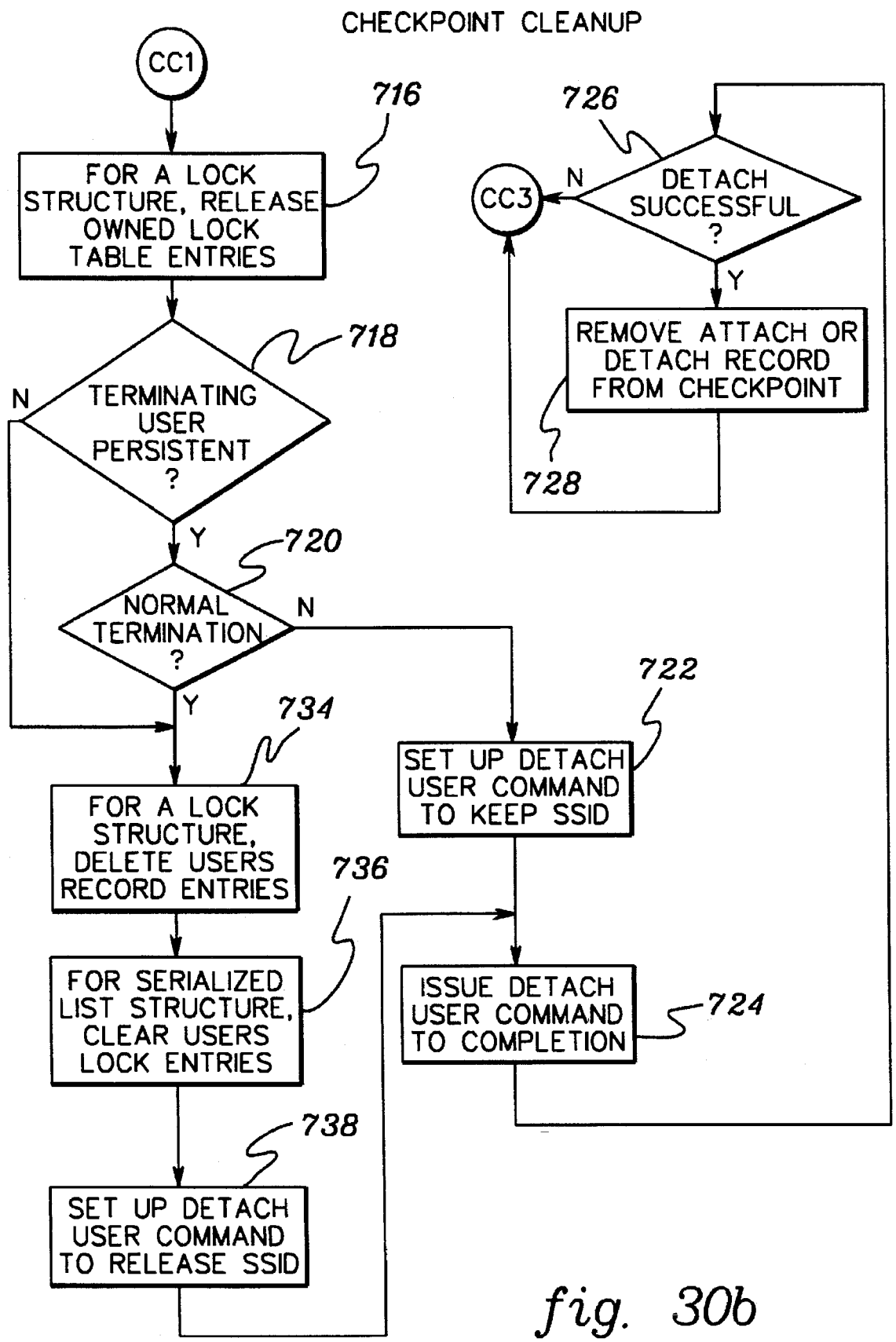

Referring to FIG. 30a, the active policy on the function data set is read and locked, via, for example, the procedure described in co-pending U.S. patent application Ser. No. 07/548,516 for "Shared Data Access Serialization Method and Apparatus," by Insalaco et al. (Attorney Docket No. PO9-88-007), filed on Jul. 2, 1990, which is incorporated herein by reference in its entirety, STEP 702 "READ AND LOCK THE ACTIVE POLICY (AP) FROM THE FUNCTION DATA SET." Subsequently, the first record in checkpoint save area 148 is selected, STEP 704 "SELECT FIRST RECORD IN CHECKPOINT."

Thereafter, a determination is made as to whether all of the checkpoint records have been processed, INQUIRY 706 "ALL CHECKPOINT RECORDS PROCESSED?" Should all the records be processed, the active policy is written from virtual storage to the function data set and the active policy in the function data set is unlocked, STEP 708 "WRITE AND UNLOCK THE AP TO THE FUNCTION DATA SET." (One embodiment of the write and unlock process is described in U.S. patent application Ser. No. 07/548,516 for "Shared Data Access Serialization Method and Apparatus" by Insalaco et al (Attorney Docket No. PO9-88-007), filed on Jul. 2, 1990, and incorporated herein by reference in its entirety.)

On the other hand, if all of the checkpoint records are not processed, a check is made to determine if an allocate record is present in the checkpoint save area, INQUIRY 710 "ALLOCATE RECORD?" Should there be no allocate record, another determination is made to see if an attach record is present, INQUIRY 712 "ATTACH RECORD?" If no attach record exists and a detach needed record does exist, INQUIRY 714 "DETACH NEEDED RECORD?", or if an attach record does exist, the lock table entries owned by a lock structure user are released, STEP 716 "FOR A LOCK STRUCTURE, RELEASE OWNED LOCK TABLE ENTRIES."

Subsequently, a determination is made as to whether the terminating user is persistent, INQUIRY 718 "TERMINATING USER PERSISTENT?" If the terminating user is persistent and termination is not normal, INQUIRY 720 "NORMAL TERMINATION?", a detach user command, described in detail above, is set up in order to keep the SSID, STEP 722 "SET UP DETACH USER COMMAND TO KEEP SSID." After setting up the command, the detach user command is processed to completion, STEP 724 "ISSUE DETACH USER COMMAND TO COMPLETION."

If the detach is successful, INQUIRY 726 "DETACH SUCCESSFUL?" the attach or detach record is removed from checkpoint save area 148, STEP 728.

After removing the record or, if the detach is unsuccessful, the next record in the checkpoint save area is selected, STEP 732 "SELECT NEXT RECORD IN CHECKPOINT." Thereafter, flow passes to INQUIRY 706 "ALL CHECKPOINT RECORDS PROCESSED."

Returning to FIG. 30b and, in particular, INQUIRY 718, if the terminating user is not persistent or if termination is normal, INQUIRY 720, the users record entries for a lock structure are deleted, STEP 734 "FOR A LOCK STRUCTURE, DELETE USERS RECORD ENTRIES." In addition, the users lock entries are cleared for a serialized list structure, STEP 736 "FOR SERIALIZED LIST STRUCTURE, CLEAR USERS LOCK ENTRIES," and the detach user command is set up to release the SSID, STEP 738 "SET UP DETACH USER COMMAND TO RELEASE SSID." Subsequent to setting up the detach user command, it is issued to completion, STEP 724.

Returning to INQUIRY 714 (FIG. 30a), if no detach needed record is present in the active policy, a determination is made as to whether a deallocate record is present in the checkpoint save area, INQUIRY 740. If a deallocation record is not present, flow passes to STEP 732 "SELECT NEXT RECORD IN CHECKPOINT," and processing continues, as described herein.

However, if the deallocate record is present, INQUIRY 740, or if an allocate record is present, INQUIRY 710, a deallocate command is processed to completion, as described in detail below, STEP 742 "ISSUE DEALLOCATE COMMAND TO COMPLETION."

In particular, the cache or list structure is deallocated. In one embodiment, the logic associated with deallocating a structure is described in detail with reference to FIG. 31. The logic will be discussed with relation to deallocating a cache structure, and the relevant changes in order to deallocate a list structure will be included in parentheses.

Referring to FIG. 31, a determination is made as to whether the specified structure identifier, SID, is allocated, INQUIRY 750 "IS SPECIFIED SID ALLOCATED?" When the specified created bit of the structure-identifier vector is zero, no processing occurs and a successful response code is returned, STEP 752 "RETURN AND INDICATE COMPLETION".

When the specified bit of the structure identifier vector is one, a structure authority comparison is made, INQUIRY 754 "DOES STRUCTURE AUTHORITY=CSAU?" When the value of the structure authority in cache-structure controls 69 (FIG. 4) (or in list-structure controls 92 (FIG. 8)) is not equal to the comparative structure authority operand in request/response operands (FIG. 13), the value of the structure authority and the user structure control (USC) in the request/response operands (or for a list structure, the structure authority and the user structure control (USC)) and an error response code are returned, STEP 756 "RETURN AND INDICATE ERROR."

When the structure authority comparison is successful, a determination is made as to whether deallocation is already in progress, INQUIRY 758 "IS DEALLOCATION IN PROCESS?" When deallocation is not is progress, as indicated by a deallocation control (not shown) in cache-structure controls (or list structure controls), deallocation is initiated for a cache (or list) structure. In particular, the cache-structure controls (or list-structure controls) are updated to indicate deallocation is in progress, STEP 760 "UPDATE STRUCTURE CONTROLS: DEALLOCATION IN PROGRESS," and flow passes to INQUIRY 764.

Returning to INQUIRY 758, when deallocation is in process, the deallocation status in cache-structure controls (or list-structure controls) is restored, STEP 762 "RESTORE DEALLOC STATUS FROM STRUCTURE CONTROLS," and flow passes to INQUIRY 764.

Should a model-dependent time-out occur before the deallocation process is complete, INQUIRY 764 "MODEL-DEPENDENT TIME-OUT?", the structure is placed in the deallocation incomplete state, the free space and free control space global controls are updated and an exception response code is returned, STEPS 766, 768.

When there is no model-dependent time-out and deallocation is complete, INQUIRY 770 "DEALLOCATION COMPLETE?", the structure type and the created bit in the structure-identifier vector are reset to zero and a successful response code is returned, STEPS 772, 774.

When the response code is successful, the structure is no longer available, and its associated storage is available for a subsequent allocation request.

When deallocation is incomplete, the structure storage is freed and the free-space and free-control-space global controls are updated, STEP 776 "FREE STRUCTURE STORAGE." Thereafter, flow returns to INQUIRY 764 "MODEL-DEPENDENT TIME-OUT?"

When a deallocate-cache-structure command designates a cache structure that has not been created but for which allocation is not complete, the structure is deallocated.

The specified created bit of the SID vector is reset on completion of the deallocate command. When deallocation is in progress, all commands except for the read-structure-type, and deallocate-cache-structure command fail with an exception response.

As for a list structure, the specified created bit of the SID vector is reset on completion of the deallocate command. When deallocation is in progress, all commands, except for the read-structure-type, and deallocate-list-structure commands fail with an exception response.

When deallocation is in progress, the read-structure-type command returns the structure type of the structure that is being deallocated. Also, an allocation command specifying the same SID fails with a deallocation-incomplete status condition.

Returning to FIG. 30a, and in particular STEP 742, subsequent to processing the deallocate command to completion, a check is made to determine if the deallocate command completed successfully, INQUIRY 790 "DEALLOCATE SUCCESSFUL?" If deallocation was unsuccessful, flow passes to STEP 732 and processing continues, as described above. However, if the deallocation was successful, the allocate or deallocate record is removed from the checkpoint save area, STEP 792. Subsequently, flow passes to STEP 732, "SELECT NEXT RECORD IN CHECKPOINT," and processing continues, as described herein.

Returning to FIG. 29a and, in particular, STEP 700, after the checkpoint cleanup routine is invoked, the active policy on the function data set is read and locked, STEP 800 "READ AND LOCK THE ACTIVE POLICY FROM THE FUNCTION DATA SET." Subsequently, a determination is made as to whether the structure name specified on the connect service (such as, for example, the IXLCONN connect service, described below) is defined, INQUIRY 802 "STRUCTURE DEFINED?" In particular, the presence of a structure record in the active policy is checked. Should the structure be defined, a check is made to see if the structure is allocated incompatibly, INQUIRY 804 "STRUCTURE ALLOCATED INCOMPATIBLY?" This is determined, for instance, by checking the information in the structure controls in the coupling facility.

If a structure is not allocated incompatibly and is not allocated compatibly (i.e., the structure is not allocated), INQUIRY 806 "STRUCTURE ALLOCATED COMPATIBLE?", a list of eligible facilities are built, STEP 808 "BUILD LIST OF ELIGIBLE FACILITIES." In particular, a preference list in policy data 150 of the active policy is utilized to determine which coupling facilities are candidates for the structure. From those facilities, the eligible facilities are selected. Each eligible facility:

(a) has connectivity to the system trying to allocate the structure;

(b) meets the volatility requirement requested by the connector; and (c) has available space greater than or equal to the requested structure size or, if no facility in the policy list has free space greater than or equal to the requested structure size, the facility with the largest amount of free space is chosen.

Subsequent to building the list of eligible facilities, it is ascertained as to whether there are any more eligible facilities, INQUIRY 810 "ANY MORE ELIGIBLE FACILITIES?" If so, the next eligible facility is selected, STEP 812 "SELECT NEXT ELIGIBLE FACILITY." After selecting the next eligible facility, the SID vector is read from global controls 67, STEP 814 "READ SID VECTOR FROM FACILITY."

From the SID vector, a determination is made as to whether any available SID exists in the vector, INQUIRY 816 "ANY AVAILABLE SID?" Should an available SID exist, it is selected, STEP 818 "SELECT AN AVAILABLE SID," and a unique structure authority value (SAU) is created (as described above with reference to FIG. 4), STEP 820 "CREATE UNIQUE STRUCTURE AUTHORITY VALUE (SAU)." Thereafter, a checkpoint record indicating allocate is created, STEP 822, and the active policy is written to the function data set with no unlock, STEP 824, "WRITE AP WITH NO UNLOCK."

Subsequently, an allocate structure command, described below, is issued to completion, STEP 826 "ISSUE ALLOCATE STRUCTURE COMMAND TO COMPLETION."

As described in detail herein, an allocate-cache-structure command updates the user structure control and (1) creates a cache structure or (2) continues or completes initial allocation of a cache structure. A cache structure is created on the first successful invocation of the allocate-cache-structure command for a structure that does not already exist. A cache structure is initially allocated after one or more successful invocations of the allocate-cache-structure command. These operations are referred to generically as cache-allocation processes.

One embodiment of the logic associated with an allocate-cache-structure command is described in detail with reference to FIGS. 32a–32b. Initially, a determination is made as to whether the value of the created bit in the structure identifier vector associated with the SID value is equal to zero, INQUIRY 830 "IS CREATED BIT OF SID=0?" If the value of the created bit associated with the SID is equal to zero, indicating a cache structure has not been created, then another determination is made as to whether the comparative structure authority (CSAU) request operand is equal to zero, INQUIRY 832 "DOES CSAU=0?" When the CSAU is not equal to zero, the structure authority value of zero in request/response operands (FIG. 13) and an error code are returned, STEP 834 "RETURN AND INDICATE ERROR."

Otherwise, if the CSAU is equal to zero, then the amount of storage is checked, INQUIRY 836 "SUFFICIENT STORAGE?" In particular, the free space and free control space objects in the global controls are checked. Should there be insufficient storage, an indication as such is returned, STEP 838 "RETURN AND INDICATE INSUFFICIENT STORAGE."

Should there be sufficient storage and therefore, a cache structure is created, global controls 67 and cache structure controls 69 are updated, STEPS 840, 842. In particular, when the cache structure is created, the created bit in the structure-identifier vector associated with the SID value is set to one and the free-space and free-control-space global objects are updated. In addition, the LCID vector of cache structure controls 69 is initialized to zero; the SAU operand of the request/response operands is placed in the structure authority object of cache structure controls; and the USC operand of the request/response operands is placed in the user-structure control.

Thereafter, there is an indication of whether a model-dependent time-out has occurred, INQUIRY 844 "MODEL-DEPENDENT TIME-OUT?" When a model-dependent time period has elapsed before the allocation processes are completed, the processes are checkpointed, STEP 846 "SET ALLOCATION CHECKPOINT." In particular, the structure size, cache structure controls 69, the free-space and free-control-space global objects are updated. Subsequently, the structure state control (not shown) in the structure controls is set as allocation incomplete, STEP 848 "SET STRUCTURE STATE ALLOCATION INCOMPLETE," and cache structure information and an exception response code are returned, STEP 850 "RETURN AND INDICATE NOT DONE."

Returning to INQUIRY 844, when a model-dependent time-out has not occurred, a determination is made as to whether the allocation process is complete, INQUIRY 852 "ALLOCATION COMPLETE?" In particular, the structure state control is checked and, if it is equal to one, allocation is complete and, if equal to zero, allocation is incomplete. Should allocation be complete, a successful response code is returned, indicating all requested cache-allocation processes are complete, STEP 854 "RETURN AND INDICATE COMPLETION."

Otherwise, when a cache structure is created but not completely allocated, all cache-structure commands issued to the structure except for the allocate-cache-structure, deallocate-cache-structure, and read-cache-structure-information commands are suppressed or terminated with an initial-allocation-incomplete status condition. Further, control and data areas are created, STEP 856 "CREATE CONTROL AND DATA AREAS." In particular, a directory and data areas are created. Thereafter, flow passes to INQUIRY 844 "MODEL-DEPENDENT TIME-OUT?"

Returning to INQUIRY 830, if the created bit of SID is not equal to zero, signifying a structure is created, a structure authority comparison is made, INQUIRY 858 "DOES STRUCTURE AUTHORITY=CSAU?" Should the value of SAU in cache structure controls 69 not be equal to the value of CSAU, the value of the structure authority in the request/response operands and an error code are returned, STEP 860 "RETURN AND INDICATED ERROR." Otherwise, a determination is made as to whether there is a user control update request, as specified as an input to the allocation command, INQUIRY 862 "USER CNTL UPDATE REQUEST?"

Should there be such a request, the user structure control in cache-structure controls 69 is updated, STEP 864 "UPDATE USER STRUCTURE CNTLS." Subsequent to updating the user structure controls or if there is no user control update request, a determination is made as to whether a model-dependent time-out has occurred, INQUIRY 866 "MODEL-DEPENDENT TIME-OUT?"

If a time-out has not occurred, then it is ascertained as to whether the allocation process is complete, INQUIRY 868 "ALLOCATION COMPLETE?" If allocation is incomplete, control and data areas are created, STEP 870 "CREATE CONTROL AND DATA AREAS," as described above, and flow passes to INQUIRY 866 in order to complete the initial allocation of the cache structure. On the other hand, when allocation is complete, the allocation incomplete state is reset, indicating allocation complete, STEP 872 "RESET ALLOCATION INCOMPLETE STATE." The allocation complete indicator is then returned, STEP 874 "RETURN AND INDICATE COMPLETION."

Returning to INQUIRY 866, if a time-out has occurred, the allocation checkpoint is set, STEP 876 "SET ALLOCATION CHECKPOINT" and cache structure information and a response code are returned, indicating allocation incomplete, STEP 878 "RETURN AND INDICATE NOT-DONE."

After initial allocation is completed, an allocate-cache-structure command is always checkpointed when a successful or incomplete response code is returned. Also, after initial allocation is completed, an allocation process may be checkpointed anytime during the execution of a successful allocate-cache-structure command or when background processing continues as a result of a successful allocate-cache-structure command. Background processing of a successful allocate-structure command stops when a successful response code is returned. As described above, when a cache-allocation process is checkpointed, the structure controls and global controls are updated.

In one embodiment, in order to allocate a list structure, the logic associated with FIGS. 32a–32b may be used, as described in detail below. The allocate-list-structure command updates the user structure control and (1) creates a list structure or (2) continues or completes initial allocation of a list structure. A list structure is created on the first successful invocation of the allocate-list-structure command for a structure that does not already exist.

Figure 32A:
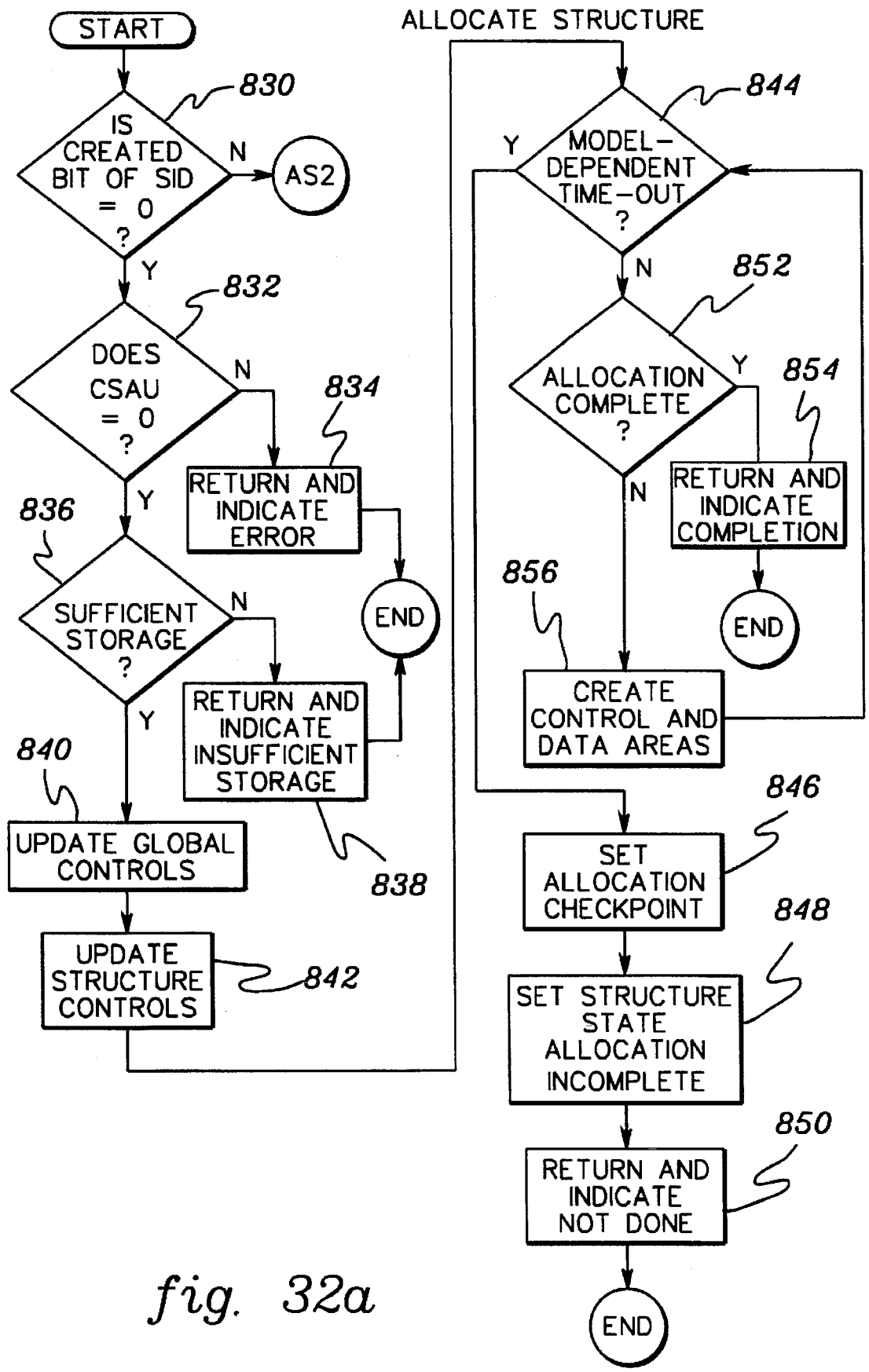
FIGS. 32a–32b depict one embodiment of the logic associated with an allocate structure command, in accordance with the principles of the present invention.
Figure 32B:
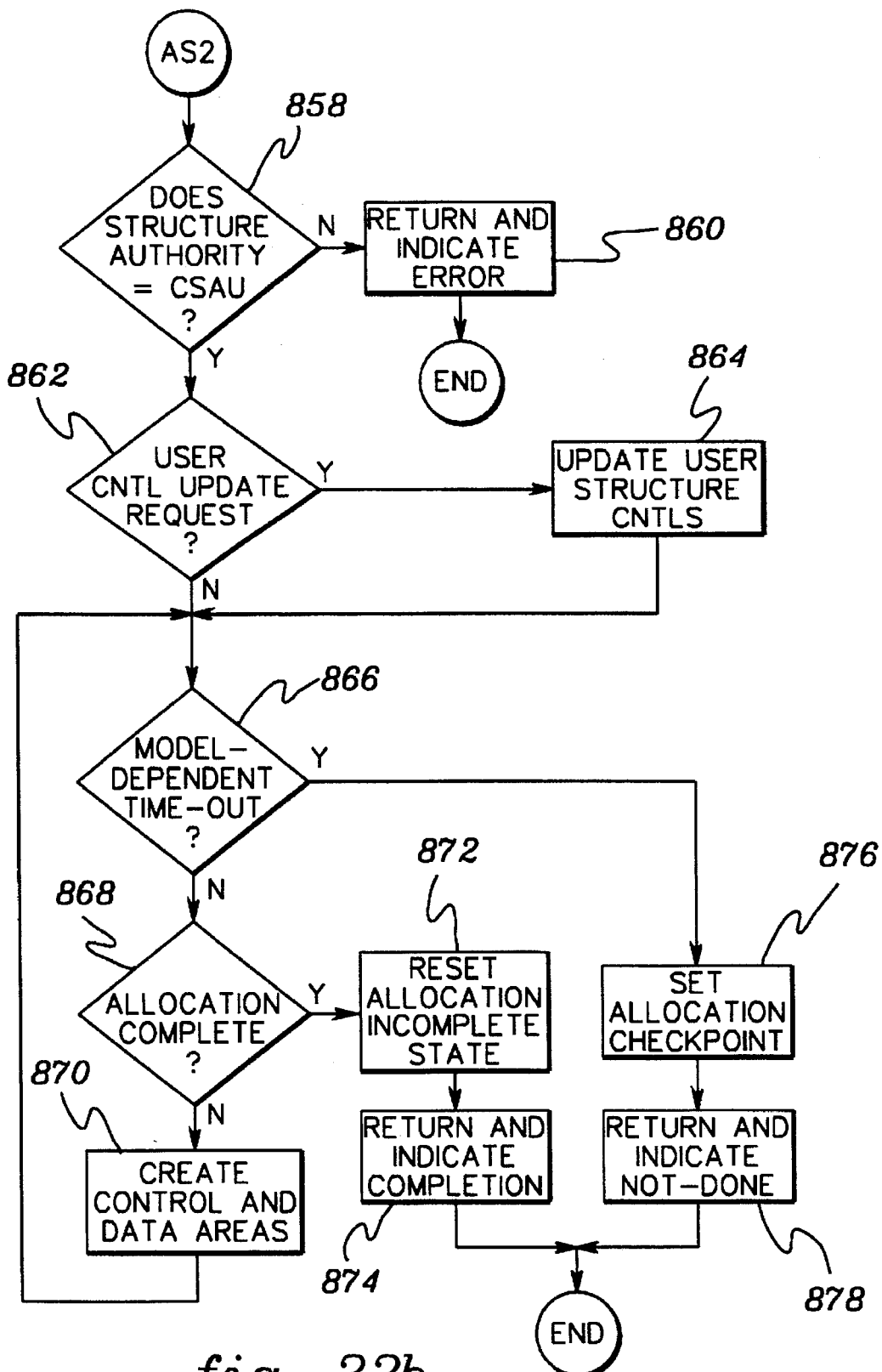

Referring to FIG. 32a, initially, a determination is made as to whether the value of the created bit in the structure identifier vector associated with the SID value is equal to zero, INQUIRY 830 "IS CREATED BIT OF SID=0?" If the value of the created bit associated with the SID is equal to zero, indicating a list structure has not been created, then another determination is made as to whether the comparative structure authority (CSAU) in request/response operands is equal to zero, INQUIRY 832 "DOES CSAU=0?" When the comparative structure authority is not equal to zero, the structure authority value of zero in request/response operands (FIG. 13) and an error code are returned, STEP 834 "RETURN AND INDICATE ERROR."

Otherwise, if the comparative structure authority is equal to zero, then the amount of storage is checked, INQUIRY 836 "SUFFICIENT STORAGE?" Should there be insufficient storage, an indication as such is returned, STEP 838 "RETURN AND INDICATE INSUFFICIENT STORAGE."

Should there be sufficient storage and therefore, a list structure is created, global controls 67 and list structure controls 92 are updated, STEPS 840, 842. In particular, when the list structure is created, the created bit in the structure-identifier vector associated with the SID value is set to one and the free-space and free-control-space global objects are updated. In addition, the UID vector of list structure controls 92 is initialized to zero; the SAU operand of request/response operands is placed in the structure authority object of list structure controls; and the USC operand of the request/response operands is placed in the user-structure control.

Thereafter, there is an indication of whether a model-dependent time-out has occurred, INQUIRY 844 "MODEL-DEPENDENT TIME-OUT?" When a model-dependent time period has elapsed before the allocation processes are completed, the processes are checkpointed, STEP 846 "SET ALLOCATION CHECKPOINT." In particular, the structure size, list structure controls 92, the free-space and free-control-space global objects are updated. Subsequently, the structure state control (not shown) in the structure controls is set as allocation incomplete, STEP 848 "SET STRUCTURE STATE ALLOCATION INCOMPLETE," and list structure information and an exception response code are returned, STEP 850 "RETURN AND INDICATE NOT DONE."

Returning to INQUIRY 844, when a model-dependent time-out has not occurred, a determination is made as to whether the allocation process is complete, as described above, INQUIRY 852 "ALLOCATION COMPLETE?" Should allocation be complete, a successful response code is returned, indicating all requested list-allocation processes are complete, STEP 854 "RETURN AND INDICATE COMPLETION."

Otherwise, when a list structure is created but not completely allocated, all list-structure commands issued to the structure except for the allocate-list-structure, deallocate-list-structure, and read-list-structure-information commands are suppressed or terminated with an initial-allocation-incomplete status condition. Further, control and data areas are created, STEP 856 "CREATE CONTROL AND DATA AREAS." In particular, list controls, list entry controls, data list elements and the lock table are created. Thereafter, flow passes to INQUIRY 844 "MODEL-DEPENDENT TIME-OUT?"

Returning to INQUIRY 830, if the created bit of SID is not equal to zero, signifying a structure is created, a structure authority comparison is made, INQUIRY 858 "DOES STRUCTURE AUTHORITY=CSAU?" Should the value of SAU in list structure controls 69 not be equal to the value of CSAU, the value of the structure authority in the request/response operands and an error code are returned, STEP 860 "RETURN AND INDICATED ERROR." Otherwise, a determination is made as to whether there is a user control update request, as specified as an input to the allocation command, INQUIRY 862 "USER CNTL UPDATE REQUEST?"

Should there be such a request, the user structure control in list-structure controls 92 is updated, STEP 864 "UPDATE USER STRUCTURE CNTLS." Subsequent to updating the user structure controls or if there is no user control update request, a determination is made as to whether a model-dependent time-out has occurred, INQUIRY 866 "MODEL-DEPENDENT TIME-OUT?"

If a time-out has not occurred, then it is ascertained as to whether the allocation process is complete, INQUIRY 868 "ALLOCATION COMPLETE?" If allocation is incomplete, control and data areas are created, STEP 870 "CREATE CONTROL AND DATA AREAS," as described above, and flow passes to INQUIRY 866 in order to complete the initial allocation of the list structure. On the other hand, when allocation is complete, the allocation incomplete state is reset, indicating allocation complete, STEP 872 "RESET ALLOCATION INCOMPLETE STATE." The allocation complete indicator is then returned, STEP 874 "RETURN AND INDICATE COMPLETION."

Returning to INQUIRY 866, if a time-out has occurred, the allocation checkpoint is set, STEP 876 "SET ALLOCATION CHECKPOINT" and list structure information and a response code are returned, indicating allocation incomplete, STEP 878 "RETURN AND INDICATE NOT-DONE."

After initial allocation is complete, an allocate-list-structure command is always checkpointed when a successful response code is returned. Also, after initial allocation is complete, an allocation process may be checkpointed any time during the execution of a successful allocate-list-structure command or when background processing continues as a result of a successful allocate-list-structure command. Background processing of a successful allocate-list-structure command stops when a successful response code is returned. When a list-allocation process is checkpointed, the structure size, list-structure objects, the free-space and free control-space global objects are updated.

Once the command completes and it is successful, INQUIRY 890 (FIG. 29a) "ALLOCATE SUCCESSFUL," the active policy image in virtual storage is updated in order to indicate the successful allocation of a structure, STEP 892 "UPDATE ACTIVE POLICY IMAGE IN STORAGE."

After updating the active policy, a determination is made as to whether a CONNAME is specified as an input on IXLCONN, INQUIRY 894 "IS A CONNAME SPECIFIED?" Should a CONNAME be specified, a further determination is made to ascertain whether the name exists in the active policy, INQUIRY 896 "DOES NAME EXIST IN POLICY?" If the name exists, it is checked to see if it is failed-persistent, INQUIRY 898 "IS NAME FAILED-PERSISTENT?"

When the name is indicated as failed-persistent, or if the name does not exist in the policy, INQUIRY 896, a vector is defined at the central processing complex where the connector is executing, STEP 900 "DEFINE VECTOR." In particular, a local bit vector is defined for a cache for cache coherency and for a list, a list notification vector is defined for state transitions. In addition to the above, if a CONNAME is not specified, INQUIRY 894, a unique name is generated, STEP 902, and flow passes to STEP 900 "DEFINE VECTOR."

Should the definition be successful, INQUIRY 904 "DEFINE VECTOR SUCCESSFUL?", a further check is made to determine whether there is any available space in the active policy to record user information, INQUIRY 906 "ANY AVAILABLE USER AREAS?"

If there is an available user area (i.e., an unused area for a new connection or reuse of existing area for a re-connect), it is selected along with the next available user id (for a re-connect, the same user id is used), STEP 908 "SELECT NEXT AVAILABLE USER AREA AND ID." Thereafter, a unique user authority request operand is created and a checkpoint record indicating attach is created, STEPS 910, 912. In addition, the active policy is written with no unlock, STEP 914 "WRITE AP WITH NO UNLOCK," and an attach user command, described in detail below, is processed to completion, STEP 916 "ISSUE ATTACH USER COMMAND TO COMPLETION."

In one embodiment, the logic associated with one example of an attach user command is described in detail with reference to FIG. 33. The attach user command is used to attach a user to a structure, such as a list or cache structure. An example of attaching a list user to a structure is described in detail below.

Figure 33:
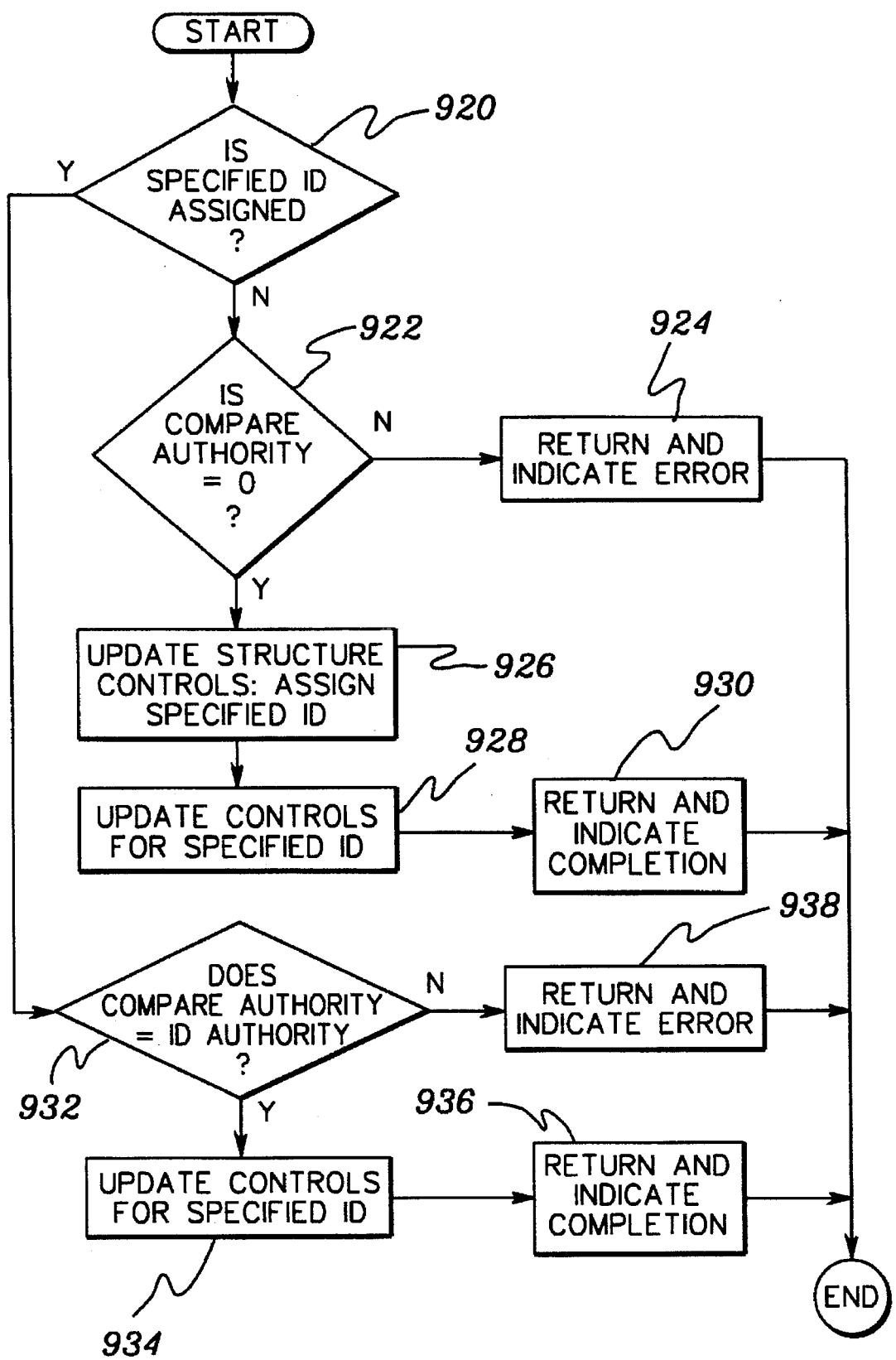
FIG. 33 depicts one embodiment of the logic associated with an attach command, in accordance with the principles of the present invention.

Referring to FIG. 33, initially, an inquiry is made as to whether or not the user is already attached to the structure. In particular, a determination is made as to whether the specified user identifier (FIG. 9) is assigned, INQUIRY 920 "IS SPECIFIED ID ASSIGNED?" When the user identifier is not assigned, the comparative user authority value (CUAU) in request/response operands (FIG. 13) is compared to zero, INQUIRY 922 "IS COMPARE AUTHORITY=0?" If the comparative user authority is not zero, the user authority value and the user-attachment control response operands (FIG. 13) are returned, along with an error indication, STEP 924 "RETURN AND INDICATE ERROR.

On the other hand, when the user authority comparison is successful, the structure controls (i.e., list structure controls 92) are updated, STEP 926 "UPDATE STRUCTURE CONTROLS: ASSIGN SPECIFIED ID." In particular, controls, such as the appropriate assigned bit in the user-identifier vector of list-structure controls 92 is set to one and in list-user control block 94, the user state is set to active, the detachment restart token is set to zero and the user authority and user-attachment control are updated, STEP 928 "UPDATE CONTROLS FOR SPECIFIED ID." Subsequently, a successful response code indicating completion is returned, STEP 930 "RETURN AND INDICATE COMPLETION." Thereafter, processing of the attach command ends.

Returning to INQUIRY 920 "IS SPECIFIED ID ASSIGNED?", if the user identifier is assigned, then flow passes to INQUIRY 932 "DOES COMPARE AUTHORITY=ID AUTHORITY?" When comparative user authority (FIG. 13) is equal to the user authority (FIG. 9), the user state is set active, the user authority and user-attachment control objects (FIG. 9) are replaced by the user authority and user-attachment control request operands (FIG. 13), STEP 934 "UPDATE CONTROLS FOR SPECIFIED ID." Thereafter, a successful return code indicating completion is returned, STEP 936, and processing ends.

However, if the user authority comparison fails, INQUIRY 932, the user authority, user-attachment control and an error response are returned in the response operands, STEP 938.

Similarly to attaching list structure users, a local cache may be attached. The attach-local-cache command identifies a local cache to an existing coupling facility (SES) cache. In one embodiment, this is accomplished using the same logic as depicted in FIG. 33. In particular, in order to attach a local cache, an inquiry is made as to whether or not the local cache is already assigned. In particular, a determination is made as to whether a specified local cache identifier (FIG. 5) is assigned, INQUIRY 920 "IS SPECIFIED ID ASSIGNED?" When the local cache identifier is not assigned, the comparative local-cache authority value in request/response operands (FIG. 13) is compared to zero, INQUIRY 922 "IS COMPARE AUTHORITY=0?" If the comparative local-cache authority is not zero, the local-cache authority value and the attachment information controls are returned in the request/response operands (FIG. 13), along with an error indication, STEP 924.

On the other hand, when the local-cache authority comparison is successful, the structure controls (i.e., cache structure controls 69) are updated, STEP 926 "UPDATE STRUCTURE CONTROLS: ASSIGN SPECIFIED ID." In particular, the specified local cache identifier is assigned. In addition, controls for the specified local cache identifier are updated, STEP 928. In particular, the attachment status in local-cache control block 70 is placed in the active state, and the local-cache controls, such as local-cache authority, local-cache token, the attachment status, and attachment information in local-cache control block 70 are set, as well as the detachment restart token. Subsequently, a successful response code indicating completion is returned, STEP 930 "RETURN AND INDICATE COMPLETION." Thereafter, processing of the attach command ends.

Returning to INQUIRY 920 "IS SPECIFIED ID ASSIGNED?", if the local-cache identifier is assigned, then flow passes to INQUIRY 932 "DOES COMPARE AUTHORITY=ID AUTHORITY?" When the comparative local-cache authority (FIG. 13) is equal to the local-cache authority (FIG. 5), the attachment status is set to active, the attachment information and local-cache authority controls (FIG. 5) are replaced by the attachment information and local-cache authority request operands (FIG. 13), STEP 934 "UPDATE CONTROLS FOR SPECIFIED ID." Thereafter, a successful return code indicating completion is returned, STEP 936, and processing ends.

However, if the local-cache authority comparison fails, INQUIRY 932, the local-cache authority and attachment information controls of the response operands are returned, along with an exception response code, STEP 938.

Returning to FIG. 29b, and in particular STEP 916, when there is a successful attach, INQUIRY 950 "ATTACH SUCCESSFUL?", the active policy image is updated in virtual storage to indicate such, STEP 952 "UPDATE AP FOR ATTACHED USER," and notification of the connect is initiated, as described below, STEP 954 "INITIATE NOTIFICATION OF CONNECT."

Figure 34:
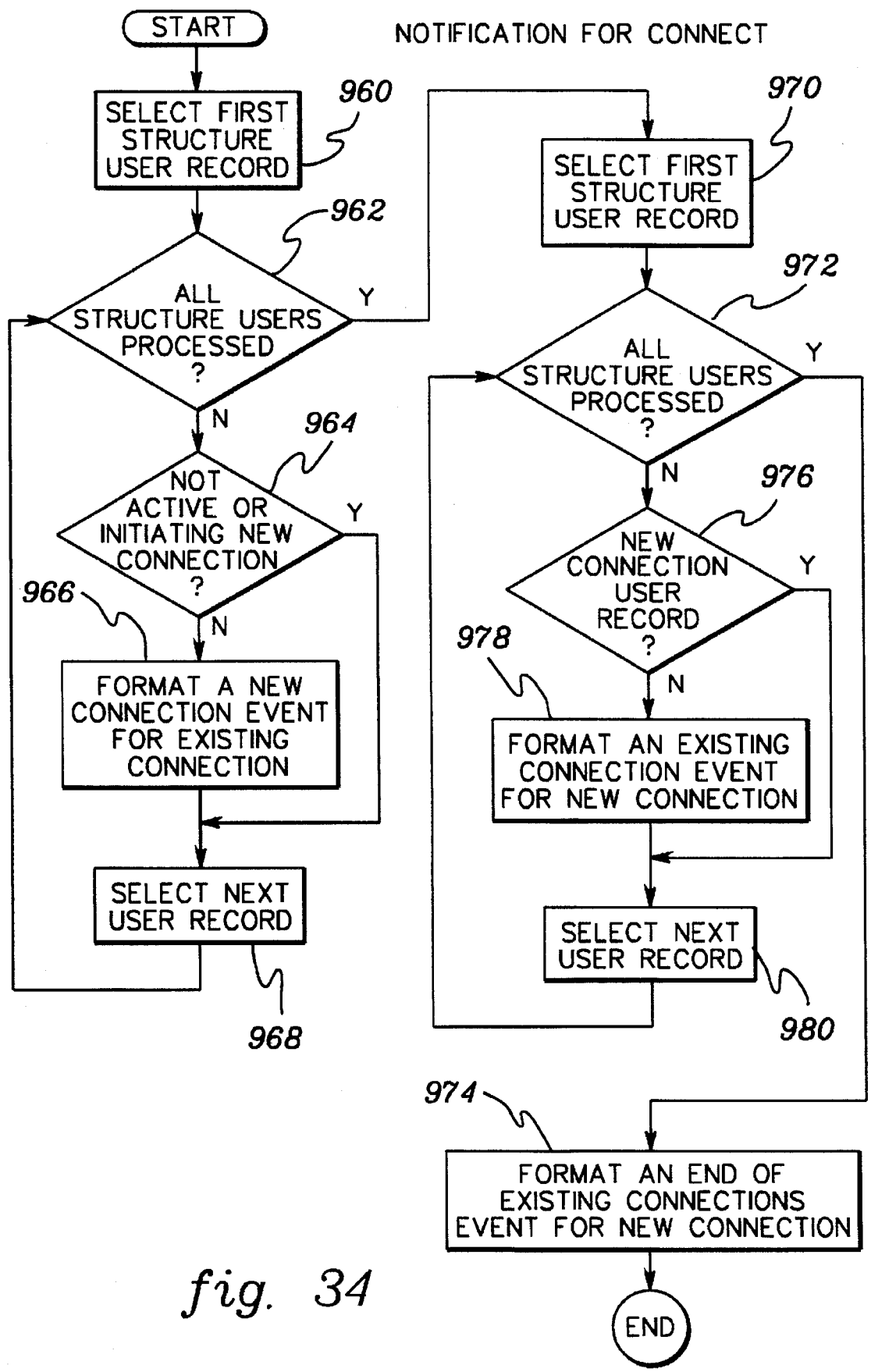
FIG. 34 illustrates one embodiment of the logic associated with a notification for a connect service, in accordance with the principles of the present invention.

Referring to FIG. 34, one example of the logic associated with the notification process is described in detail. Initially, the first structure user record is selected from the active policy, STEP 960 "SELECT FIRST STRUCTURE USER RECORD." Subsequently, a determination is made as to whether all structure users have been processed, INQUIRY 962 "ALL STRUCTURE USERS PROCESSED?"

If all of the users have not been processed, and the user is active and the user is not the one initiating the new connection, INQUIRY 964 "NOT ACTIVE OR INITIATING NEW CONNECTION", a new connection event for the existing connection (described below) is formatted, STEP 966 "FORMAT A NEW CONNECTION EVENT FOR EXISTING CONNECTION." After the event is formatted or if the user is not active or the user is the one initiating the new connection, the next user record in the active policy is selected, STEP 968 "SELECT NEXT USER RECORD," and flow passes to INQUIRY 962 "ALL STRUCTURE USERS PROCESSED?"

Returning to INQUIRY 962, if all of the structure users have been processed, then the first structure user record is selected from the active policy, STEP 970 "SELECT FIRST STRUCTURE USER RECORD." If all of the users are processed, INQUIRY 972 "ALL STRUCTURE USERS PROCESSED," then an end of existing connections event (described below) is formatted for the new connection, STEP 974 "FORMAT AN END OF EXISTING CONNECTIONS EVENT FOR NEW CONNECTION," and processing ends.

On the other hand, if all of the structure users have not been processed, INQUIRY 972, a determination is made as to whether the user record is for the new connection, INQUIRY 976 "NEW CONNECTION USER RECORD?" Should the user record not be for the new connection, an existing connection event for the new connection is formatted, STEP 978. Subsequent to formatting the connection event or if the user record is for the new connection, the next user record is selected, STEP 980 "SELECT NEXT USER RECORD," and flow passes to INQUIRY 972 "ALL STRUCTURE USERS PROCESSED?"

Returning to FIG. 29b, after initiating notification of the connect, the checkpoint for allocate and attach is cleared, STEP 990. The active policy is written from virtual storage to the function data set and the active policy in the function data set is unlocked, STEP 992 "WRITE AND UNLOCK AP TO FUNCTION DATA SET" and the connect process is complete.

Returning to INQUIRY 950, if the attach is unsuccessful, a determination is made as to whether the vector(s) is defined successfully, INQUIRY 994 "DEFINE VECTOR SUCCESSFUL?" When the vector is defined successfully, the vector is released, STEP 996 "RELEASE VECTOR." After releasing the vector or if the vector definition is unsuccessful, a determination is made as to whether the attach was successful, INQUIRY 998 "ATTACH SUCCESSFUL?"

Figure 29A:
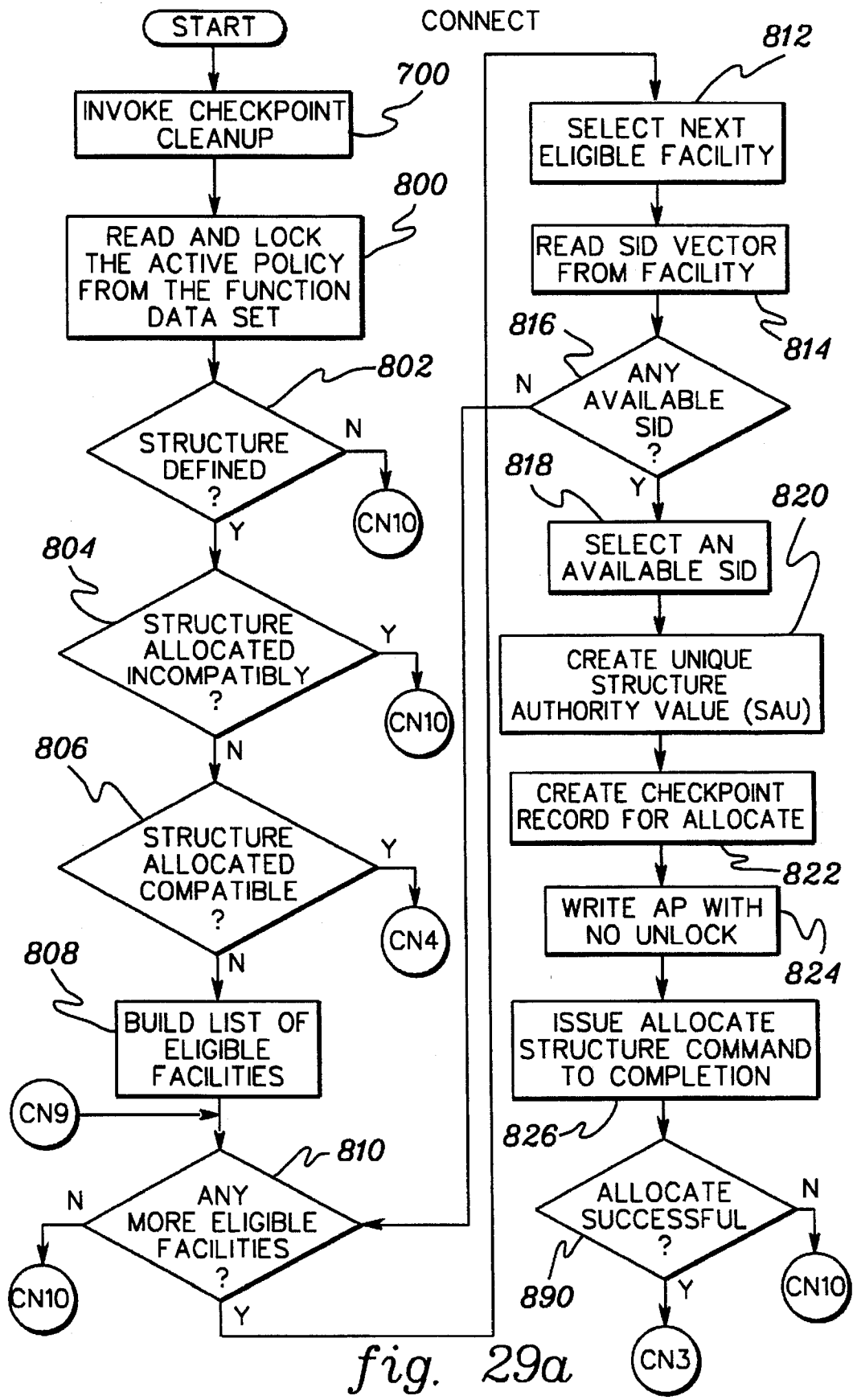
FIGS. 29a–29e depict one embodiment of the logic associated with a connect service, in accordance with the principles of the present invention.
Figure 29B:
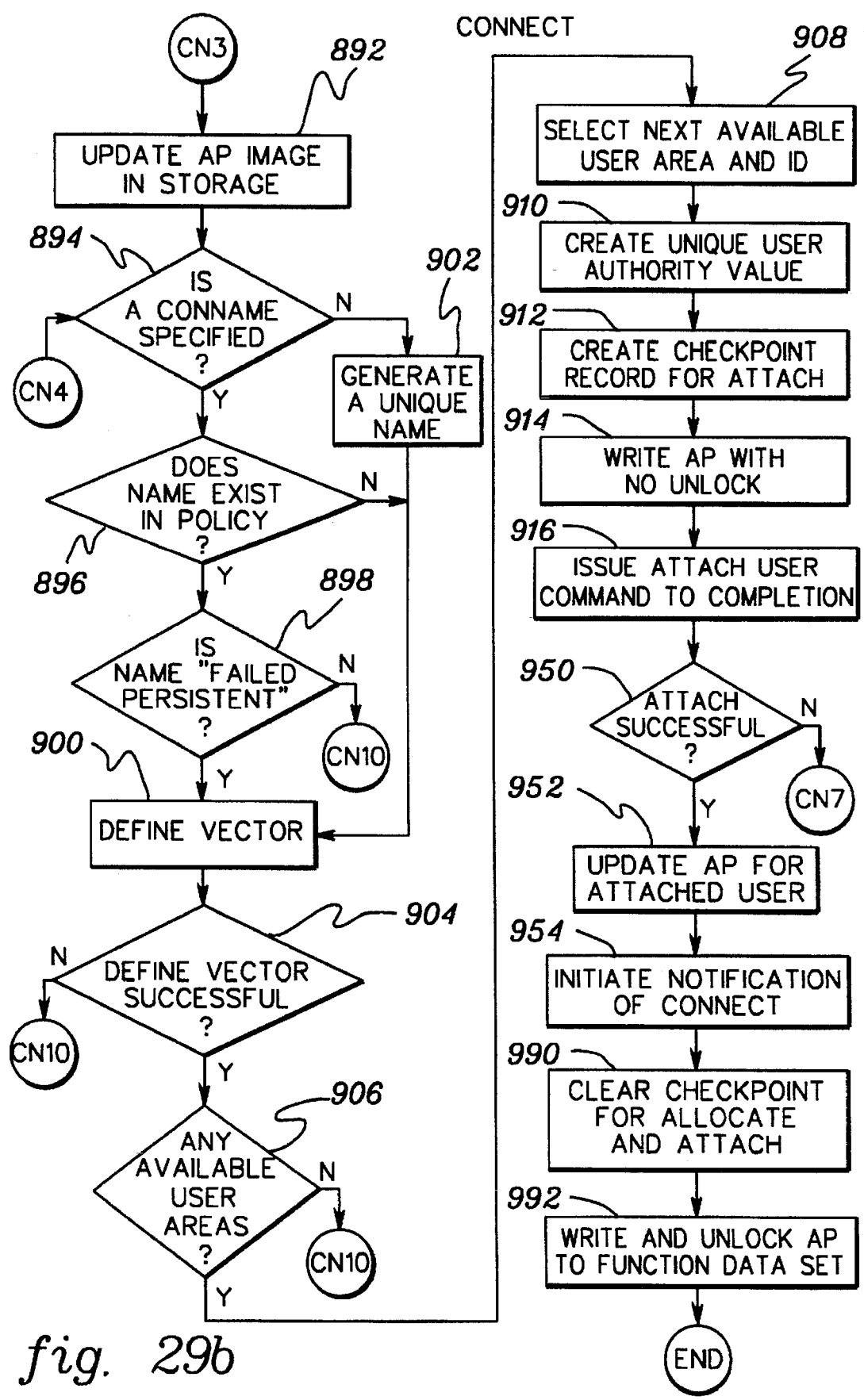
Figure 29C:
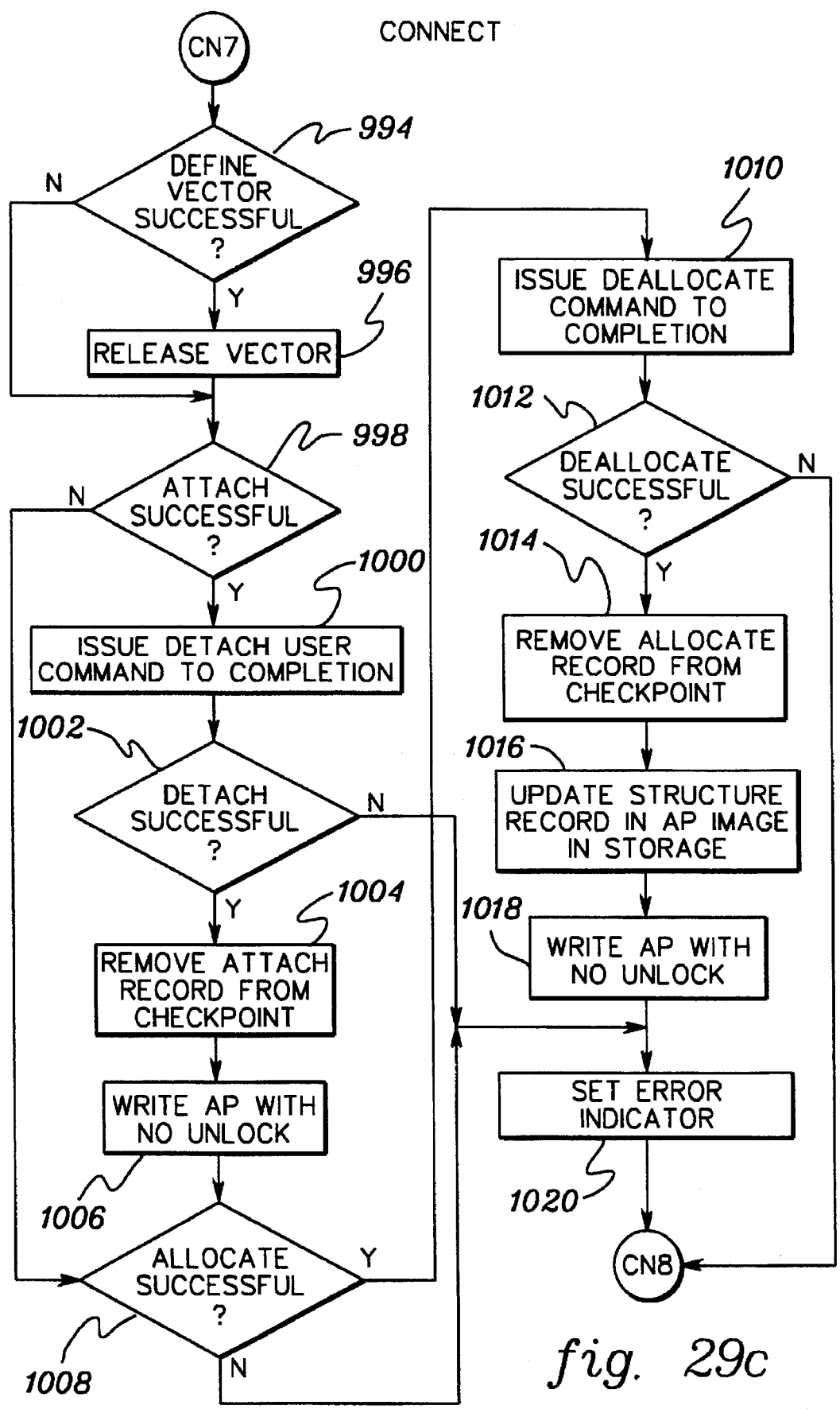
Figure 29D:
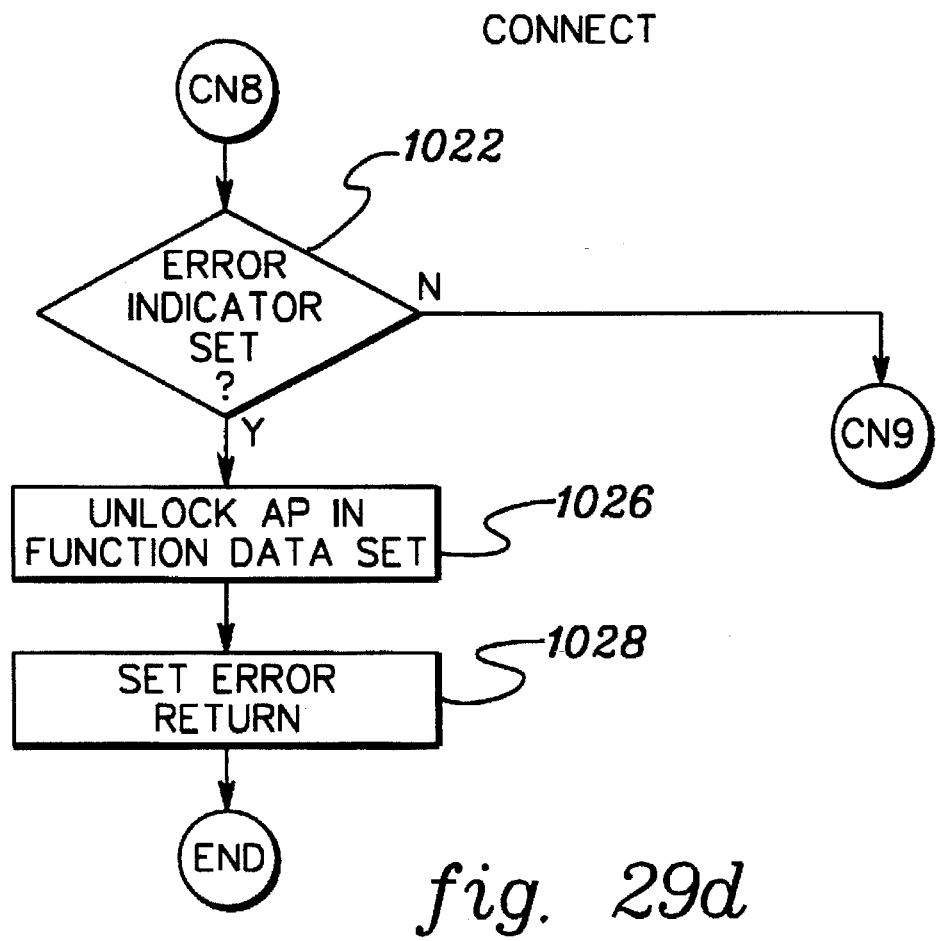
Figure 29E:
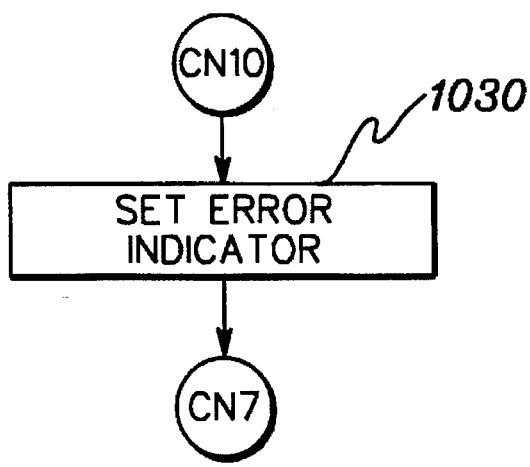

In particular, this inquiry is made to enable back-out of connect processing for failures which occur after the attach successful condition at INQUIRY 950 on FIG. 29b. Specific failure conditions are not discussed, since they are not pertinent to the present invention.

Should the attach be successful, a detach user command, described above, is processed to completion, STEP 1000 "ISSUE DETACH USER COMMAND TO COMPLETION."

After the detach user command, a determination is made as to whether the detach was successful, INQUIRY 1002 "DETACH SUCCESSFUL?" Should the detach be successful, the attach record is removed from checkpoint save area, STEP 1004, and the active policy is written with no unlock, STEP 1006. Thereafter, or if the attach is unsuccessful, a determination is made as to whether the allocate command processed successfully, INQUIRY 1008 "ALLOCATE SUCCESSFUL?" Should the allocate be successful, a deallocate command, described above, is issued to completion, STEP 1010 "ISSUE DEALLOCATE COMMAND TO COMPLETION."

After the deallocate command is completed, a check is made to see if it was successful, INQUIRY 1012 "DEALLOCATE SUCCESSFUL?" If the deallocate command was successful, the allocate record is removed from the checkpoint save area and the structure record in the active policy image in virtual storage is updated, STEPS 1014, 1016. Thereafter, the active policy is written to the function data set with no unlock, STEP 1018 "WRITE AP WITH NO UNLOCK."

Subsequent to writing the active policy, the error indicator is set, STEP 1020 "SET ERROR INDICATOR." After setting the error indicator, or if deallocate was unsuccessful, a check of the error indicator is made, INQUIRY 1022 "ERROR INDICATOR SET?" Should the error indicator not be set, flow returns to INQUIRY 810 (FIG. 29a) "ANY MORE ELIBIBLE FACILITIES?" Otherwise, the active policy in the function data set is unlocked, STEP 1026 "UNLOCK AP IN FUNCTION DATA SET," and an error code is returned, STEP 1028 "SET ERROR RETURN."

Returning to INQUIRY 1002 (FIG. 29c), if the detach was unsuccessful, or if the allocate was unsuccessful, INQUIRY 1008, flow passes to STEP 1020 "SET ERROR INDICATOR," and processing continues, as described above.

Returning to INQUIRIES 802, 804, 810, 890, 898, 904 and 906, if the structure is undefined, or the structure allocation is incompatible, or there are no more eligible facilities or the allocate is unsuccessful or the name is not failed persistent or the vector definition is unsuccessful or there are not any available user areas in the active policy, flow passes to STEP 1030 "SET ERROR INDICATOR" and the error indicator is set. Thereafter, processing continues with INQUIRY 994 "DEFINE VECTOR SUCCESSFUL?"

Returning to INQUIRY 806, should the structure allocation be compatible, flow passes to INQUIRY 894 "IS A CONNAME SPECIFIED?" and processing continues, as described above. Further, returning to INQUIRY 816, if there is not an available SID, flow returns to INQUIRY 810 "ANY MORE ELIGIBLE FACILITIES?", and processing continues, as described above.

One example of a connection service, the logic of which is described above, is referred to as IXLCONN. The IXLCONN service is a vehicle by which a user becomes a connected XES user, gains access to XES services, gains access to a coupling facility structure, and defines the attributes of the coupling facility structure and the connection.

In one embodiment, the caller of IXLCONN supplies, for example, some or all of the following information to the service:

(a) a coupling facility structure name;

(b) the attributes of the structure, such as the number of lists in a list structure; and (c) a set of one or more exit routines, each of which is designed to facilitate communication between the connected XES user and XES software services. Examples of exit routines to be invoked by XES are described below:

1. An EVENT exit is required for all connections and is used to report error and status conditions.

2. A COMPLETE exit is required for all connections and is used to inform the connected XES user that a previous request has completed.

3. A LIST TRANSITION exit, which is optional for list structures, is used to inform a connected XES user that a monitored list has transitioned into a non-empty state. The LIST TRANSITION exit is required, however, in order to use the list monitoring function.

When invoking the IXLCONN service, the connected XES user identifies the coupling facility structure that it wishes to access. This is accomplished by specifying the coupling facility structure name (STRNAME). The structure name, location among coupling facilities, and the total size of each structure are controlled by the installation through the installation coupling facility policy, described above. All other attributes of the structure are specified by the connected XES user on the IXLCONN service.

In one embodiment, IXLCONN has the following syntax (some of the keywords for IXLCONN and other services described below are designated as required, but may be optional in another embodiment):

```
IXLCONN    STRNAME=xstrname
           [,STRSIZE={xstrsize|0}]
           [,CONDATA={xcondata|ALL ZEROES}]
           ,STRDISP={KEEP|DELETE}
           ,CONDISP=KEEP
              ,CONNAME=xconname
           ,CONDISP=DELETE
              [,CONNAME={xconname|GENERATED
                 NAME}]
           [,NONVOLREQ={NO|YES}]
           ,EVENTEXIT=xeventexit
           ,COMPLETEEXIT=xcompleteexit
           ,TYPE=CACHE
              [,ELEMCHAR={xelemchar|0}]
              [,MAXELEMNUM={xmaxelemnum
                 |16}]
              [,DIRRATIO={xdirratio|1}]
              [,ELEMENTRATIO={xelementratio
                 |1}]
              [,ADJUNCT={NO|YES}]
              ,VECTORLEN=xvectorlen
              ,NUMCOCLASS=xnumcoclass
              ,NUMSTGCLASS=xnumstgclass
           ,TYPE=LIST
              [,ELEMCHAR={xelemchar|0}
              [,MAXELEMNUM={xmaxelemnum
                 |16}]]
              [,ENTRYRATIO={xentryratio|1}]
              [,ELEMENTRATIO={xelementratio
                 |1}]
              [,ADJUNCT={NO|YES}]
              [,LISTCNTRLTYPE={ENTRY
                 |ELEMENT}]
              [,REFOPTION={NOKEYNAME|KEY
                 |NAME}]
              [,VECTORLEN={xvectorlen|0}
                 [,LISTTRANEXIT=
                    {xlisttranexit|0}]]
              ,LISTHEADERS=xlistheaders
              [,LOCKENTRIES={xlockentries
                 |0}
              ,NOTIFYEXIT=xnotifyexit]
           ,TYPE=LOCK
              [,RECORD={NO|YES}]
              ,LOCKENTRIES=xlockentries
              ,NUMUSERS=xnumusers
              ,CONTEXIT=xcontexit
              ,NOTIFYEXIT=xnotifyexit
           ,ANSAREA=xansarea
           ,ANSLEN=xanslen
           [,RETCODE=xretcode]
           [,RSNCODE=xrsncode]
```

Where:

STRNAME(xstrname) is the name (RS-type) (or address in register (2)-(12) ASM only) of a required 16 character input that specifies the structure name the user wishes to connect to. The logical structure name provides the ability to map the request to a physical facility. The name is defined in the active policy.

The structure name must be 16 characters long, padded on the right with blanks if necessary.

[STRSIZE({xstrsize|0})] is the name (RS-type) (or address in register (2)-(12) ASM only) of optional fullword input that specifies the structure size. This size will be used to allocate the structure if the size is smaller than the structure size defined in the active policy. If the size is not smaller than the policy size, the policy size will be used to allocate the structure.

Regardless of whether the connector specified size or the policy size is used, the structure may always be allocated using less than the requested space when there are limited facility resources available. The actual structure size is returned in the connect answer area.

When STRSIZE is 0 (default), the structure size in the active policy, described herein, is used. DEFAULT: 0

[{CONDATA({xcondata|ALL_ZEROES})] is the name (RS-type) (or address in register (2)-(12) ASM only) of an optional 8 character input that specifies connector data that will be provided to this connection's exits and can be used as the invoker wishes. DEFAULT: ALL_ZEROES STRDISP({KEEP|DELETE}) is a required keyword input which defines an attribute of the structure to be allocated. The disposition of a structure defines whether the structure is persistent when there are no longer any defined connections (active or failed-persistent).

KEEP structure always remains allocated.

DELETE structure is deleted when there are no active or failed-persistent connections.

CONDISP({KEEP|DELETE}) is a required keyword input which defines an attribute of the connection. The disposition of a connection defines whether the connection is persistent, if the connection abnormally terminates.

CONDISP(KEEP) connection is in a failed-persistent state after abnormal termination. There are several ways that a failed-persistent connection can be cleaned up: 1) via the IXLEERSP macro, described below, after all serving connectors have cleaned up for the terminated connection, 2) by reconnecting as the terminated user (by specifying the same CONNAME on IXLCONN), or 3) via an IXLFORCE macro, described below, which can be invoked to force deletion of the failed-persistent connection.

CONNAME(xconname) is the name (RS-type) (or address in register (2)-(12) ASM only) of a required 16 character input that specifies a name by which the user wishes to be identified. The name must be unique within the scope of the given structure.

The CONNAME must be 16 characters long, padded on the right with blanks if necessary.

If the name provided matches the name of another active connection to the same structure, then the connect request will be rejected. If the name provided matches the name of a connection in the failed-persistent state and all peer connections have acknowledged via return code in the event exit parameter list (EEPL) or have issued IXLEERSP, then the connection is re-established (reconnected). Otherwise, the connection is rejected. On a reconnection, a new CONTOKEN is returned to the user in the answer area.

For all supported exits, the CONNAME for the subject of the event is presented.

CONDISP(DELETE) connection is not defined after abnormal termination.

[CONNAME({xconname|GENERATED_NAME})] is the name (RS-type) (or address in register (2)-(12) ASM only) of an optional 16 character input that specifies a name by which the user wishes to be identified. The name must be unique within the scope of a given structure.

If the CONNAME keyword is not specified, then a unique name will be generated and returned to the user in the answer area. The attributes and characteristics of CONNAME are described above.

[NONVOLREQ({NO|YES})] is an optional keyword input which indicates whether the structure requires that the coupling facility be non-volatile. DEFAULT: NO.

NO The structure may be allocated in any facility regardless of the volatility attribute of the facility.

YES The structure should be allocated in a facility that is non-volatile. The user must check the CONAVOLATILE flag in the connect answer area to determine whether the non-volatility requirement was honored.

EVENTEXIT(xeventexit) is a required input. It is the name (RS-type) (or address in register (2)-(12) ASM only) of the user's event exit. The user's event exit will receive control in SRB mode, enable and unlocked.

COMPLETEEXIT(xcompleteexit) is a required input. It is the name (RS-type) (or address in register (2)-(12) ASM only) of the user's complete exit. The user's complete exit will receive control in SRB mode, enabled and unlocked.

TYPE({CACHE|LIST|LOCK}) is a required keyword input which defines the structure type for the structure to which the user is connecting to.

TYPE(CACHE) specifies a cache structure.

[ELEMCHAR({xelemchar|0})] is the name (RS-type) (or address in register (2)-(12) ASM only) of an optional byte input that specifies the element characteristic. The element characteristic defines the element size. The element size is specified as the power of two in the following formula:

$$256*(2**ELEMCHAR).$$

For example: If ELEMCHAR=0, then each data element will be 256 bytes.

The data written to and read from the structure is called a data entry. A data entry can be up to 16 times the data element characteristics.

The size of the data elements is a model dependent attribute of the coupling facility (e.g., SES). DEFAULT: 0

[MAXELEMNUM({xmaxelemnum|16})] is the name (RS-type) (or address in register (2)-(12) ASM only) of an optional byte input that specifies the maximum number of data elements per data entry. MAXELEMNUM must be in the range of 1 and 16 decimal. The value specified for MAXELEMNUM must be greater than or equal to the ELEMENTRATIO divided by DIRRATIO. This restriction ensures that all possible data elements allocated in a structure can be assigned to directory entries.

MAXELEMNUM is ignored if ELEMENTRATIO is zero. DEFAULT: 16

[DIRRATIO({xdirratio|1})] is the name (RS-type) (or address in register (2)-(12) ASM only) of an optional byte input that contains the directory part of the directory-to-element ratio. DIRRATIO must be greater than zero. DEFAULT: 1

[ELEMENTRATIO({xelementratio|1})] is the name (RS-type) (or address in register (2)-(12) ASM only) of an optional byte input that contains the element part of the directory-to-element ratio.

If the element portion of the directory-to-element ratio is zero, then the cache structure is allocated without data elements. DEFAULT: 1

(ADJUNCT({NO|YES})] is an optional keyword input which indicates whether an adjunct entry for each cache entry is needed. Each adjunct entry is 64 bytes. DEFAULT: NO NO Specifies no adjunct entries should be allocated.
   YES Specifies adjunct entries should be allocated.

VECTORLEN(xvectorlen) is the name (RS-type) (or address in register (2)-(12) ASM only) of a required fullword input that contains the number of local buffers in the user's local cache which require concurrent registration. The value of this field is used to allocate resources which map the local buffers in the user's cache to the named entries in the cache structure.

NUMCOCLASS(xnumcoclass) is the name (RS-type) (or address in register (2)-(12) ASM only) of a required fullword input that contains the number of cast-out classes.

NUMSTGCLASS(xnumstgclass) is the name (RS-type) (or address in register (2)-(12) ASM only) of a required fullword input that contains the number of storage classes.

TYPE(LIST) specifies a list structure.

[ELEMCHAR({xelemchar|0}) is the name of an optional byte input that specifies the element characteristic, and is described above.

[MAXELEMNUM({xmaxelemnum|16})]] is the name of an optional byte input that specifies the maximum number of data elements per data entry, and is described above.

[ENTRYRATIO({xentryratio|1})] is the name (RS-type) (or address in register (2)-(12) ASM only) of an optional byte input that contains the entry part of the entry-to-element ratio. DEFAULT: 1

[ELEMENTRATIO({xelementratio|1})] is the name (RS-type) (or address in register (2)-(12) ASM only) of an optional byte input that contains the element part of the entry-to-element ratio.
    If the element portion of the entry-to-element ratio is zero, then the entry-to-element ratio is IGNORED. The list structure is allocated without data elements. DEFAULT: 1

[ADJUNCT({NO|YES})] is an optional keyword input which indicates whether an adjunct entry for each list entry is needed, and is described above.

[LISTCNTLTYPE=({ENTRY|ELEMENT})] is an optional keyword input which specifies whether list limits should be specified and tracked as data entries or elements. DEFAULT: ENTRY
    ENTRY: Specifies that the list limits are specified and tracked as limits on data entries.
    ELEMENT: Specifies that the list limits are specified and tracked as limits on data elements.

[REFOPTION({NOKEYNAME|KEY|NAME})] is an optional keyword input which indicates how the list entry will be referenced. The list entry can be referenced by the LEID in list entry control block 102 or the unkeyed position. The following optional reference options allow the list entry to also be referenced either by KEY or NAME. DEFAULT: NOKEYNAME
    NOKEYNAME: No additional reference options are requested.
    KEY: Indicates key support is requested. Key support allows the user to provide a 16 byte key when creating an entry. Key support is used to keep the list entry in sequence by key.
    NAME: Indicates name support is requested. Name support allows the user of the list structure to associate a unique 16-byte name with each list entry. This name can be used by direct reference entry by name.

[VECTORLEN({xvectorlen|0}) is the name (RS-type) (or address in register (2)-(12) ASM only) of an optional fullword input that contains the number of list headers this connection will be monitoring for list transitions. DEFAULT: 0

[LISTTRANEXIT({xlisttranexit|0})]] is an optional input. It is the name (RS-type) (or address in register (2)-(12) ASM only) of the connected XES-list user's list transition exit. DEFAULT: 0

LISTHEADERS(xlistheaders) is the name (RS-type) (or address in register (2)-(12) ASM only) of a required fullword input that contains the number of list headers to be allocated for the list structure. The number of list headers must be greater than zero.

[LOCKENTRIES({xlockentries|0}) is the name (RS-type) (or address in register (2)-(12) ASM only) of an optional fullword input that contains the number of lock entries to be allocated. The number of lock entries will be rounded upward to a power of 2, if it is not already. If this keyword is not specified, then the list structure will not be allocated with serialization support. DEFAULT: 0

NOTIFYEXIT(xnotifyexit)] is a required input. It is the name (RS-type) (or address in register (2)-(12) ADM only) of the connected XES-list user's notify exit.

TYPE(LOCK) specifies a lock structure.

[RECORD({NO|YES})] is an optional keyword input which indicates whether recording is desired. DEFAULT: NO
    NO Specifies no recording.
    YES Specifies recording.

LOCKENTRIES(xlockentries) is the name (RS-type) (or address in register (2)-(12) ASM only) of a required fullword input that contains the number of lock entries to be allocated for the lock structure. The number of lock entries will be rounded upward to a power of 2, if it is not already.

NUMUSERS(xnumusers) is the name (RS-type) (or address in register (2)-(12) ASM only) of a required byte input that contains the maximum number of users that may connect and use the lock structure.

CONTEXIT(xcontexit) is a required input. It is the name (RS-type) (or address in register (2)-(12) ASM only) of the connected XES-locking user's contention exit.

NOTIFYEXIT(xnotifyexit) is a required input. It is the name (RS-type) (or address in register (2)-(12) ASM only) of the connected XES-locking user's notify exit.

ANSAREA(xansarea) is a required input. It is the name (RS-type) area to contain the data being returned by the IXLCONN service routine. The answer area must begin on a double word boundary.

ANSLEN(xanslen) is the name (RS-type) of a required fullword input that contains the length of the ANSAREA.

[RETCODE(xretcode)] is the name (RS-type) of an optional fullword output variable (or register (2)-(12) ASM only) into which the return code is to be copied from, for example, general purpose register (GPR) 15.

[RSNCODE(xrsncode)] is the name (RS-type) of an optional fullword output variable (or register (2)-(12)

ASM only) into which the reason code is to be copied from, for instance, general purpose register (GPR) 0.

If the connected XES user is the first user to connect to the coupling facility structure specified by the structure name and this structure is not already allocated in a coupling facility, then the attributes specified on IXLCONN are used to allocate the structure in a coupling facility. The actual attributes of the allocated structure are returned on completion of the IXLCONN service. The new structure is allocated in an eligible coupling facility specified in the installation policy list which:

(a) has connectivity to the system trying to allocate the structure;

(b) meets the volatility requirement requested by the connector; and (c) has available space greater than or equal to the requested structure size or, if no facility in the policy list has free space greater than or equal to the requested structure size, the facility with the largest amount of free space is chosen.

On connects that occur when the structure has already been allocated as the result of some prior connection, the structure's attributes are not changed by any of the attributes on the IXLCONN request. The actual attributes of the structure that is allocated in the coupling facility are returned on completion of the IXLCONN service.

It is the responsibility of the connector to verify that the attributes of the structure, as indicated on return from the connect service, are acceptable. If the attributes are not acceptable, then the connector may decide to disconnect or cause other connections to disconnect so that a new structure can be allocated with acceptable attributes.

The attribute of persistence applies to both structures and connections to a structure. This attribute is specified at connect time. A persistent connection that has abnormally terminated is described as a failed-persistent connection.

Persistence for a connection means that the connection and the structure remain allocated if the connection terminates abnormally until all surviving connections have provided an event exit response (i.e., the structure remains actively being used) and until either:

1. The failed-persistent connection reconnects as the same connection;

2. A peer connection detects that all recovery operations have been completed on behalf of the failed-persistent connection and that the connection no longer needs to be persistent. XES is informed by an IXLEERSP service, described below, or by setting a return code in the event exit parameter list; or 3. The failed-persistent connection is explicitly deleted through use of an IXLFORCE service, described below.

The persistence attribute for a connection does not apply when the connection terminates normally through an IXLCONN disconnect service (IXLDISC), described below, requesting normal termination.

Persistence for a structure means that the structure remains allocated even after all connections to the structure have terminated (i.e., the structure is actively being used). The structure can be deleted by an IXLFORCE service, described below, only if there are no active or failed-persistent connections.

In order to determine the state of connections and structures, in one example, a query service referred to as IXCQUERY is used. One embodiment of IXCQUERY is described in MVS/ESA Application Development Reference: Services for Authorized Assembler Language Programs, IBM Publication No. GC28-1648-2, pp. 207–211; however, in accordance with the principles of the present invention, IXCQUERY has been modified, as described herein, in order to enable the retrieving of information for structures and users of structures. The query service is the interface to retrieve information regarding the coupling facility or coupling facility structure from the active policy. More detailed information on a specific coupling facility or structure may be obtained by specifying the name. If an optional name is not specified, then general information on all coupling facilities or coupling facility structures is returned.

For general information on all coupling facilities, the data includes the coupling facility name and the coupling facility world wide unique identifier.

For detailed information on a named coupling facility or all coupling facilities, data is returned for system connectivity to the coupling facility, and for coupling facility structures assigned resources in the coupling facility. System connectivity information is comprised of a system name. Information regarding the coupling facility resources allocated in the coupling facility is the structure name and allocation status.

For general information of all coupling facility structures, data includes the structure name, the size of the structure as specified in the active policy, and status of the structure. Status includes indications for allocation in a coupling facility.

For detailed information on a named structure or all structures, data is returned for coupling facility structure data, for the coupling facilities which may be used to contain the structure (preference list), for coupling facilities which do contain the structure (exclusion list), and for data on connectors to the coupling facility structure. The name of each coupling facility which is used to contain the structure is returned. Information regarding the coupling facility resources assigned in a coupling facility for the structure include the coupling facility name, structure version, and the structure allocation status. Data reflecting the users of a structure include, for each user, the job or started task name, the address space, the system name where the user is/was executing, the connection identification information (including name, data, and version) and connection state (active and failed-persistent).

The IXCQUERY service may also be used to determine which connections are in a failed-persistent state and their associated connect names.

Possible states for a connection to a structure include:

(a) Undefined—the connection does not exist;

(b) Active—the connection exists;

(c) Disconnecting or Failing—the connection has disconnected with REASON=NORMAL (disconnecting state), or has been abnormally terminated or disconnected with REASON=FAILURE (failing state); and all event exit responses have not been received for the failure of this connection. If IXLCONN is issued with the same connection name as the connection in the disconnecting or failing state, the connect request will fail. A connection in the disconnecting or failing state cannot be forced using the IXLFORCE programming interface.

When all event exit responses are received, the connection will be placed in an undefined state, if the connection disposition is delete or the connection disconnected with REASON=NORMAL. If the connection disposition is keep and the connector terminated abnormally or disconnected with REASON= FAILURE, then the connection state is dependent on the response specified by each peer connection. If any peer connection indicated that the connection could be released, then the connection will be placed in the undefined state. If all connections specified that the connection should not be released, then the connection will be placed in the failed-persistent state; and (d) Failed-Persistent—the connection has abnormally terminated or disconnected with REASON=FAILURE, and all event exit responses have been received. All event exit responses from peer connections indicated that the connection should not be released.

Reconnection to a structure is useful when a connection terminates abnormally and peer recovery is not possible. In this case, the failed connected XES user restarts and issues IXLCONN with the same connect name that was originally specified. If the connection is reconnected, IXLCONN will set a return and reason code, indicating that additional status information is available about the connection and/or structure. Returned information indicates whether the connection has been reconnected. If the connection was reconnected, the connected XES user may have additional clean-up or recovery to do depending on the application's recovery protocol.

On successful completion of the IXLCONN service routine, the requesting connected XES user is returned data which includes:

(a) A sysplex-wide unique connect token (CONTOKEN) that is used on subsequent requests for services from the connected XES user initiating the IXLCONN request.

(b) A connection identifier. Each connection, active or failed-persistent, is assigned a number unique within the scope of the structure. When a connection is in a failed-persistent state, the identifier will not be assigned to another connection. If a connection is reconnected, the identifier is equivalent to the previous instance of the connection. Some list and cache services return a connection identifier as an output.

(c) Attribute information for the coupling facility structure to which the connected XES user is connected. The connected XES user is responsible for verifying that the attributes of the coupling facility structure are acceptable. If the attributes are unacceptable, the user may release its connection by invoking the IXLDISC service.

(d) An indication of whether the connection is a new connection or whether a previous instance of the connection has been reconnected.

(e) A connection and structure version number. A structure version number is unique within the scope of the structure name. The structure version number changes (ascending) each time a new structure is allocated for the same structure name. A connect version number is unique within the scope of the structure name. The connect version number changes (ascends) for each new connection. For example, if a failed-persistent connection is reconnected, the new connection version number will be greater than the connection version number assigned to the previous instance of the connection.

(f) A vector token is only for connections to a list structure with list monitoring or a cache structure.

On successful completion of the IXLCONN service routine, the requesting connected XES user is connected to the requested coupling facility structure:

If the connected XES user is the first to allocate the coupling facility structure, it is connected to the coupling facility structure in the initialized state. A response indicates whether the connection allocated the coupling facility structure or not.

If the connected XES user is not the first to allocate the coupling facility structure (i.e., it is or was in use by other connections), the requesting connected XES user is connected to a coupling facility structure that may reflect requests previously issued by other connections.

May request all other supported XES functions that are valid for the type of structure to which the user is connected.

Is notified about all connections, active and failed persistent, through its event exit. All active connections are also notified of the new connection through their event exits. The new connection may receive events describing existing connections before the connect request completes. The set of existing connections presented to the new connection is a snap shot of all active and failed-persistent connections defined at the instant the new connection was assigned.

XES receives notification of events that affect both the availability and use of a coupling facility within the sysplex. The event exit may be driven before control has returned from the IXLCONN service. In general, changes in the status of the coupling facility are reported to each connector in the same sequence. For example, a connection will always see a new connection event before a connection disconnected or failed event.

In accordance with the principles of the present invention, the events which may be reported to a connection after connecting to a coupling facility structure include the following:

New Connection: This event is initiated by a successful connect to a coupling facility structure. For the new connection event, each active connected XES user connected to the same structure specified on the IXLCONN request is notified that a new connection to the coupling facility structure has been assigned. Information provided about the new connection includes the connection's connection name, connection identifier, and connection disposition.

Existing Connection: This event is initiated by a successful connect to a coupling facility structure. For the existing connection event, the new connected XES user receives notification of all other connections to the same coupling facility structure specified on its IXLCONN request. Each existing connection event describes one connection. Additional information provided along with this event describes the state (active or failed-persistent and disposition of the existing connection.

Disconnected or Failed Connection: This event is initiated when either:

a) A connected XES user disconnects from a coupling facility structure by invoking the IXLDISC service, or b) A connection's system terminates before the corresponding disconnect is issued: When the connection's system terminates, another system in the sysplex performs recovery processing for all connections owned by the failed system (or if no other systems were able to perform the cleanup, recovery processing would be done on a re-ipl). XES on the recovering system cleans up structure specific resources as appropriate. Peer connections are notified of the termination via the disconnected or failed connection event presented to their event exits. Once all peer connections have provided an event exit response for the failed connection, the connection will become failed-persistent, if the connection was defined requesting failed-persistence on abnormal termination. If the connection was defined, requesting deletion on abnormal termination, then the connection will become undefined. If there are no longer any defined connections, either active or failed-persistent, then the structure will be de-allocated, if it is not a persistent structure.

(c) A connection's address space terminates before the corresponding disconnect is issued: On address space termination, a subsystem/system component end-of-memory resource manager receives control prior to the XES resource manager. When the XES resource manager receives control, XES cleans up structure specific resources as appropriate. Peer connections are notified of the termination via the disconnected or failed connection event presented to their event exits. Once all peer connections have provided an event exit response for the failed connection, the connection will become failed-persistent, if the connection was defined requesting failed-persistence on abnormal termination. If the option at connect-time requested deletion on abnormal termination, the connection will become undefined. If there are no longer any defined connections, either active or failed-persistent, then the structure will be de-allocated, if it is not a persistent structure.

(d) Connection's Task Terminates: On task termination, a subsystem/system component end-of-task resource manager receives control prior to the XES resource manager. When the XES resource manager receives control, XES cleans up structure specific resources as appropriate. Peer connections are notified of the termination via the disconnected or failed connection event presented to their event exits. Once all peer connections have provided an event exit response for the failed connection, the connection will become failed-persistent, if the connection was defined requesting failed-persistence on abnormal termination. If the option at connect-time requested deletion on abnormal termination, the connection will become undefined. If there are no longer any defined connections, either active or failed persistent, then the structure will be deallocated, if it is not a persistent structure.

Each of the above disconnected or failed connection events is described in greater detail below. If modification of the coupling facility resources by, for example, a deallocate, allocate, detach or attach command is interrupted due to a predefined condition, such as losing connectivity of the operating system making the modifications or of all the operating systems, then the modifications need to be completed by a surviving system or the first system to re-connect. As described in detail and in accordance with the principles of the present invention, the modifications are made by using the recorded modifications in the checkpoint save area. Thus, the modifications are made transparent to the user and without operator or program intervention.

The IXLDISC service is the vehicle by which a connected XES user releases its access to XES services and the coupling facility structure. Upon return from XES, the requesting connected XES user is denied any further access to XES-supported functions. To re-establish access authorization, it is necessary for the connected XES user to issue an IXLCONN request. A connected XES user may request IXLDISC services either because it is terminating due to failure or because it no longer requires access to a coupling facility structure.

Figures 35, 35A:
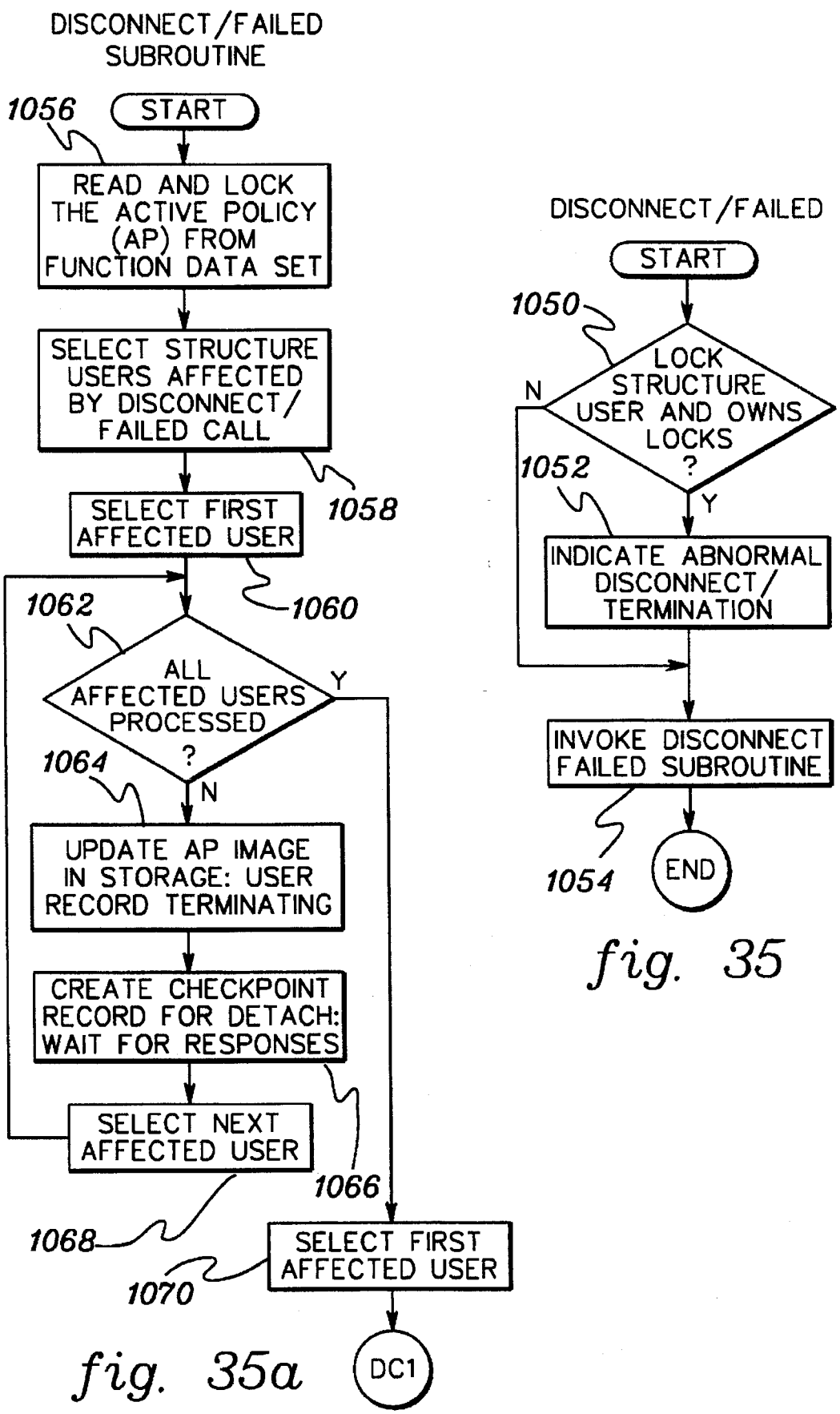
FIGS. 35, 35a–35d depict one embodiment of the logic associated with a disconnect/failed routine, in accordance with the principles of the present invention.
Figure 35B:
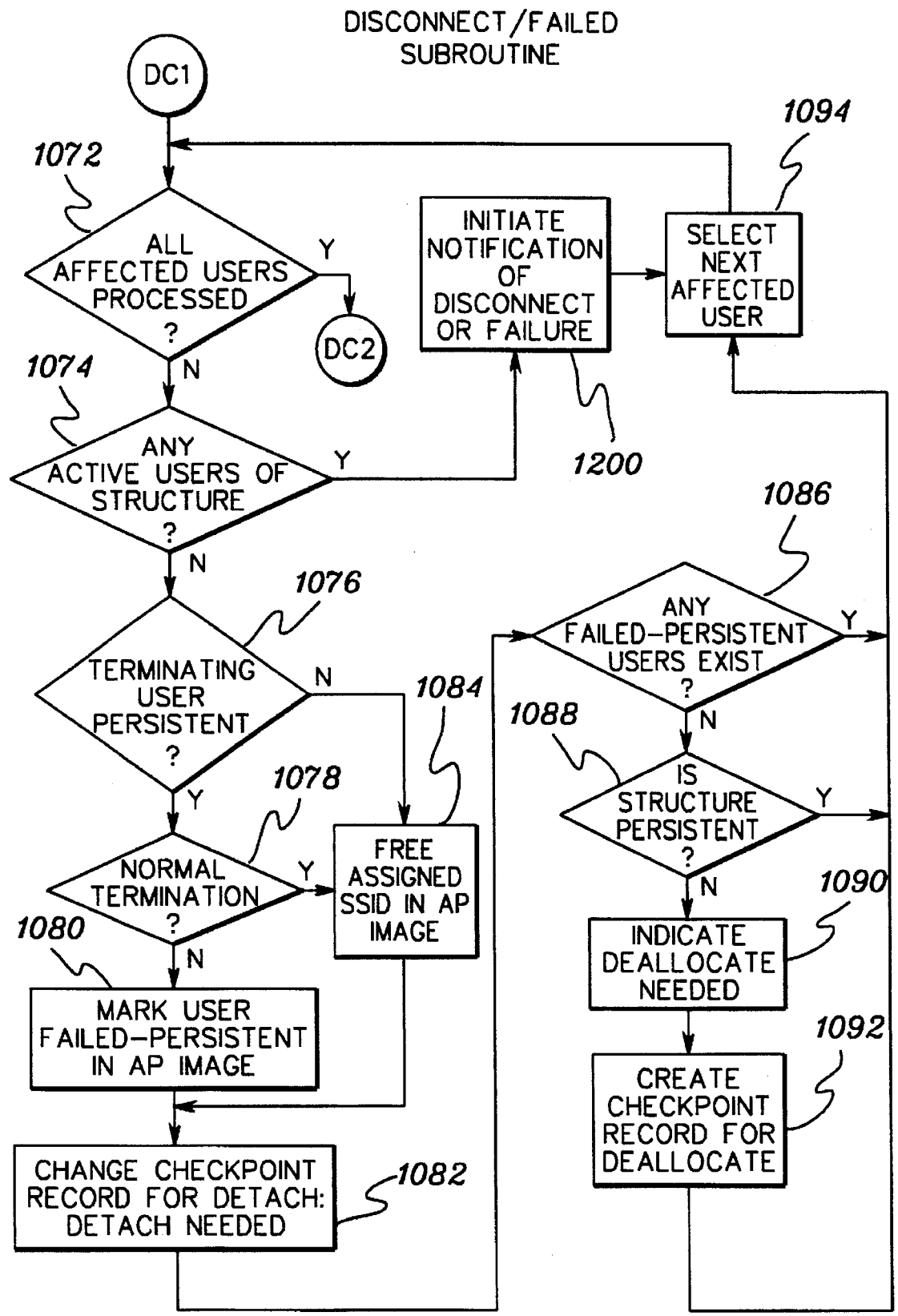
Figure 35C:
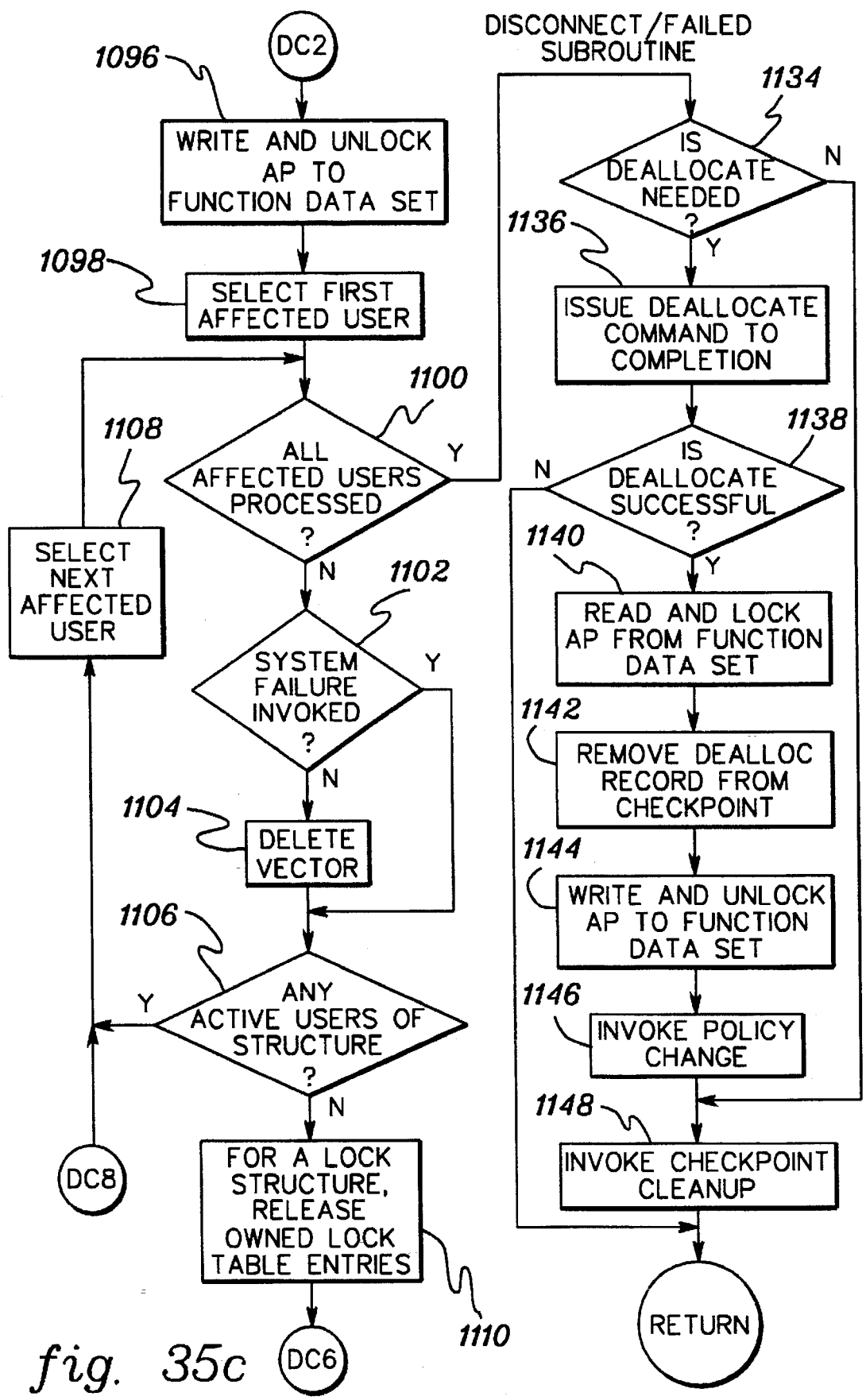
Figure 35D:
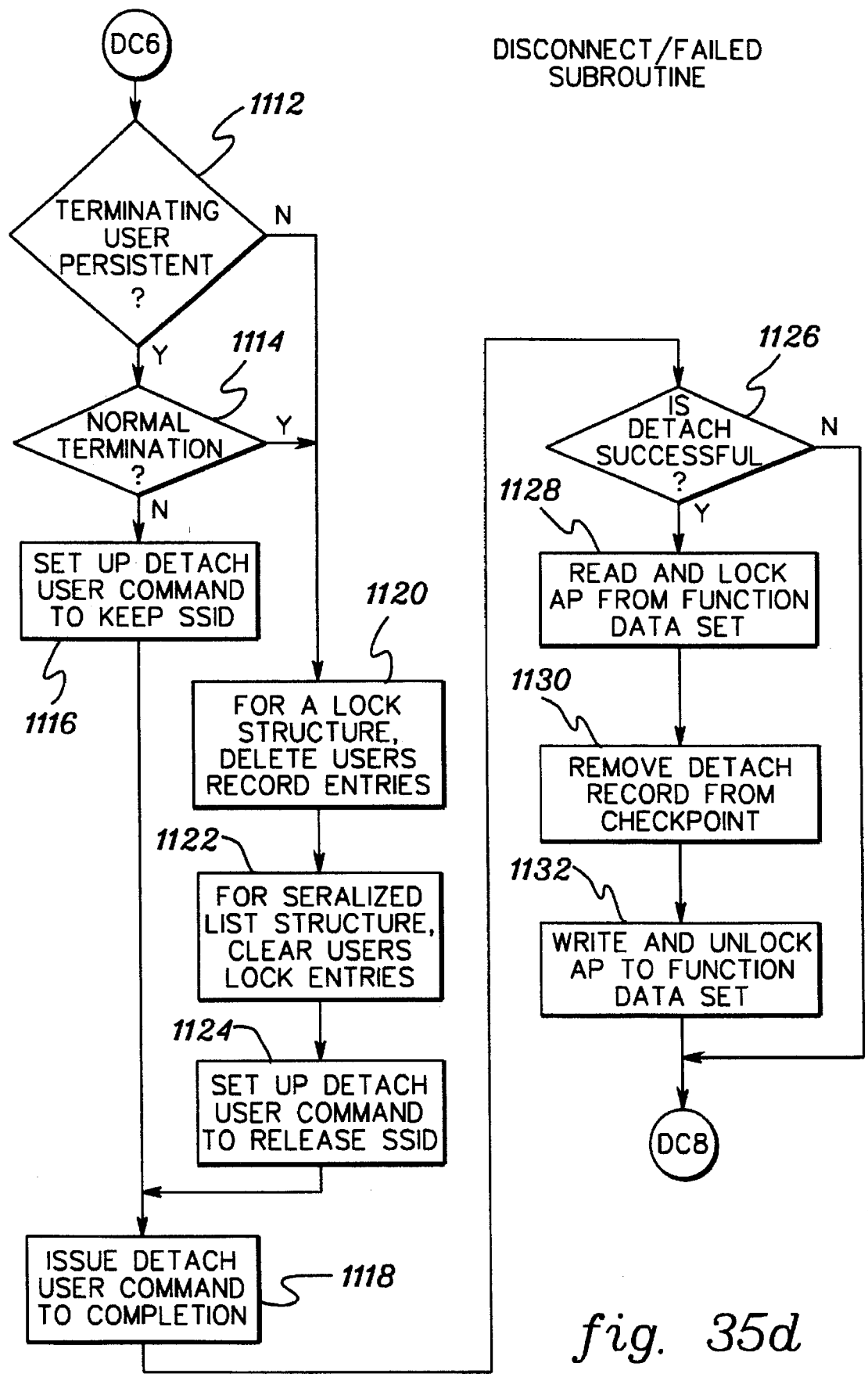

With reference to FIGS. 35–35d, the logic associated with the IXLDISC service is described. Initially, a determination is made as to whether the structure user is a lock user and whether the user owns any locks, INQUIRY 1050 "LOCK STRUCTURE USER AND OWNS LOCKS." Should the user be a lock structure user and the lock structure user owns locks, abnormal disconnect/termination is indicated, STEP 1052 "INDICATE ABNORMAL DISCONNECT/ TERMINATION." After such an indication or if it is not a lock structure user that owns locks, a disconnect failed subroutine is invoked, STEP 1054 "INVOKE DISCONNECT FAILED SUBROUTINE," as described in detail below.

During the disconnect/failed subroutine, the active policy is read from the function data set and the function data set is locked (using, for example, the procedure described in co-pending U.S. patent application Ser. No. 07/548,516 for "Shared Data Access Serialization Method and Apparatus" by Insalaco et al. (Attorney Docket No. PO9-88-007), filed on Jul. 2, 1990, which is incorporated herein by reference in its entirety), STEP 1056 "READ AND LOCK THE ACTIVE POLICY (AP) FROM FUNCTION DATA SET." The structure users affected by the disconnect/failed call are then selected, STEP 1058 "SELECT STRUCTURE USERS AFFECTED BY DISCONNECT/FAILED CALL." Further, the first affected user is selected, STEP 1060 "SELECT FIRST AFFECTED USER."

If all of the affected users have not been processed, INQUIRY 1062 "ALL AFFECTED USERS PROCESSED?", then the active policy image in virtual storage is updated to reflect the user record as terminating (disconnecting or failing), STEP 1064 "UPDATE AP IMAGE IN STORAGE USER RECORD TERMINATING." In addition, a checkpoint record for detach is created in the active policy image in storage as an element within the checkpoint save area, indicating a wait for responses, STEP 1066 "CREATE CHECKPOINT RECORD FOR DETACH: WAIT FOR RESPONSES." Thereafter, the next affected user is selected, STEP 1068 "SELECT NEXT AFFECTED USER." In particular, the affected users are: 1) if called by the disconnect service, selected user is the specified user; 2) if called by end of task, it is all connections owned by terminating task; 3) if called by end of memory, it is all connections owned by terminating memory; and 4) if called by system coupling facility cleanup, then all the connections on the failed system for a specified structure. Subsequently, processing passes to INQUIRY 1062 "ALL AFFECTED USERS PROCESSED?"

When all of the affected users have been processed, the first affected user is selected, STEP 1070 "SELECT FIRST AFFECTED USER." If all of the affected users have not been processed, INQUIRY 1072 "ALL AFFECTED USERS PROCESSED?", then a determination is made as to whether there are any active users of the structure, INQUIRY 1074 "ANY ACTIVE USERS OF STRUCTURE?" Should there be no active users of the structure, and the terminating user is persistent, INQUIRY 1076, and termination is not normal, INQUIRY 1078, the user record is marked in the image copy of the active policy as failed-persistent, STEP 1080 "MARK USER FAILED-PERSISTENT IN AP IMAGE."

Subsequently, the checkpoint record for detach is changed to indicate detach is needed, STEP 1082 "CHANGE CHECKPOINT RECORD FOR DETACH: DETACH NEEDED."

Should the terminating user not be persistent, INQUIRY 1076, or there is normal termination, INQUIRY 1078, then the assigned SSID in the active policy image is freed, STEP 1084 "FREE ASSIGNED SSID IN AP IMAGE." (As used herein, SSID refers to a subsystem ID, which is either an LCID for a cache structure or an UID for a list structure.) Thereafter, flow passes to STEP 1082 "CHANGE CHECKPOINT RECORD FOR DETACH: DETACH NEEDED," and processing continues as described herein.

Subsequent to changing the checkpoint record for detach, a determination is made as to whether any failed-persistent users exist, INQUIRY 1086 "ANY FAILED-PERSISTENT USERS EXIST?" If no failed-persistent users exist and if a structure is not persistent, INQUIRY 1088 "IS STRUCTURE PERSISTENT?", an indication is made that deallocation is needed, STEP 1090 "INDICATE DEALLOCATE NEEDED." Further, a checkpoint record is created indicating deallocate, STEP 1092 "CREATE CHECKPOINT RECORD FOR DEALLOCATE."

Once the checkpoint is created, or if any failed-persistent users exist, INQUIRY 1086, or if the structure is persistent, INQUIRY 1088, the next affected user is selected, STEP 1094 "SELECT NEXT AFFECTED USER." Thereafter, flow passes to INQUIRY 1072 "ALL AFFECTED USERS PROCESSED?" and processing continues, as described herein.

If all of the affected users are processed, INQUIRY 1072, then the information located in the virtual storage image of the active policy is written to the function data set and the function data set is unlocked, STEP 1096 "WRITE AND UNLOCK AP TO FUNCTION DATA SET."

Thereafter, the first affected user is selected, STEP 1098 "SELECT FIRST AFFECTED USER," and if all of the affected users have not been processed, INQUIRY 1100 "ALL AFFECTED USERS PROCESSED?", a check is made to determine if the disconnect/failed subroutine was invoked due to a system failure, INQUIRY 1102 "SYSTEM FAILURE INVOKED?" If not invoked by a system failure, then the vector, described above, is deleted, STEP 1104 "DELETE VECTOR."

Subsequent to deleting the vector, or if invoked by a system failure, a determination is made as to whether there exists any active users of the structure, INQUIRY 1106 "ANY ACTIVE USERS OF STRUCTURE?" Should there be active users of the structure, the next affected user is selected, STEP 1108 "SELECT NEXT AFFECTED USER" and flow passes to INQUIRY 1100 "ALL AFFECTED USERS PROCESSED?"

If there are no active users of the structure, INQUIRY 1106, owned lock table entries of a lock structure are released, STEP 1110 "FOR A LOCK STRUCTURE, RELEASE OWNED LOCK TABLE ENTRIES." Thereafter, if a persistent user is being terminated, INQUIRY 1112, and there is an abnormal termination, INQUIRY 1114, a detach user command is set up in order to keep the SSID, STEP 1116 "SET UP DETACH USER COMMAND TO KEEP SSID." Subsequent to setting up the detach user command, it is issued to completion, STEP 1118 "ISSUE DETACH USER COMMAND TO COMPLETION."

Returning to INQUIRY 1112 "TERMINATING USER PERSISTENT?", if a persistent user is not being terminated, or if a persistent user is terminating normally, the user record entries for a lock structure are deleted, STEP 1120, and user lock entries for a serialized list structure are cleared, STEP 1122. Thereafter, the detach user command is set up to release the SSID, STEP 1124 and the detach user command is processed to completion, STEP 1118.

Subsequent to processing the detach user command, a determination is made to see if the detach was successful, INQUIRY 1126 "IS DETACH SUCCESSFUL?" If the detach is successful, the active policy is read and locked from the function data set, STEP 1128 "READ AND LOCK AP FROM FUNCTION DATA SET." Thereafter, the detach record is removed from the checkpoint save area, STEP 1130, and the active policy is written to the function data set, which is unlocked, STEP 1132 "WRITE AND UNLOCK AP TO FUNCTION DATA SET." In addition, or if the detach is unsuccessful, flow passes to STEP 1108 (FIG. 35c) "SELECT NEXT AFFECTED USER" and processing continues, as described above.

Returning to INQUIRY 1100 "ALL AFFECTED USERS PROCESSED?", if all of the affected users are processed, then a check is made to see if deallocation is needed, INQUIRY 1134 "IS DEALLOCATE NEEDED?" If it is needed, the deallocate command is processed to completion, STEP 1136 "ISSUE DEALLOCATE COMMAND TO COMPLETION."

If the deallocate command processed unsuccessfully, INQUIRY 1138, processing of the disconnect/failed subroutine ends. On the other hand, should the deallocate command process successfully, INQUIRY 1138, the active policy is read and locked from the function data set, STEP 1140 "READ AND LOCK AP FROM FUNCTION DATA SET." In addition, the deallocate record is removed from the checkpoint save area, STEP 1142, and the active policy is written to the function data set and the function data set is unlocked, STEP 1144 "WRITE AND UNLOCK AP TO FUNCTION DATA SET."

Subsequently, a policy change routine is invoked, as described in detail above, STEP 1146 "INVOKE POLICY CHANGE." Thereafter, or if deallocate is not needed, INQUIRY 1134, the checkpoint cleanup routine, described above, is invoked, STEP 1148 "INVOKE CHECKPOINT CLEANUP." Thereafter, the disconnect/failed subroutine is complete.

Returning to FIG. 35b and, in particular, INQUIRY 1074 "ANY ACTIVE USERS OF STRUCTURE?" should there be active users of the structure, notification of disconnect or failure is initiated, STEP 1200 "INITIATE NOTIFICATION OF DISCONNECT OR FAILURE." In one embodiment, the logic associated with notification of a disconnect or failure is described in detail with reference to FIG. 36.

Figure 36:
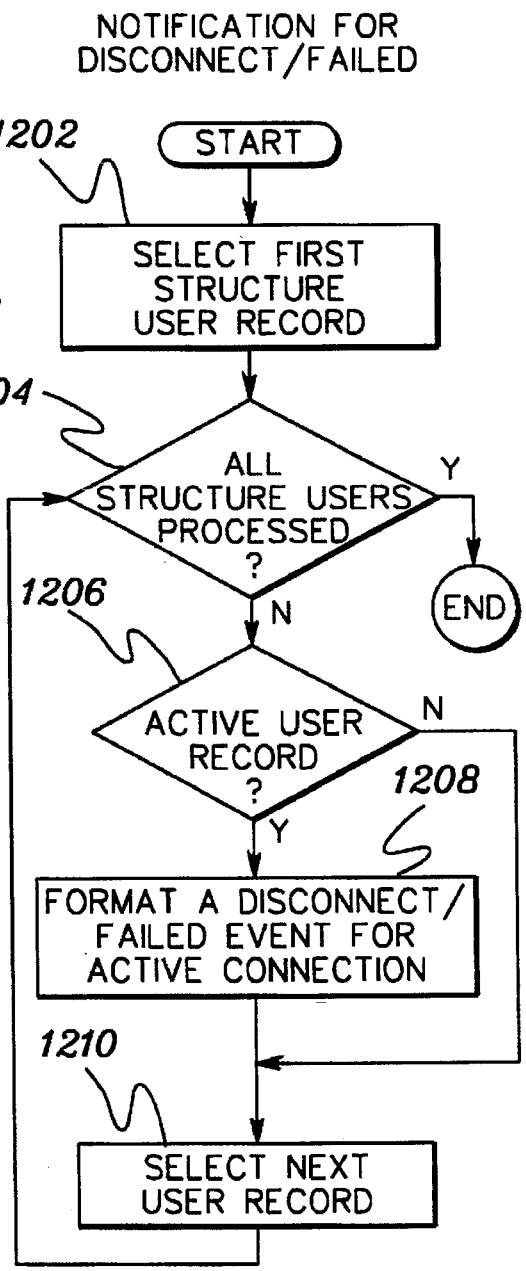
FIG. 36 depicts one embodiment of the logic associated with a notification for disconnect/ failed routine, in accordance with the principles of the present invention.

Referring to FIG. 36, the first structure user record is selected from the active policy, STEP 1202 "SELECT FIRST USER RECORD" and if all of the structure users have been processed, INQUIRY 1204 "ALL STRUCTURE USERS PROCESSED?", processing of the notification logic is complete. Otherwise, if all of the structure users have not been processed, and the selected structure user has an active user record, INQUIRY 1206 "ACTIVE USER RECORD?", a disconnect/failed event for active connection is formatted, STEP 1208. Subsequent to formatting the disconnect/failed event or if the selected structure user is not an active user, the next user record is selected, STEP 1210 "SELECT NEXT USER RECORD," and flow passes to INQUIRY 1204 "ALL STRUCTURE USERS PROCESSED?"

Returning to FIG. 35b and, in particular, STEP 1094 "SELECT NEXT AFFECTED USER," the next affected user is selected, STEP 1094 "SELECT NEXT AFFECTED USER" and processing passes to INQUIRY 1072 "ALL AFFECTED USERS PROCESSED?" Processing continues as described above.

One embodiment of the syntax associated with IXLDISC is described in detail below. The IXLDISC service routine is given control from the IXLDISC macro to disconnect a user from an XES structure.

The IXLDISC service only supports disconnection from a single structure per invocation. If a user wishes to disconnect multiple connections, it issues the IXLDISC macro once for each connection.

```
IXLDISC    CONTOKEN=xcontoken
           [,DISCDATA=xdiscdata|ALL_ZEROES]
           [,REASON={NORMAL|FAILURE}]
           [,RETCODE=xretcode]
           [,RSNCODE=xrsncode]
```

Where:

CONTOKEN(xcontoken) is the name (RS-type) (or address in register (2)-(12) ASM only) of a required 16 character input field that specifies the connect token returned to the invoking user in the answer area when it requested the IXLCONN service.

DISCDATA is the name (RS-type) (or address in register (2)-(12) ASM only) of an optional 8 character input that specifies connector data that will be provided to other connection's event exits, and can be used as the invoker wishes. DEFAULT: ALL_ZEROES.

[REASON({NORMAL|FAILURE})] is an optional keyword input which identifies the reason for disconnecting from a structure. The disconnect reason is presented to all surviving connected XES users in the event exit parameter list. The reason in conjunction with the connection disposition affects the state of the connection upon completion of the disconnect. DEFAULT: NORMAL NORMAL Normal termination. The connection disposition specified on IXLCONN does not apply. A disconnect specifying normal termination is considered a normal connection termination; therefore, the connection will not be persistent, even if persistence is specified to the IXLCONN service. The connection disposition attribute is applicable only in abnormal terminations such as a disconnect specifying failure, system failure, task termination (end of task), and address space (end of memory) termination.

There is one exception which causes the connection disposition to be applicable on a normal disconnect. The exception occurs when a connection disconnects for a lock structure while holding resources shared or exclusive. If the connection disposition was KEEP, the connection will be put into a failed-persistent state. If the lock structure contains a record substructure, then record list entries will remain associated with the failed connection until the failed-persistent connection is released.

If a connection to a lock structure, which owns locking resources, disconnects with REASON=NORMAL, then the disconnect requests will be treated as if the user had specified REASON=FAILURE.

FAILURE Termination due to a failure. The connection disposition specified on IXLCONN does apply. The connection will be placed in a failed-persistent state if the connection disposition is KEEP.

[RETCODE(xretcode)] is the name (RS-type) of an optional fullword output variable (or register (2)-(12) ASM only) into which the return code is to be copied from GPR 15.

[RSNCODE(xrsncode)] is the name (RS-type) of an optional fullword output variable (or register (2)-(12) ASM only) into which the reason code is to be copied from GPR 0.

When a connected XES user issues an IXLDISC request, the IXLDISC service is considered complete when all connections to the structure have acknowledged the disconnect request. Surviving connectors acknowledge a disconnect by responding to an event reported to their event exit, as described in detail below.

In addition to IXLDISC, an end of task service is available for initiating a disconnect/failed event. One embodiment of an end of task service is described in detail with reference to FIG. 37.

Figure 37:
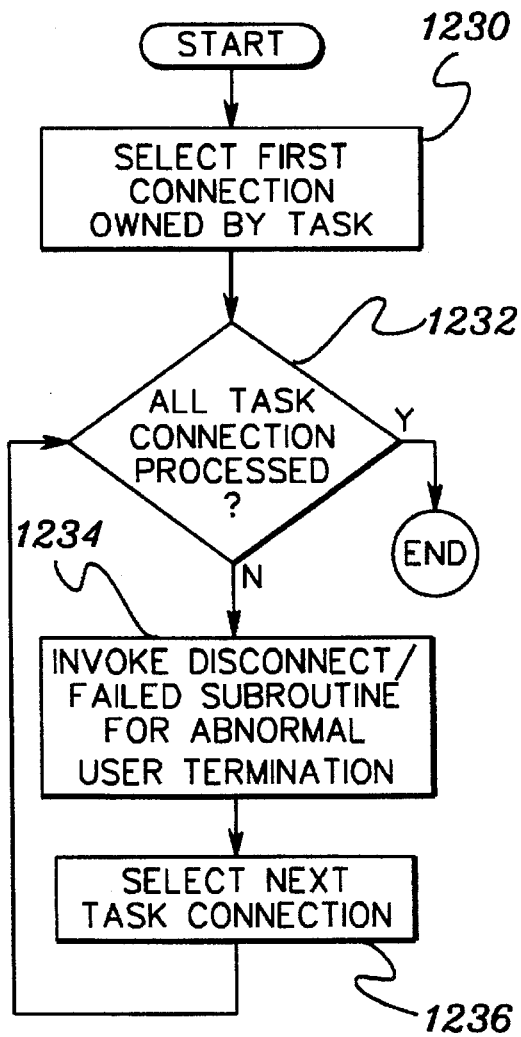
FIG. 37 depicts one embodiment of the logic associated with an end of task routine, in accordance with the principles of the present invention.

Referring to FIG. 37, the first connection owned by the ending task is selected, STEP 1230 "SELECT THE FIRST CONNECTION OWNED BY TASK." If all of the task connections are processed, INQUIRY 1232 "ALL TASK CONNECTIONS PROCESSED?", processing of the end of task service is complete. Otherwise, if there are task connections to be processed, the disconnect/failed subroutine for abnormal user termination, described above with reference to FIGS. 35–35d is invoked, STEP 1234. Subsequently, the next task connection is selected, STEP 1236 "SELECT NEXT TASK CONNECTION" and flow returns to INQUIRY 1232 "ALL TASK CONNECTIONS PROCESSED?"

Figure 38:
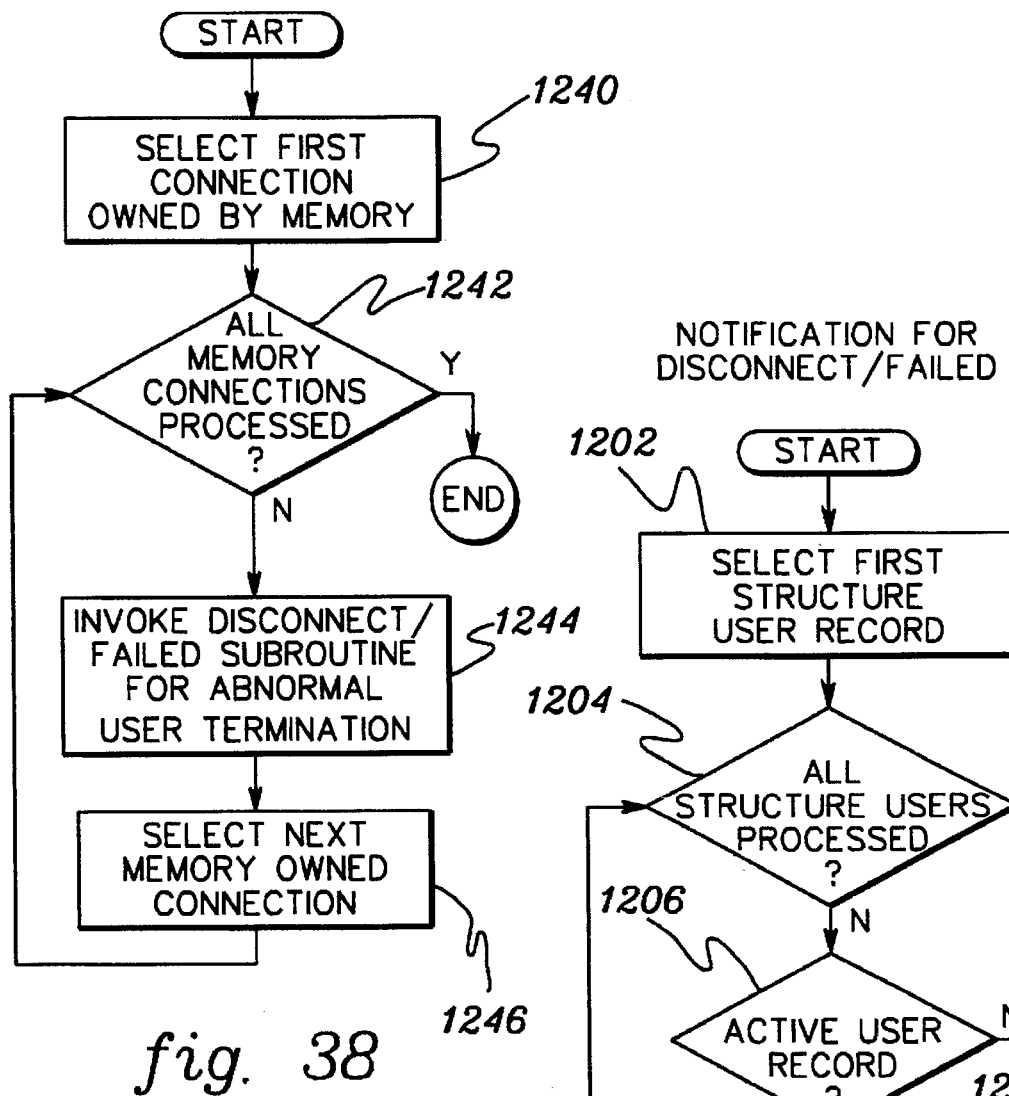
FIG. 38 depicts one embodiment of the logic associated with an end of memory routine, in accordance with the principles of the present invention.

In addition to the above, a disconnect/failed event may be initiated by an end of memory service, one example of which is described below with reference to FIG. 38.

The first connection owned by the memory is selected, STEP 1240 "SELECT THE FIRST CONNECTION OWNED BY MEMORY," and if all the memory connections are processed, INQUIRY 1242 "ALL MEMORY CONNECTIONS PROCESSED?", processing of the end of memory service is complete.

Should there be memory connections to be processed, INQUIRY 1242, the disconnect/failed subroutine for abnormal user termination, described above with reference to FIGS. 35a–35d is invoked, STEP 1244. Thereafter, the next memory owned connection is selected, STEP 1246, and processing flows to INQUIRY 1242 "ALL MEMORY CONNECTIONS PROCESSED?"

In addition to the IXLDISC, end of task and end of memory services described above, a disconnect or failed event may be initiated by a coupling facility cleanup service given control on detection of system termination by system monitor 126a, 126b (FIG. 14). One embodiment of the logic associated with coupling facility cleanup service is described in detail with reference to FIG. 39.

Figure 39:
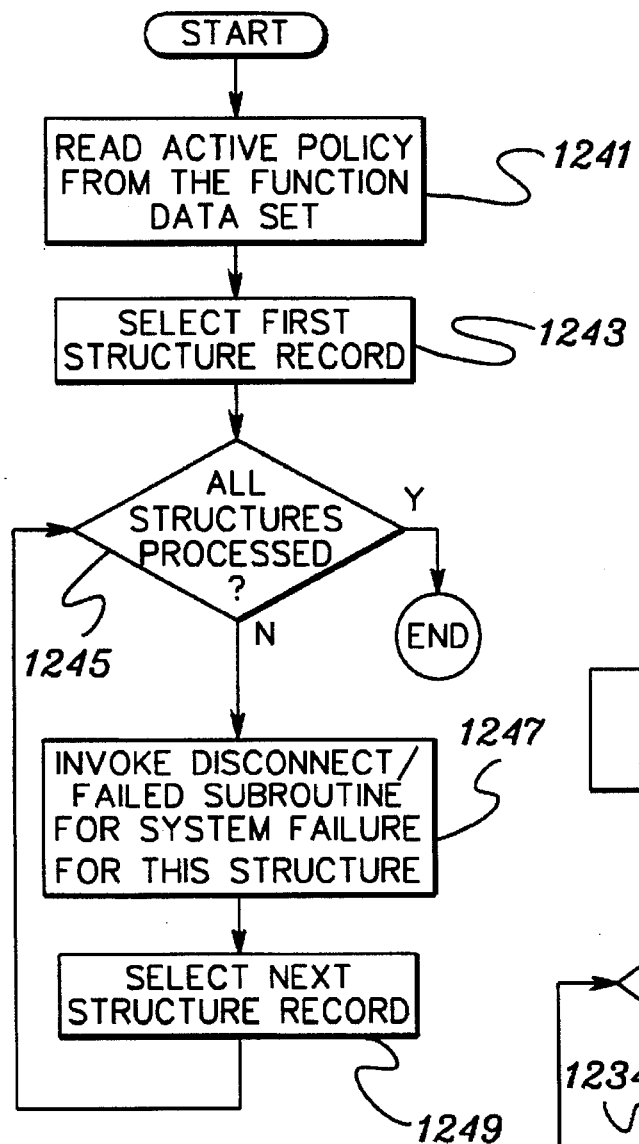
FIG. 39 illustrates one embodiment of the logic associated with a coupling facility cleanup routine, in accordance with the principles of the present invention.

Referring to FIG. 39, the active policy is read from the function data set, STEP 1241 "READ ACTIVE POLICY (AP) FROM FUNCTION DATA SET." From the active policy, the first structure record is selected, STEP 1243 "SELECT FIRST STRUCTURE RECORD." When all of the structures are processed, INQUIRY 1245 "ALL STRUCTURES PROCESSED?", the active policy is read and locked, the coupling facility record is updated to remove failed systems connectivity to coupling facilities and the active policy is written and unlocked. Thereafter, processing of the cleanup service is complete.

However, if there are structures to be processed, the disconnect/failed subroutine for system failure, described above with reference to FIGS. 35a–35d is invoked for this structure, STEP 1247. Thereafter, the next structure record is selected, STEP 1249 "SELECT NEXT STRUCTURE RECORD" and flow passes to INQUIRY 1245 "ALL STRUCTURES PROCESSED."

Described above are a number of events. A connector's event exit receives control whenever an event that affects the availability and use of the structure associated with the connector occurs. The event exit receives control with, for instance, an event exit parameter list (referred to as IXLYEEPL) that describes the event being reported. Upon return from the event exit, the event exit parameter list is no longer accessible to the connected XES user.

A connected XES user will receive events in the event exit in the sequence in which the events were reported. For example, a related connector will always receive an event indicating that a connection is active (new connection event for a given connection), before receiving a disconnected or failed connection event for that connection. In most cases, each connection to the structure will receive the events in the same sequence.

Several events reported to the event exit require the connected XES user to cooperate in the processing associated with the event. This may be accomplished by setting a return code in the event exit parameter list or by invoking a service, such as IXLEERSP.

When a connected XES user's event exit is notified of an event which requires an event exit response, the connected XES user that receives the event is expected to initiate processing as required. If there is no processing to do, or the processing may be done synchronously, in the event exit, then the connected XES user may respond to XES by setting a return code in the event exit parameter list upon completion of the processing. If the processing for the event will be done asynchronously, then the connected XES user must set a special return code in the event exit parameter list which indicates that the connected XES user is not providing a response in the exit parameter list. The connected XES user will invoke the IXLEERSP service later to give XES its response to the event. There is no required sequence between setting the special return code in the exit parameter list and issuing IXLEERSP.

Once a response is received from all connections to the structure about an event, XES will continue its processing for the event. Described below are the expected XES and connected XES user processing for each of the events that require a response.

The disconnected or failed connections event requires an event exit response from the connected XES user. An event exit response can optionally be provided for the existing connection event, when the subject of the event is a failed connection.

The disconnected or failed connection event is reported to all connections to the structure when a peer connection disconnects or abnormally terminates. The connection identified remains assigned to the disconnect/failed connection until all peer connections provide an event exit response. For a failed-persistent connection the type of response indicates whether the failed persistent connection can be released or not. If the connection was to a lock structure, then there may still be a record list allocated for the failed connection.

The event exit parameter list contains flags that indicate how the user terminated. This information will indicate to the connected XES user how much recovery processing must be done. The event exit parameter list (EEPL) indicates whether the connection disconnected or terminated abnormally. If the failed/disconnected connection was a locking user, the EEPL indicates whether the connection disconnected with locks held. The EEPL also indicates whether the terminating connection is persistent or not.

The connected XES user is expected to clean up all knowledge of the failed/disconnected connection, perform necessary recovery processing, and then respond to XES indicating that XES's recovery can proceed.

There are two types of responses the connected XES user can give: continue cleanup for the failed/disconnected connection or continue cleanup for the failed/disconnected connection and release the failed-persistent connection. The latter option only makes sense for connections with a disposition of KEEP given that a connection cannot get into the failed-persistent state unless a disposition of KEEP was specified to connect.

If the failed connection was associated with a lock structure, then the connected XES user is expected to do recovery processing, or necessary recording of lock information for all locks that were held by the failed connection before providing an event exit response to the disconnect or failed connection event. This sequence is essential since the locks will be released by XES when a response is received from all surviving connected XES users.

The record substructure can be used to keep a record of all locks held by a particular connected XES user and can be read by any connection to the structure. If the record substructure is used for this purpose, then recording must be requested on the IXLCONN service and the connection persistence attribute must be KEEP.

If the failed connection was persistent and/or a record substructure was allocated, one or all surviving connected XES users may request that the record list and failed-persistent connection be released through the IXLEERSP service, or setting a return code in the EEPL when notified of the disconnect or failed connection event.

If the failed connection was associated with a serialized list structure, then the connected XES user is expected to do recovery processing for all locks that were held by the failing connection for normal termination or for a non-persistent user before providing an event exit response to the disconnect or failed connection event. This sequence is essential since the locks for a user which is not persistent will be released by XES when a response is received from all surviving connected XES users.

Processing by XES when all responses are received includes:

Connection to a Serialized List

For connections to a serialized list, lock entries are cleared if owned by the failed connection if the connection disposition was not KEEP or the termination was initiated with REASON=NORMAL.

Requests pending because of a lock held by the failed connection are redriven. The redriven requests race in order to obtain the lock associated with the request, and a new list of waiting requests is built for the requests that lose the race. Requests for locks held by a failed-persistent user will be rejected.

Connection to a Lock structure

Upon receiving an event exit response from all connections to the structure for the disconnected or failed connection event, XES will initiate recovery processing for the connected XES user failure. XES will perform the following processing:

management responsibilities of resources managed by the connected XES user that has failed are assigned by XES to surviving connected XES users;

resource requests managed by surviving connected XES users on behalf of the failed connection are discarded;

if the terminating connection's disposition is DELETE or the event exit response was "release the persistent connection" then, the record list, if any, associated with the connected XES user that has failed, is reclaimed by XES. If the terminating connection's disposition is KEEP and the event exit response did not indicate "release the persistent connection", then the record list is unchanged and can continue to be accessed by any surviving connected XES user.

When a new connection learns that there are failed-persistent connections to the structure, the new connection has the option of verifying that all recovery processing for the failed connection is complete and releasing the failed-persistent connection by either setting a return code in the event exit parameter list or invoking the IXLEERSP service. XES will release the failed-persistent connection when any connection provides this response. If the failed-persistent connection is connected to a lock structure with a record substructure, the record list will be released. If the failed-persistent connection is connected to a serialized list, locks owned by the failed-persistent connection will be cleared.

Figure 40A:
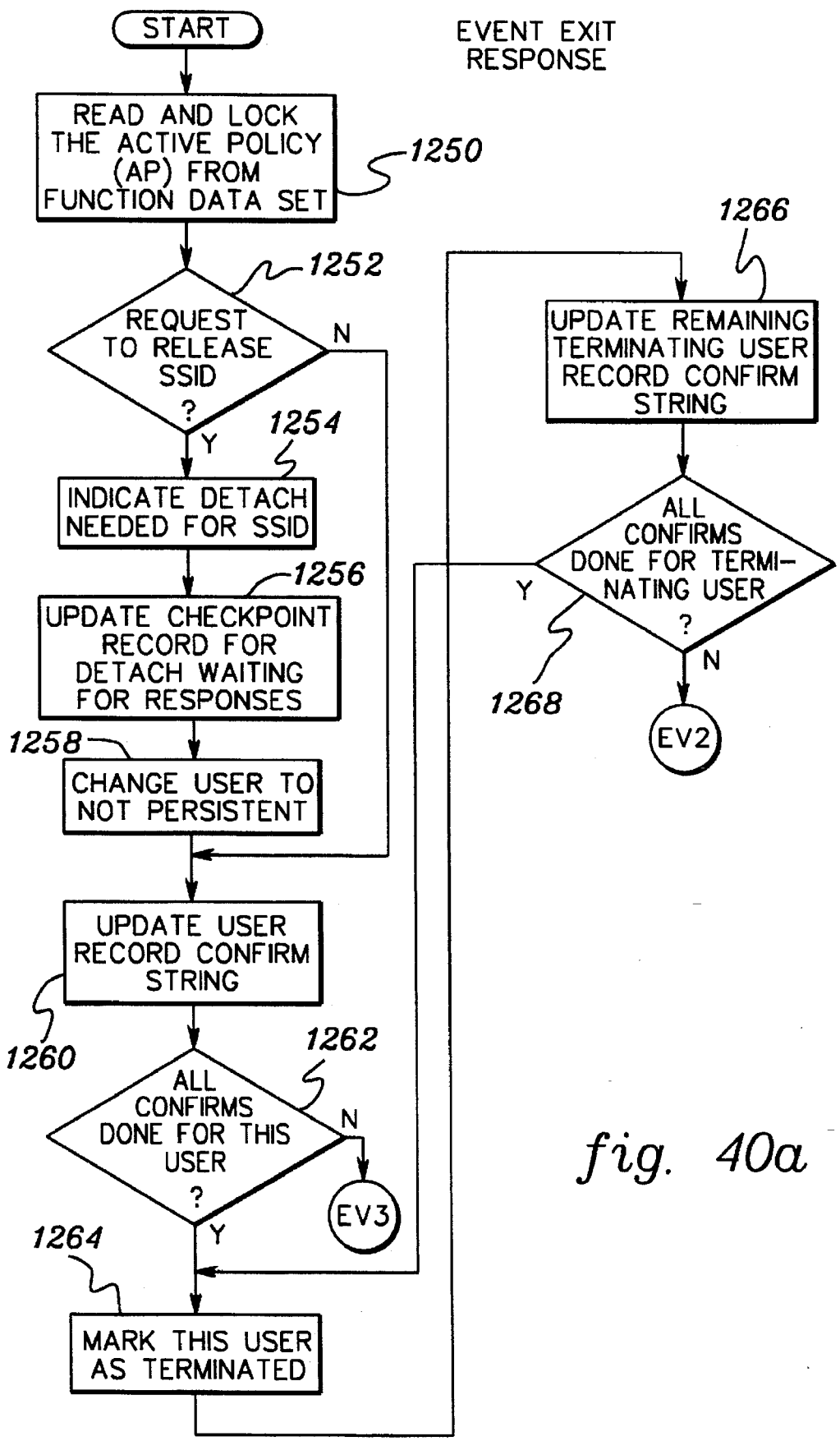
FIGS. 40a–40d depict one embodiment of the logic associated with an event exit response routine, in accordance with the principles of the present invention.
Figure 40B:
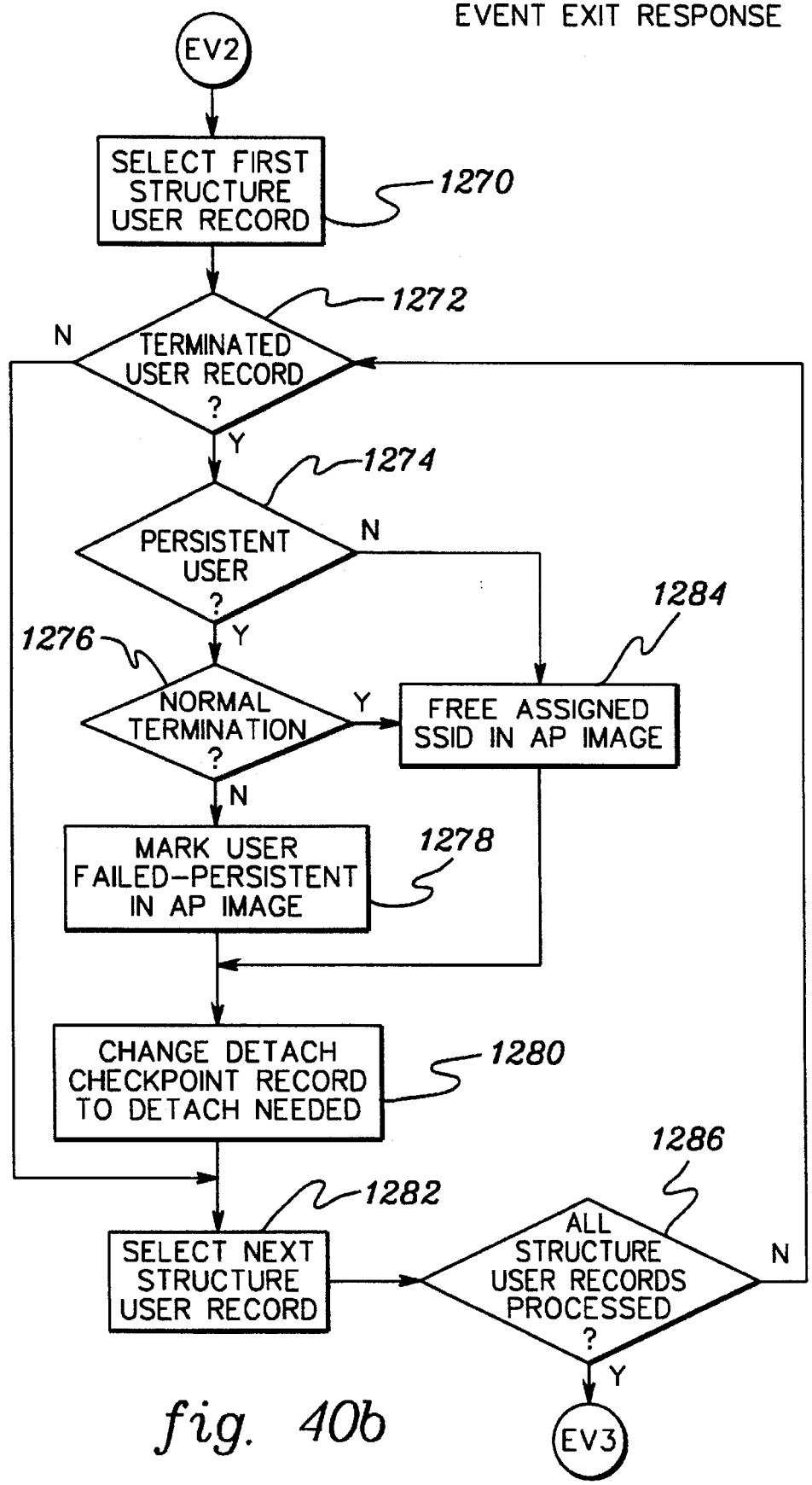
Figure 40C:
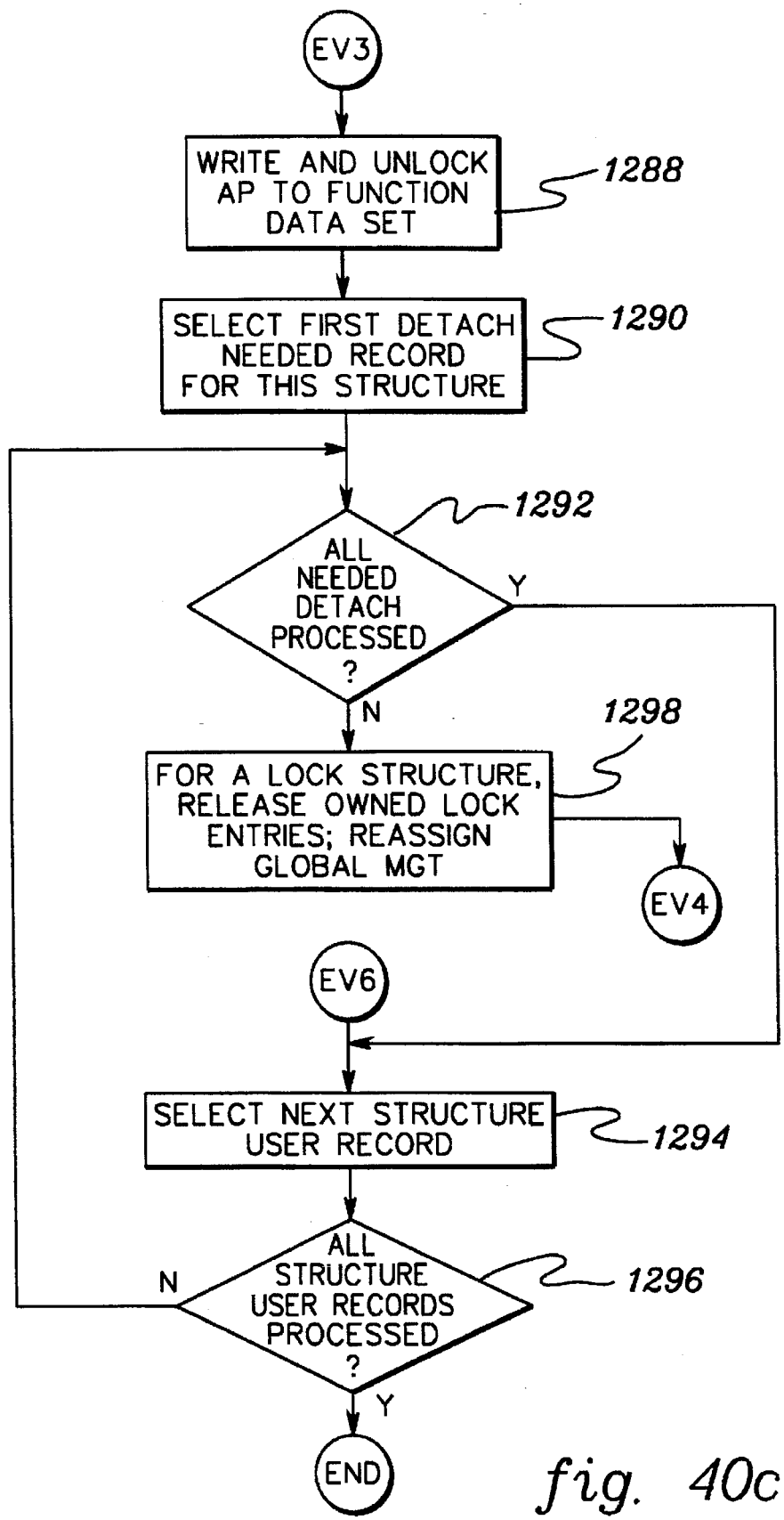
Figure 40D:
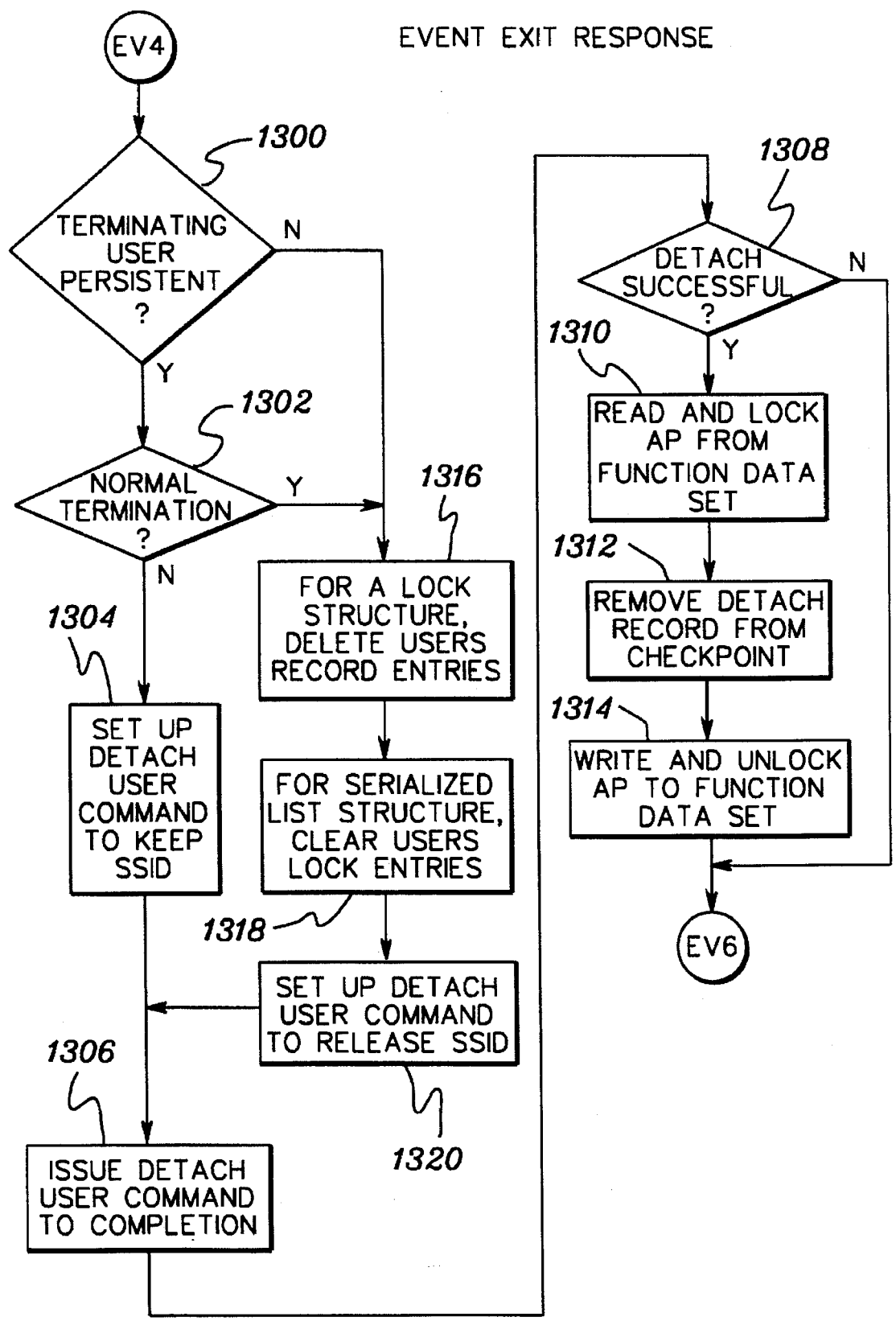

One embodiment of the logic associated with an event exit response, such as the IXLEERSP service, is described in detail with reference to FIGS. 40a–40d. Referring to FIG. 40a, the active policy is read and the function data set is locked, STEP 1250 "READ AND LOCK THE ACTIVE POLICY (AP) FROM THE FUNCTION DATA SET." Thereafter, a determination is made as to whether there is a request to release the LCID for a cache or UID for a list, INQUIRY 1252 "REQUEST TO RELEASE SSID?" (SSID is used herein as a subsystem ID, which is either an LCID or UID.) In particular, RELEASECONN on IXLEERSP will indicate this. Should there be such a request, detach is indicated for the SSID, STEP 1254 "INDICATE DETACH NEEDED FOR SSID."

After the indication of detach is made, a checkpoint record for detach, indicating waiting for responses, is updated, STEP 1256, and the user identification is changed to not persistent, STEP 1258 "CHANGE USER TO NOT PERSISTENT." Subsequent to changing the user ID or if there is no request to release the SSID, the user record confirm string in the active policy is updated, STEP 1260 "UPDATE USER RECORD CONFIRM STRING."

Thereafter, if all the confirms are done for this user, INQUIRY 1262 "ALL CONFIRMS DONE FOR THIS USER?", the user is marked as terminated in the user record of the active policy, STEP 1264, the remaining terminating user record confirm string is updated, STEP 1266, and once again, a determination is made as to whether all the confirms are done for the terminating user, INQUIRY 1268 "ALL CONFIRMS DONE FOR TERMINATING USER?"

If all the confirms are done, flow passes to STEP 1264 "MARK THIS USER AS TERMINATED," and processing continues, as described herein. However, if all the confirms are not done, the first structure user record is selected, STEP 1270 "SELECT FIRST STRUCTURE USER RECORD." Should the user record be terminated, INQUIRY 1272 "TERMINATED USER RECORD?", the user be persistent, INQUIRY 1274, and abnormal termination occur, INQUIRY 1276, the user is marked as failed-persistent in the active policy image in virtual storage, STEP 1278 "MARK USER FAILED-PERSISTENT IN AP IMAGE."

Subsequent to marking the user, the checkpoint record is changed, specifying that detach is needed, STEP 1280 "CHANGE DETACH CHECKPOINT RECORD TO DETACH NEEDED." Thereafter, or if the user record is not terminated, the next structure user record is selected, STEP 1282 "SELECT NEXT STRUCTURE USER RECORD."

Returning to INQUIRY 1274, if the user is not persistent or termination is normal (INQUIRY 1276), the assigned SSID in the active policy image in virtual storage is freed, STEP 1284 "FREE ASSIGNED SSID IN AP IMAGE," and flow passes to STEP 1280.

After selecting the next structure user record, STEP 1282, if all of the structure user records have not been processed, INQUIRY 1286, flow passes to INQUIRY 1272 and processing continues, as described above. However, when all of the structure user records have been processed, the active policy is written to the function data set, which is unlocked, STEP 1288 "WRITE AND UNLOCK AP TO FUNCTION DATA SET."

Subsequently, the first user for which detach is needed is selected, STEP 1290, and a determination is made as to whether all of the needed detached records are processed, INQUIRY 1292 "ALL NEEDED DETACH PROCESSED?" If all of the detached records are processed, the next structure user record is selected, STEP 1294 "SELECT NEXT STRUCTURE USER RECORD" and if all of the structure user records are not processed, INQUIRY 1296 "ALL STRUCTURE USER RECORDS PROCESSED?", flow returns to INQUIRY 1292 "ALL NEEDED DETACH PROCESSED?"

However, if all of the user structure records are processed, INQUIRY 1296, processing of the event exit response is complete.

Returning to INQUIRY 1292, if all of the needed detached records are not processed, the owned lock entries for a lock structure are released and global management is reassigned, STEP 1298. Thereafter, a determination is made as to whether the termination is of a persistent user, INQUIRY 1300 "TERMINATING USER PERSISTENT?" If it is a persistent user, and it is abnormal completion, INQUIRY 1302 "NORMAL COMPLETION?", the detach user command is set up to keep the SSID, STEP 1304 "SET UP DETACH USER COMMAND TO KEEP SSID." Further, the detach user command is processed to completion, STEP 1306 "ISSUE DETACH USER COMMAND TO COMPLETION."

If the detach was unsuccessful, flow returns to STEP 1294 (FIG. 40c) "SELECT NEXT STRUCTURE USER RECORD," and processing continues, as described above. However, if processing is successful, the active policy is read from the function data set and the function data set is locked, STEP 1310. Thereafter, the detach record is removed from the checkpoint save area, STEP 1312, and the active policy is written to the function data set, which is unlocked, STEP 1314. Processing then continues with STEP 1294 "SELECT NEXT STRUCTURE USER RECORD."

Returning to INQUIRY 1300 (FIG. 40d), if the termination is not of a persistent user, or there is normal termination, INQUIRY 1302, the users record entries are deleted for a lock structure, STEP 1316, the user's lock entries are cleared for a serialized list structure, STEP 1318, and the detach user command is set up to release the SSID, STEP 1320. Thereafter, flow passes to STEP 1306 "ISSUE DETACH USER COMMAND TO COMPLETION" and processing continues, as described above.

Returning to INQUIRY 1262 (FIG. 40a) "ALL CONFIRMS DONE FOR THIS USER?", if all of the confirms are not done, flow passes to STEP 1288 "WRITE AND UNLOCK AP TO FUNCTION DATA SET", as described above.

One embodiment of the syntax associated with an event exit interface, and in particular, IXLEERSP, is described in detail below.

```
IXLEERSP    EVENT=DISCFAILCONN
               ,SUBJCONTOKEN=xsubjcontoken
               ,EVENTSEQ#=xeventseq#
               ,RELEASECONN={NO|YES}
            ,EVENT=EXISTINGCONN
               ,SUBJCONTOKEN=xsubjcontoken
            ,CONTOKEN=xcontoken
            [,RETCODE=xretcode]
            [,RSNCODE=xrsncode]
```

Where:
EVENT({DISCFAILCONN|EXISTINGCONN}) is a required keyword input which identifies the event the connector's response is for:
EVENT(DISCFAILCONN)

Disconnected or Failed Connection event (EEPLDISFAILCONNECTION)

SUBJCONTOKEN(xsubjcontoken) is the name (RS-type) (or address in register (2)-(12) ASM only) of a required 16 character input field that specifies the connect token the response is for. The connect token specified should be the value presented to this connection in the event exit parameter list (EEPL, field EEPLSUBJCONTOKEN).

EVENTSEQ#(xeventseq#) is the name (RS-type) (or address in register (2)-(12) ASM only) of a required fullword input field that specifies the subject event sequence number. The event sequence number specified should be the value presented to this connection in the event exit parameter list (EEPL, field EEPLEVENTSEQ#)

RELEASECONN({NO|YES}) is a required keyword input which indicates whether the connection should remain persistent or be released.

NO specifies XES should continue processing for the failed connection. The connector issuing IXLEERSP has completed all processing for the failed connection. This persistence attribute of the connection is not affected by this response.

YES specifies XES should continue processing for the failed connection and indicates that this connection is no longer required to be persistent. The connector issuing IXLEERSP has completed all processing for the failed connection.

EVENT(EXISTINGCONN) Existing failed-persistent connection event (EEPLEXISTINGCONNECTION) This response indicates that a failed-persistent connection no longer needs to be persistent, i.e. can be released.

SUBJCONTOKEN(xsubjcontoken) is the name (RS-type) (or address in register (2)-(12) ASM only) of a required 16 character input field that specifies the connect token the response is for. The connect token specified should be the value presented to this connection in the event exit parameter list (EEPL, field EEPLSUBJCONTOKEN).

CONTOKEN(xcontoken) is the name (RS-type) (or address in register (2)-(12) ASM only) of a required 16 character field that specifies the connect token of the responding connection.

[RETCODE(xretcode)] is the name (RS-type) of an optional fullword output variable (or address in register (2)-(12) ASM only) into which the return code is to be copied from GPR 15.

[RSNCODE(xrsncode)] is the name (RS-type) of an optional fullword output variable (or address in register (2)-(12) ASM only) into which the reason code is to be copied from GPR 0.

In accordance with the principles of the present invention, the coupling facility resource manager maintains a permanent recording of status for a persistent user or structure. When a persistent user or structure is to be deleted, an IXLFORCE service may be used, as described in detail below, to cause re-use of coupling facility resources.

One embodiment of the logic associated with a force deletion service, such as IXLFORCE, is described in detail with reference to FIGS. 41a–41b.

Figure 41A:
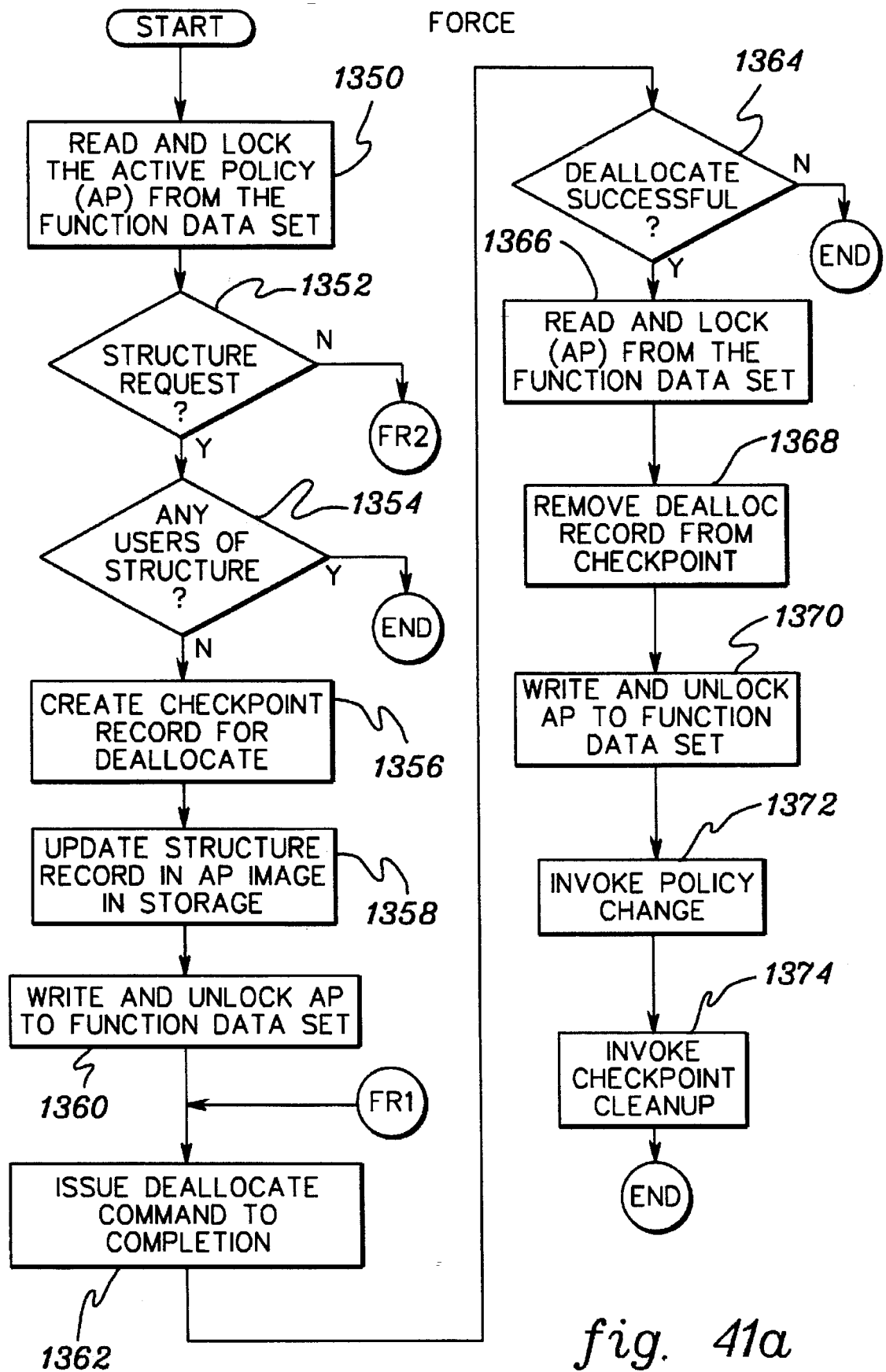
FIGS. 41a–41b depict one embodiment of the logic associated with a force service, in accordance with the principles of the present invention.
Figure 41B:
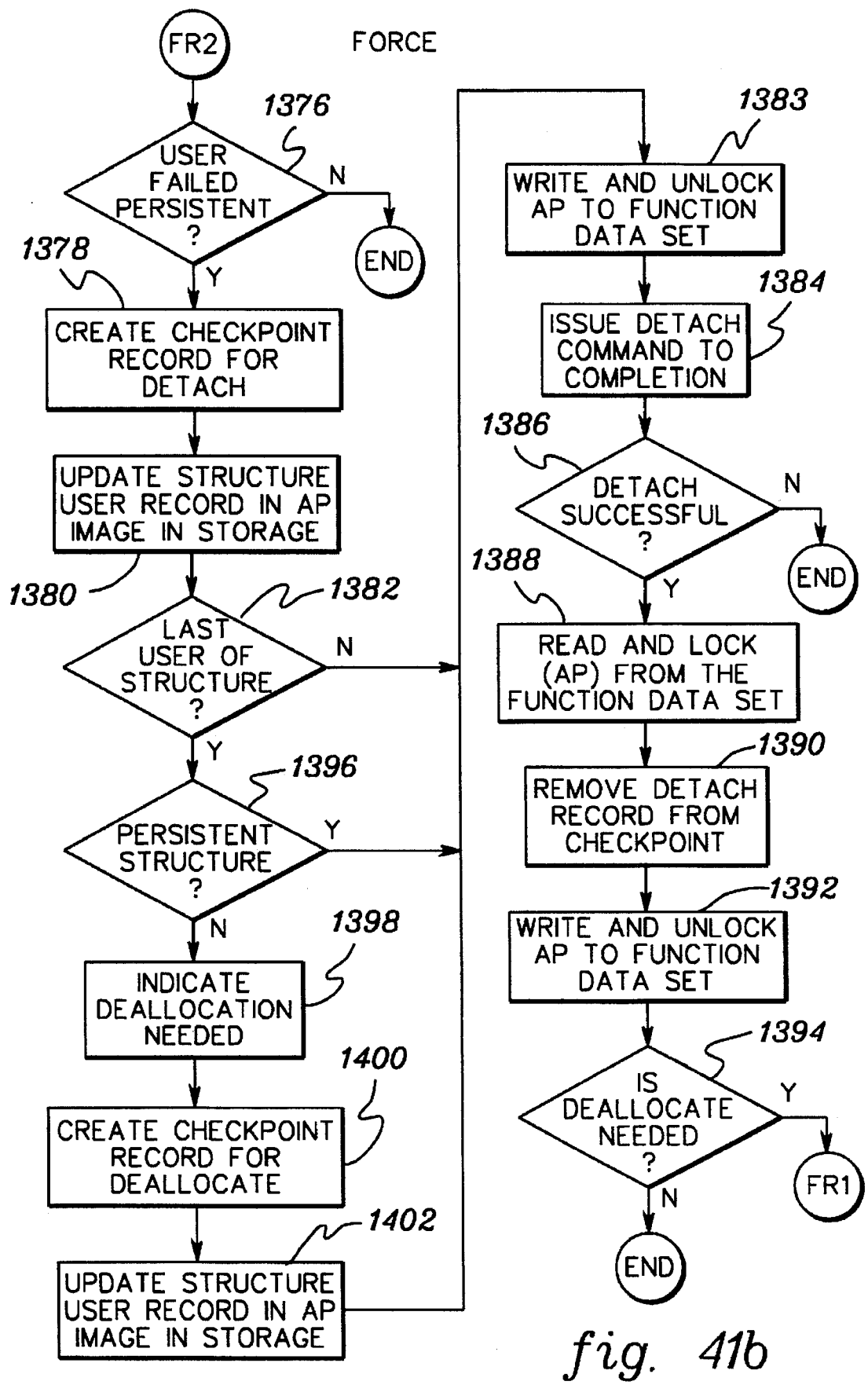

Referring to FIG. 41a, the active policy is read from the function data set and the function data set is locked, STEP 1350 "READ AND LOCK THE ACTIVE POLICY (AP) FROM THE FUNCTION DATA SET." When a structure request is made, INQUIRY 1352 "STRUCTURE REQUEST?", a determination is made as to whether any users of the structure exist, INQUIRY 1354 "ANY USERS OF THE STRUCTURE?" Should there be users of the structure, the force command completes.

Otherwise, if there are no users of the structure, a checkpoint record indicating deallocate is created, STEP 1356, the structure record in the virtual storage image of the active policy is updated, STEP 1358 "UPDATE STRUCTURE RECORD IN AP IMAGE IN STORAGE", and then, the active policy is written from storage to the function data set and the function data set is unlocked, STEP 1360 "WRITE AND UNLOCK AP TO FUNCTION DATA SET." Thereafter, the deallocate command is issued to completion, STEP 1362 "ISSUE DEALLOCATE COMMAND TO COMPLETION."

Should deallocate be unsuccessful, INQUIRY 1364, processing of the force command completes. Otherwise, the active policy is read from the function data set and the function data set is locked, STEP 1366. Thereafter, the deallocate record is removed from the checkpoint save area, STEP 1368, and the active policy is written to the function data set, which is unlocked, STEP 1370.

Subsequently, the policy change subroutine and checkpoint cleanup process are executed, STEPS 1372, 1374. After the checkpoint cleanup subroutine completes, the force service is also complete.

Returning to INQUIRY 1352 "STRUCTURE REQUEST?", if there is not a structure request, and the specified user is not failed-persistent, INQUIRY 1376 (FIG. 41b) "USER FAILED PERSISTENT?", processing ends.

If the user is failed-persistent, a checkpoint record indicating detach is created, STEP 1378, and the structure user record in the active policy image in virtual storage is updated to indicate the user does not exist any more, STEP 1380. When it is not the last user of a structure, INQUIRY 1382 "LAST USER OF STRUCTURE?", the active policy image is written to the function data set and the function data set is unlocked, STEP 1383 "WRITE AND UNLOCK AP TO FUNCTION DATA SET." Subsequently, the detach command is issued to completion, STEP 1384 "ISSUE DETACH COMMAND TO COMPLETION."

Should the detach be unsuccessful, INQUIRY 1386, processing of the force command ends. Otherwise, the active policy is read from the function data set and the function data set is locked, STEP 1388. In addition, the detach record is removed from the checkpoint save area, STEP 1390, and the active policy is written to the function data set, which is unlocked, STEP 1392.

Returning to INQUIRY 1382 "LAST USER OF STRUCTURE, when it is the last user of the structure and it is a persistent structure, INQUIRY 1396 "PERSISTENT STRUCTURE", processing continues with STEP 1383 "WRITE AND UNLOCK AP TO FUNCTION DATA SET." However, when it is the last user of a structure and the structure is not persistent, deallocation is indicated, STEP 1398 "INDICATE DEALLOC NEEDED," and a checkpoint record indicating deallocate is created, STEP 1400. Thereafter, the structure record in the active policy image is updated, STEP 1402, and flow continues with STEP 1383 "WRITE AND UNLOCK AP TO FUNCTION DATA SET", as described above.

Returning to STEP 1392, if no deallocation is needed, INQUIRY 1394 "IS DEALLOCATE NEEDED?", processing of the force service ends. If deallocation is needed, the deallocation command is processed to completion, STEP 1362 (FIG. 41a) "ISSUE DEALLOC COMMAND TO COMPLETION," and processing continues, as described above.

One embodiment of the syntax associated with IXL-FORCE is described in detail below.

```
IXLFORCE    REQUEST=STRUCTURE
            ,STRNAME=xstrname
            ,REQUEST=CONNECTION
            ,STRNAME=xstrname
            ,CONNAME=xconname
            ,REQUEST=ALLCONNS
            ,STRNAME=xstrname
            [,RETCODE=xretcode]
            [,RSNCODE=xrsncode]
```

Where:
REQUEST ({STRUCTURE|CONNECTION|ALLCONNS}) is a required keyword input which identifies whether a structure, failed persistent connection to a structure, all failed persistent connectors to a structure is to be deleted.

REQUEST(STRUCTURE) A structure is to be deleted. A structure can be deleted only when there are no active nor failed-persistent connections to the structure. IXCQUERY can be used to determine the state of connections to a structure. Note that forcing the deletion of the structure without understanding the usage of the structure may cause loss of data.

STRNAME(xstrname) is the name (RS-type) (or address in register (2)-(12) ASM only) of a required 16 character input that specifies the name of the structure to be deleted.

REQUEST(CONNECTION) A failed-persistent connection to a structure is to be deleted. If the last connection to a non-persistent structure is deleted, the structure will also be deleted. Note that forcing the deletion of a connection without understanding the usage of the structure may cause loss of data.

STRNAME(xstrname) is the name (RS-type) (or address in register (2)-(12) ASM only) of a required 16 character input that specifies the name of the connection to be deleted.

CONNAME(xconname) is the name (RS-type) (or address in register (2)-(12) ASM only) of a required 16 character input that specifies the CONNAME of the connection to be deleted. The connection is connected to the structure specified by STRNAME.

REQUEST(ALLCONNS) All failed-persistent connections to a structure are to be deleted. If the last connection to a non-persistent structure is deleted, the structure will also be deleted. Note that forcing the deletion of a connection without understanding the usage of the structure may cause loss of data.

STRNAME(xstrname) is the name (RS-type) (or address in register (2)-(12) ASM only) of a required 16 character input that specifies the name of the connection to be deleted.

[RETCODE(xretcode)] is the name (RS-type) of an optional fullword output variable (or address in register (2)-(12) ASM only) into which the return code is to be copied from GPR 15.

[RSNCODE(xrsncode)] is the name (RS-type) of an optional fullword output variable (or address in register (2)-(12) ASM only) into which the reason code is to be copied from GPR 0.

The present invention provides a mechanism for coupling systems together through a coupling facility, such as a Structured External Storage (SES) facility. This facility provides processing logic and storage for shared data objects termed structures. Multiple structures may exist at a coupling facility and multiple users may exist for each structure. Status regarding structures and users of structures is maintained at the coupling facility. The combination of customer specified policy, state information recorded on a shared coupling data set and status regarding structures and users of structures maintained at the coupling facility, determines the content of the active policy, which is utilized to control the allocation of coupling facility resources.

A capability is described which provides for the initial definition of and management of subsequent changes to a policy for usage of coupling facility resources. As described above, policy information is comprised of rules governing the use of coupling facility resources and information reflecting the current status of coupling facility resource use. A single policy is enforced for all of the systems comprising a single multisystem configuration. Policy rules describe coupling facility use and coupling facility structure definition.

A policy may be changed during ongoing operation of the systems comprising the multisystem configuration. Some changes may be immediately made to the policy. Changes in policy definition are coordinated across the systems in the sysplex. So, at any time there is one, and only one, policy which is active, as viewed by all participating systems. A mechanism of applying changes to the policy, which cannot be immediately made, is defined. In particular, changes which are compatible are made immediately. Changes which are incompatible, are made pending until those changes can be made without disruption. For example, a compatible change would be to add the definition of a coupling facility or structure which did not previously exist. An incompatible change would be to delete the definition of a structure which had users associated with it.

Actions which allocate/deallocate a structure in a coupling facility are controlled by policy rules. Users of a coupling facility structure come into existence and discontinue use of the structure during ongoing operation of the configuration. Under some failure conditions, it may become impossible to complete changes in the state of users or allocation status of coupling facility structures. Such failures include, loss of connectivity to a coupling facility or loss of a single system or complete failure of the systems comprising the multisystem configuration. Under these conditions, processing is defined for checkpointing the necessary actions such that those actions may be completed at a later time.

The computing environment being managed is comprised of multiple systems, multiple coupling facilities, and multiple coupling facility structures. Some changes to this configuration may result in discrepancies between policy information and the observed state of a coupling facility and its resident structures. Processing is described above for resolving these discrepancies.

Information regarding coupling facility structures and users of those structures are recorded both in the coupling facility and on the function data sets. There are errors which would cause these two to get out of synchronization. For example, even though the function data set is duplexed, if both copies are destroyed, no damage occurs to the coupling facilities. For this example, if the customer restored to DASD an old version of the function data set, the content of the function data set and the information in the coupling facilities could be out of synchronization. These conditions are recognized and invoke processing which reconstructs or reconciles the function data set information with the status of structures and users existing in coupling facilities.

On the function data sets, there can exist multiple policies. Each policy contains two types of records. One record describes the coupling facilities which should be utilized by the sysplex. The second record type describes the name, size and location of coupling facility structures. At any one time, there exists a single policy across the sysplex which is actively being utilized to control coupling facility resource assignment. In addition to this policy, or coupling resource assignment rules, status information about coupling facilities and coupling facility structures is stored in the couple and/or function data sets.

The status of users of a structure is recorded at the coupling facility. When a user becomes active, or terminates, updates occur to this status and associated information about the user recorded at the coupling facility. For example, when a user attaches to a cache structure, the coupling facility records the system on which that user exists and the location of the status variable at the associated system used to maintain cache coherency. Likewise, when a user of a cache structure terminates, the directory entries of the cache structure are processed to remove recognition of the user from the cache directory and from the castout lock before placing the user in a failed state. Failures can occur such that changes needed at the coupling facility cannot be made. For example, the last system having connectivity to a coupling facility may fail, making it impossible to change the state of users on that system at the coupling facility. A checkpoint of the changes that are needed, but cannot be made, is created. When access is gained to a coupling facility, any actions that were checkpointed for that facility are processed so the customer and the user of the coupling facility have the view that all processing was performed correctly and in a timely manner.

The mechanism of the present invention advantageously minimizes the time and effort required of the system programmer to manage Cross-System Extended Services. In particular, the present invention provides the capability for the installation to establish a policy for usage of coupling facility resources. This includes: sysplex-wide policy scope; support changes in installation policy without requiring a system IPL; utilization of installation policy to make cross-system extended services available to requesting subsystem/system components without requiring manual intervention; detect and utilize coupling facility resources at IPL; assign coupling facility resources to subsystem/system component use when requested; reclaim coupling facility resources when no longer in use; and recover from coupling facility related failures without requiring manual intervention whenever possible.

In accordance with the principles of the present invention, definition of the policy is sysplex wide in scope and consistently acted on by all systems participating in the sysplex. Changes in the policy are reflected in all systems in the sysplex. Furthermore, changes to the policy do not require any system in the sysplex to reinitialize. Capabilities are provided for the system programmer to display the current policy definition and the actual coupling facility resource assignment in effect while the sysplex is in operation.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

We claim:

1. A method to manage coupling facility resources (said resources) in a data processing system having one or more operating systems running on one or more processors coupled by one or more data transmission channels to one or more coupling facilities, said resources comprised of said one or more coupling facilities and one or more structures contained within said one or more coupling facilities, said method comprising the steps of:

using a policy stored in the data processing system for controlling said resources, said policy comprised of one or more active rules, current status of resource usage, and a pending policy; said active rules permit or disallow use of each of said one or more coupling facilities and define or disallow use of each of said one or more structures; said pending policy comprised of one or more pending rules;

identifying a set of changes by any of said operating systems comparing the said pending rules with the said active rules located in said policy;

modifying the said policy using the said set of changes to add, delete, or change active rules in said policy when the changes processed by the identifying step are found compatible with the active rules, and changes found incompatible with the active rules remaining pending for subsequent implementation; and accessing by said one or more operation systems said active rules in said policy to allow users to obtain and release usage of said one or more structures contained within said one or more coupling facilities.

2. The method of claim 1, further comprised of defining one or more administrative polices, said administrative policy containing one or more rules to define use of each of said one or more coupling facilities and use of each of said one or more structures and activating one of said one or more administrative policies to create in said policy a pending policy.

3. The method of claim 2, wherein said policy and said one or more administrative policies are stored on a function data set shared by the said one or more operating systems.

4. The method of claim 2, wherein said activating step comprises an operator issuing a command from any of said one or more operating systems to start making changes to said policy.

5. The method of claim 4, wherein said issuing by an operator of a command is repeated prior to completing said identified set of changes.

6. The method of claim 1, wherein said policy is further comprised of:

checkpoint save area for storing intended modifications for allowing users to obtain and release usage of said structures; and pending policy definition comprised of one or more pending rules to define use of each of said one or more coupling facilities and use of each of said one or more structures.

7. The method of claim 1, further comprising the step of implementing said incompatible changes.

8. The method of claim 7, wherein said implementing step comprises the step of deleting at least one of said coupling facilities associated with said incompatible changes when said structures contained within said at least one of said coupling facilities are no longer actively being used.

9. The method of claim 7, wherein said implementing step comprises the step of deleting one or more of said structures associated with said incompatible changes when said one or more structures to be deleted are no longer actively being used.

10. The method of claim 7, wherein said implementing step comprises the step of changing one or more active rules of one or more said structures associated with said incompatible changes when said one or more structures to be changed are no longer actively being used.

11. The method of claim 10, wherein said one or more active rules include definitions of said one or more coupling facilities to contain said structure, size limit for said structure, and number of users allowed to use said structure.

12. The method of claim 1, further comprising the steps of:

recording in said policy and in at least one of said coupling facilities information regarding said structures contained within said coupling facility and said users of said structures; and adjusting said information in said policy and in said at least one coupling facilities when compared said information in said policy does not coincide with said information in said at least one of said coupling facilities.

13. The method of claim 12, wherein said adjusting step comprises the step of using said information stored in at least one of said coupling facilities to reconcile at least one of said coupling facilities and said policy.

14. The method of claim 13, wherein said information stored in at least one of said coupling facilities is used to make the information in at least one of said coupling facilities and said policy consistent.

15. The method of claim 14, wherein said information comprises one of information associated with said one or more structures and said users of said one or more structures.

16. The method of claim 12, wherein said adjusting step comprises adding structures contained within at least one of said coupling facilities to said policy in order to make at least one of said coupling facilities consistent with said policy.

17. The method of claim 12, wherein said adjusting step comprises deleting structures contained within at least one of said coupling facilities in order to make at least one of said coupling facilities consistent with said policy.

18. The method of claim 12, wherein said adjusting step comprises adding users of said one or more structures contained within at least one of said coupling facilities to said policy in order to make at least one of said coupling facilities consistent with said policy.

19. The method of claim 12, wherein said adjusting step comprises deleting users of said one or more structures contained within at least one of said coupling facilities in order to make at least one of said coupling facilities consistent with said policy.

20. The method of claim 12, wherein said adjusting step comprises ignoring information located in at least one of said coupling facilities in order to make at least one of said coupling facilities consistent with said policy.

21. The method of claim 1, wherein said accessing step further comprises the steps of:

recording intended modification in said policy; and modifying said structures or said users of said structures; and erasing intended modification from said policy.

22. The method of claim 21, wherein said step of modifying comprises one of allocating said one or more structures, deallocating said one or more structures, attaching said users of said one or more structures, and detaching said users of said one or more structures.

23. The method of claim 21, wherein modification of said one or more structures or of said users of said structures is interrupted due to a predefined condition.

24. The method of claim 23, wherein one or more operating systems have connectivity by running said one or more processors coupled to at least one of said one or more coupling facilities and wherein said predefined condition comprises losing connectivity by one of said one or more operating systems making said modifications.

25. The method of claim 24, wherein a surviving operating system of said one or more operating systems uses said recorded intended modifications to perform said modifications.

26. The method of claim 23, wherein said predefined condition comprises having each of said one or more operating systems fail.

27. The method of claim 26, wherein a first of said one or more operating systems to recover from failure performs said modification using said recorded intended modifications.

* * * * *